(12) United States Patent
Sato et al.

(10) Patent No.: US 9,699,366 B2
(45) Date of Patent: Jul. 4, 2017

(54) IMAGE PROVIDING APPARATUS, IMAGE DISPLAY DEVICE, IMAGING SYSTEM, IMAGE DISPLAY SYSTEM, AND IMAGE PROVIDING METHOD IN WHICH COMPOSITE IMAGE DATA IS GENERATED USING AUXILIARY IMAGE DATA GENERATED BY AT LEAST ONE AUXILIARY IMAGING UNIT

(71) Applicant: Olympus Corporation, Shibuya-ku, Tokyo (JP)

(72) Inventors: Akinobu Sato, Hachioji (JP); Saori Matsumoto, Hino (JP); Keito Fukushima, Mitaka (JP); Hiroki Amino, Akiruno (JP); Takashi Hamada, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/699,331

(22) Filed: Apr. 29, 2015

(65) Prior Publication Data

US 2015/0319360 A1 Nov. 5, 2015

(30) Foreign Application Priority Data

May 2, 2014 (JP) ................................. 2014-095356

(51) Int. Cl.
*H04N 5/232* (2006.01)
*H04N 5/341* (2011.01)
(Continued)

(52) U.S. Cl.
CPC ..... *H04N 5/23206* (2013.01); *H04N 5/23216* (2013.01); *H04N 5/23293* (2013.01);
(Continued)

(58) Field of Classification Search
CPC .................................................... H04N 5/3415
See application file for complete search history.

(56) References Cited

U.S. PATENT DOCUMENTS 5,973,726 A * 10/1999 Iijima ................. H04N 5/2624
348/36
2003/0025803 A1* 2/2003 Nakamura ............ H04N 7/147
348/218.1

(Continued)

FOREIGN PATENT DOCUMENTS

JP 2003-250079 9/2003
JP 2012-201875 10/2012

*Primary Examiner* — Twyler Haskins
*Assistant Examiner* — Akshay Trehan
(74) *Attorney, Agent, or Firm* — John C. Pokotylo; Straub & Pokotylo

(57) ABSTRACT

An image providing apparatus includes: a plurality of auxiliary imaging units that have shooting ranges partially overlapping one another, and each of which images a subject to generate auxiliary image data; a provider communication unit; a provider communication control unit that receives, from the portable device, via the provider communication unit, transmission request information requesting the image providing apparatus to transmit composite image data; and an image synthesizing unit that generates, based on the transmission request information, composite image data by combining the auxiliary image data respectively generated by two or more of the plurality of auxiliary imaging units. The provider communication control unit transmits, via the provider communication unit, the composite image data to the portable device.

13 Claims, 31 Drawing Sheets

(51) Int. Cl.
*H04N 5/77* (2006.01)
*H04N 9/79* (2006.01)
H04N 101/00 (2006.01)
H04N 5/247 (2006.01)
H04N 5/272 (2006.01)

(52) U.S. Cl.
CPC ............ *H04N 5/3415* (2013.01); *H04N 5/77* (2013.01); *H04N 9/79* (2013.01); *H04N 5/247* (2013.01); *H04N 5/272* (2013.01); *H04N 2101/00* (2013.01)

(56) References Cited

U.S. PATENT DOCUMENTS

| | | | |
|---|---|---|---|
| 2005/0036044 A1* | 2/2005 | Funakura | G06K 9/00228 348/239 |
| 2006/0187234 A1* | 8/2006 | Deng | G06F 3/1446 345/592 |
| 2007/0081091 A1* | 4/2007 | Pan | A61B 1/00165 348/335 |
| 2009/0009605 A1* | 1/2009 | Ortiz | H04N 5/232 348/157 |
| 2012/0229596 A1* | 9/2012 | Rose | G06T 3/4038 348/36 |
| 2012/0314015 A1* | 12/2012 | Watson | H04N 7/15 348/14.1 |
| 2015/0116451 A1* | 4/2015 | Xu | H04N 7/15 348/14.13 |

* cited by examiner

IMAGE PROVIDING APPARATUS, IMAGE DISPLAY DEVICE, IMAGING SYSTEM, IMAGE DISPLAY SYSTEM, AND IMAGE PROVIDING METHOD IN WHICH COMPOSITE IMAGE DATA IS GENERATED USING AUXILIARY IMAGE DATA GENERATED BY AT LEAST ONE AUXILIARY IMAGING UNIT

CROSS REFERENCE TO RELATED APPLICATIONS

This application is based upon and claims the benefit of priority from Japanese Patent Application No. 2014-095356, filed on May 2, 2014, the entire contents of which are incorporated herein by reference.

BACKGROUND OF THE INVENTION

1. Field of the Invention

The present invention relates to an image providing apparatus, an image display device, an imaging system, an image display system, and an image providing method.

2. Description of the Related Art

In recent years, for portable devices, such as portable telephones, a technique of sequentially acquiring image data imaged by imaging devices, such as digital cameras, by use of a communication technique, has been known (for example, see Japanese Laid-open Patent Publication No. 2003-250079).

This technique is a technique for remotely operating imaging devices by a portable device.

Specifically, according to this technique, a portable device sequentially receives image data transmitted from an imaging device and sequentially displays live view images corresponding to the image data on a display unit provided in the portable device. While checking the live view images displayed on the display unit of the portable device, a user of the portable device executes a shooting operation on the portable device at a timing when shooting is desired to be executed by the imaging device. By this shooting operation, a shooting instruction is transmitted from the portable device to the imaging device. After receiving the shooting instruction, the imaging device images a subject to generate shot image data and transmits the shot image data to the portable device.

SUMMARY OF THE INVENTION

In accordance with some embodiments, an image providing apparatus, an image display device, an imaging system, an image display system, and an image providing method are presented.

In some embodiments, an image providing apparatus that provides image data to a portable device carried by a user is presented. The image providing apparatus includes: a plurality of auxiliary imaging units that have shooting ranges partially overlapping one another, and each of which images a subject to generate auxiliary image data; a provider communication unit that performs communication with the portable device; a provider communication control unit that receives, from the portable device, via the provider communication unit, transmission request information requesting the image providing apparatus to transmit composite image data; and an image synthesizing unit that generates, based on the transmission request information received from the portable device via the provider communication unit, composite image data by combining the auxiliary image data respectively generated by two or more of the plurality of auxiliary imaging units. The provider communication control unit transmits, via the provider communication unit, the composite image data to the portable device.

In some embodiments, an imaging system includes: a portable device carried by a user; and the image providing apparatus. The portable device includes: an operation reception unit that receives a first user operation; a request information generating unit that generates, when the operation reception unit receives the first user operation, the transmission request information; a portable communication unit that performs communication with the image providing apparatus; and a portable communication control unit that transmits the transmission request information to the image providing apparatus and receives the composite image data from the image providing apparatus, via the portable communication unit.

In some embodiments, an image display device that displays a shot image corresponding to shot image data generated by an imaging device is presented. The image display device includes: a data recording unit that records therein the shot image data generated by the imaging device in association with transmission request information related to a shooting situation of the imaging device upon the generation of the shot image data; an operation reception unit that receives a user operation; a display unit; a display control unit that causes the display unit to display a shot image corresponding to the shot image data when the operation reception unit receives the user operation instructing the display of the shot image corresponding to the shot image data; a communication unit that performs communication with an external image providing apparatus having a plurality of auxiliary imaging units each of which images a subject to generate auxiliary image data; and a portable communication control unit that, when the operation reception unit receives the user operation, reads the transmission request information associated with the shot image data to be displayed, from the data recording unit, transmits the transmission request information to the image providing apparatus, and receives, from the image providing apparatus, composite image data in which two or more of the respective auxiliary image data have been combined by the image providing apparatus based on the transmission request information, via the communication unit.

In some embodiments, an image display system includes: the image display device; and the image providing apparatus. The image providing apparatus includes: the plurality of auxiliary imaging units that have shooting ranges partially overlapping one another; and a server that performs communication with the image display device via a network. The server includes: a provider recording unit that records therein the auxiliary image data respectively generated by the plurality of auxiliary imaging units; a provider communication unit that performs communication with the image display device; a provider communication control unit that receives, via the provider communication unit, the transmission request information from the image display device; and an image synthesizing unit that generates, based on the transmission request information received from the image display device via the provider communication unit, the composite image data by combining the auxiliary image data respectively generated by two or more of the plurality of auxiliary imaging units and recorded in the provider recording unit. The provider communication control unit transmits, via the provider communication unit, the composite image data to the image display device.

In some embodiments, an image providing method executed by an image providing apparatus that provides image data to a portable device carried by a user is presented. The image providing method includes: causing a plurality of auxiliary imaging units having shooting ranges partially overlapping one another to each image a subject to generate auxiliary image data; receiving, from the portable device, transmission request information requesting the image providing apparatus to transmit composite image data; generating, based on the transmission request information, composite image data by combining the auxiliary image data respectively generated by two or more of the plurality of auxiliary imaging units; and transmitting the composite image data to the portable device.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, with reference to the drawings, modes for carrying out the present invention (hereinafter, "embodiments") will be described. The present invention is not limited by the embodiments described below. Further, in describing the drawings, the same signs will be appended to the same portions.

First Embodiment

Schematic Configuration of Imaging System

Figure 1:
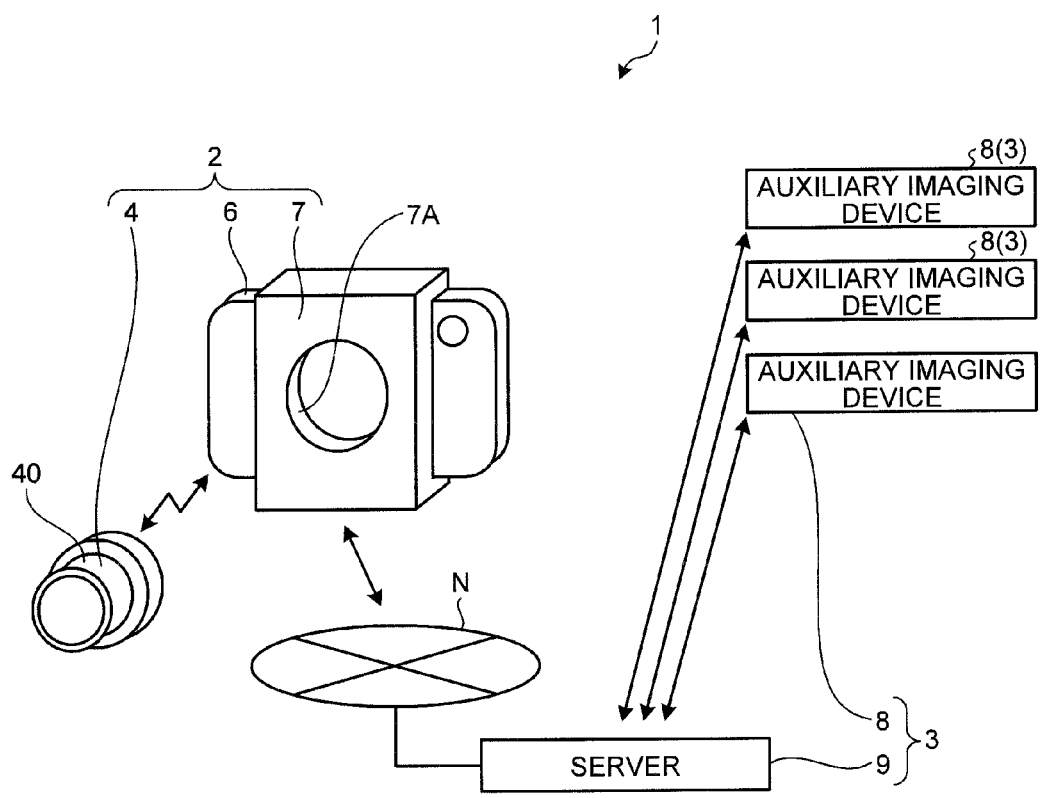
FIG. 1 is a diagram schematically illustrating a configuration of an imaging system according to a first embodiment of the present invention.

FIG. 1 is a diagram schematically illustrating a configuration of an imaging system 1 according to a first embodiment of the present invention.

The imaging system 1 is a system for generating a composite image by combining a plurality of auxiliary images shot from entirely different positions in an environment where a camera user is present. This imaging system 1 includes, as illustrated in FIG. 1, an imaging device 2 and an image providing apparatus 3.

Configuration of Imaging Device

The imaging device 2 corresponds to a portable device according to the present invention, which is carried by a camera user, and the imaging device 2 includes, as illustrated in FIG. 1, an imaging device main body 4, a communication device 6, and an attachment 7.

The attachment 7 is a member that mechanically connects the imaging device main body 4 with the communication device 6.

More specifically, the attachment 7 is, as illustrated in FIG. 1, placed on a back face of the communication device 6. Further, the attachment 7 is provided with an attachment hole 7A, which is circular in a planar view, and into which the imaging device main body 4 is fitted.

In a state where the imaging device main body 4 and the communication device 6 have been mechanically connected to each other via the attachment 7, the whole shape of the imaging device 2 has a shape, from which a digital camera is conceived.

The imaging device 2 is not limited to the configuration including the attachment 7, and may be configured without the attachment 7.

Configuration of Imaging Device Main Body

Hereinafter, main parts of the present invention will be mainly described, as a configuration of the imaging device main body 4.

Figure 2:
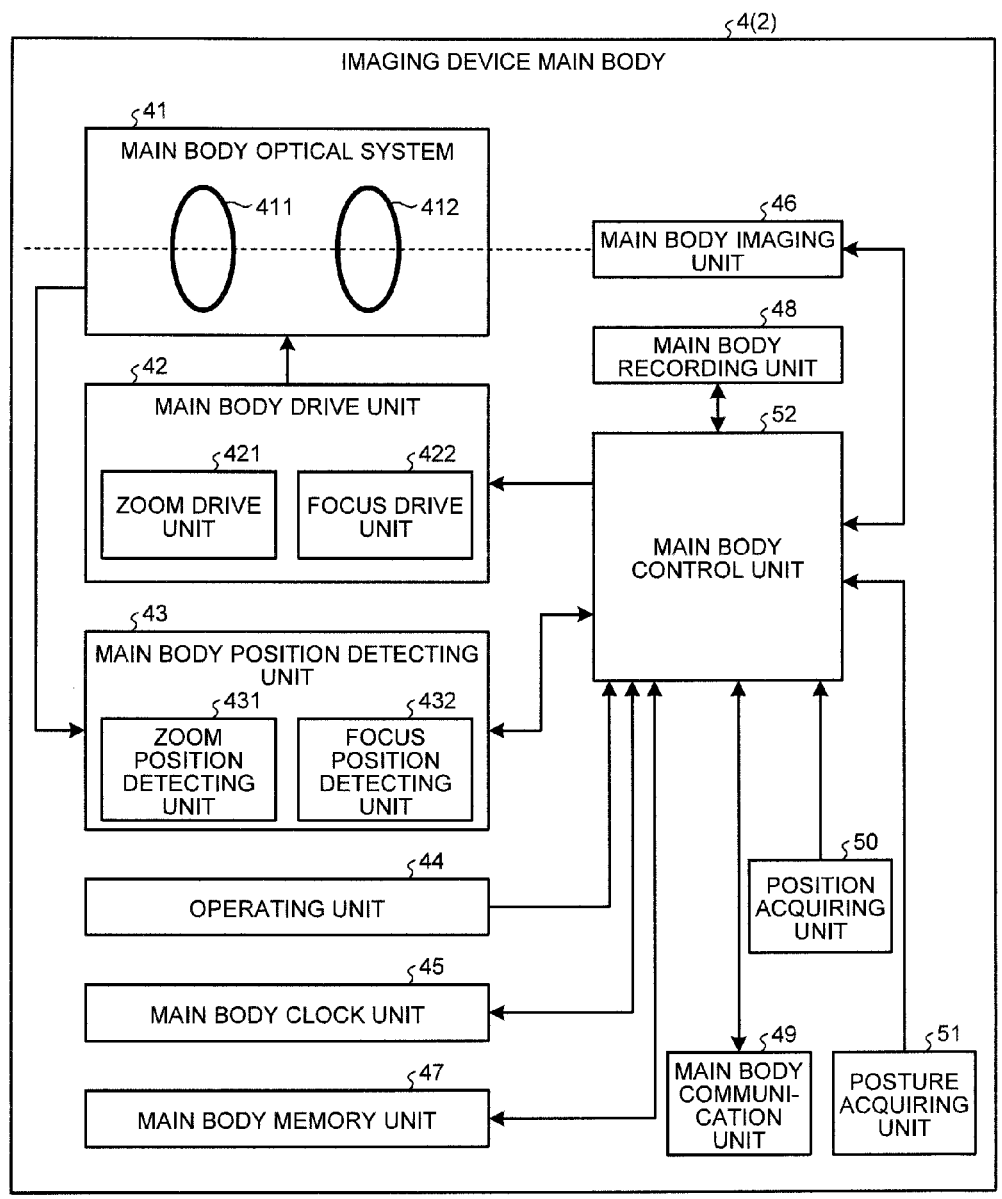
FIG. 2 is a block diagram illustrating a configuration of an imaging device main body illustrated in FIG. 1.

FIG. 2 is a block diagram illustrating a configuration of the imaging device main body 4.

The imaging device main body 4 includes, as illustrated in FIG. 2, a main body optical system 41, a main body drive unit 42, a main body position detecting unit 43, an operating unit 44, a main body clock unit 45, a main body imaging unit 46, a main body memory unit 47, a main body recording unit 48, a main body communication unit 49, a position acquiring unit 50, a posture acquiring unit 51, and a main body control unit 52. Each of these units 41 to 52 is accommodated inside a lens barrel 40 (FIG. 1) having an approximately cylindrical shape as a whole. That is, the whole shape of the imaging device main body 4 has, as illustrated in FIG. 1, a shape that is approximately the same as the whole shape of a so-called interchangeable lens.

The main body optical system 41 condenses light from a predetermined field area and forms an image of the condensed light on an imaging plane of an imaging element (not illustrated) composing the main body imaging unit 46. This main body optical system 41 includes, as illustrated in FIG. 2, a zoom lens 411 and a focus lens 412.

The zoom lens 411 is configured by using one lens or a plurality of lenses, and by moving along an optical axis illustrated with a dotted line in FIG. 2, changes zoom magnification of the main body optical system 41.

The focus lens 412 is configured by using one lens or a plurality of lenses, and by moving along the optical axis illustrated with the dotted line in FIG. 2, changes focus and focal length of the main body optical system 41.

The main body drive unit 42 moves, under control by the main body control unit 52, each of the lenses 411 and 412 composing the main body optical system 41 along the optical axis. This main body drive unit 42 includes, as illustrated in FIG. 2, a zoom drive unit 421 and a focus drive unit 422.

The zoom drive unit 421 is configured by using a stepping motor, a DC motor, or the like, and moves the zoom lens 411 along the optical axis.

The focus drive unit 422 is configured by using a stepping motor, a DC motor, or the like, and moves the focus lens 412 along the optical axis.

The main body position detecting unit 43 detects a position on the optical axis, of each of the lenses 411 and 412 composing the main body optical system 41. This main body position detecting unit 43 includes, as illustrated in FIG. 2, a zoom position detecting unit 431 and a focus position detecting unit 432.

The zoom position detecting unit 431 is configured by using a photointerrupter or the like, and detects a position on the optical axis, of the zoom lens 411 driven by the zoom drive unit 421.

Specifically, the zoom position detecting unit 431 converts a rotational amount of the drive motor included in the zoom drive unit 421 to a pulse number, and based on the converted pulse number, detects the position on the optical axis, of the zoom lens 411 from a reference position having infinity as a reference.

The focus position detecting unit 432 is configured by using a photointerrupter or the like, and detects, by a method similar to that by the zoom position detecting unit 431, the position on the optical axis, of the focus lens 412 driven by the focus drive unit 422.

The operating unit 44 is: an operating ring provided on a periphery of the lens barrel 40; and/or buttons, switches, or the like provided on an external surface of the lens barrel 40, and the operating unit 44 receives a user operation, such as an operation for changing the position on the optical axis, of the zoom lens 411 or focus lens 412 in the main body optical system 41, or a shooting operation (first user operation) for instructing imaging of a subject. The operating unit 44 outputs an instruction signal corresponding to the user operation, to the main body control unit 52.

That is, the operating unit 44 has a function as an operation reception unit according to the present invention.

The main body clock unit 45 has, in addition to a clocking function, a function of generating date and time information (hereinafter, referred to as "first time stamp") related to a date and a time of imaging by the main body imaging unit 46. The first time stamp generated by the main body clock unit 45 is output to the main body control unit 52.

Strict time adjustment is not necessarily required in the device for the generation of the time stamp, and needless to say, application is possible where acquirement thereof is done by communication with another device upon shooting. Similar description applies to time stamps described below.

The main body imaging unit 46 has a function as a second imaging unit according to the present invention, and, under control by the main body control unit 52, images a subject to generates image data. This main body imaging unit 46 is configured by using: an imaging element, such as a charge coupled device (CCD), which receives a subject image formed by the main body optical system 41 and converts the subject image into an electric signal; a signal processing unit, which generates digital image data by performing signal processing (A/D conversion or the like) on the electric signal (analog signal) from the imaging element; and the like. The image data sequentially generated by the main body imaging unit 46 (hereinafter, referred to as "live view image data") are, under control by the main body control unit 52, added with first time stamps related to dates and times of generation of the live view image data and sequentially stored in the main body memory unit 47. Further, image data (hereinafter, referred to as "shot image data"), which are generated by the main body imaging unit 46 according to a shooting operation by a camera user on the imaging device main body 4 (operating unit 44) or communication device 6: are added with a first time stamp related to a date and a time when the shot image data are generated; and are then recorded in the main body recording unit 48.

The main body memory unit 47 sequentially stores therein the live view image data (including the first time stamps) generated by the main body imaging unit 46.

The main body recording unit 48 records therein: various programs executed by the main body control unit 52; characteristic information related to characteristics of the main body optical system 41, such as magnification, focal length, angle of view, aberration, and F-value (brightness) of the main body optical system 41; and the like. Further, the main body recording unit 48 records therein the shot image data (including the first time stamp) generated by the main body imaging unit 46 according to the shooting operation by the camera user on the imaging device main body 4 (operating unit 44) or communication device 6 under control by the main body control unit 52.

The main body communication unit 49 is a communication interface for carrying out, under control by the main body control unit 52, wireless communication of various data including signals required in communication with the communication device 6.

In this first embodiment, as a communication mode of the wireless communication, Wireless Fidelity (Wi-Fi) (registered trademark) is adopted. As the communication mode of the wireless communication, instead of Wi-Fi (registered trademark), any other communication mode may be adopted, such as Worldwide Interoperability for Microwave Access (WiMAX) (registered trademark).

For example, for Wi-Fi (registered trademark), supposing a local network, roles of the devices may be represented by a relation between an access point and a station, and connection processing in brief is represented by a relation where the station is connected to a wireless network constructed by the access point.

In brief, a connection sequence includes a first step and a second step, the first step including the access point constructing the wireless network and informing a network identifier (SSID) of the access point, and the second step including the station retrieving network identifiers (SSIDs) being informed and connecting to a desired network (access point), and for the connection sequence, since a network with many devices is supposed, a large range is covered and a strict identification step is performed while the problem of interference is considered. Accordingly, establishing the connection may take a long time. However, as to data communication, transmission and reception of data at respective timings of the access point and the station are possible. Herein, the imaging device main body 4 may be considered as the access point and the communication device 6 may be considered as the station. This relation may be reversed. Since communication at a speed equal to or greater than 10 megabits per second are possible, images are able to be transmitted at high speed.

The position acquiring unit 50 receives satellite orbit information transmitted from a plurality of GPS satellites composing a global positioning system (GPS), which is a means for measuring a position of an object on the ground, and based on this received orbit information, the position acquiring unit 50 acquires current position information (information related to longitude and latitude) related to a current position of the imaging device main body 4.

The posture acquiring unit 51 is a unit that acquires posture information related to a posture of the imaging device main body 4, and acquires, as the posture information, an orientation of the imaging device main body 4 when a direction in which the optical axis (the dotted line illustrated in FIG. 2) of the imaging device main body (the main body optical system 41) is directed to the field area is a reference orientation in a case where the optical axis is approximately horizontal.

Specifically, the posture acquiring unit 51 is configured by using a magnetic orientation sensor or the like, and acquires the posture information of the imaging device main body 4 by detecting components of earth magnetism in a vertical direction and a horizontal direction and detecting an azimuth angle, which is an angle formed between a reference orientation with reference to the north and the optical axis of the imaging device main body 4.

The main body control unit 52 is configured by using a central processing unit (CPU) or the like, and controls operations of the whole imaging device main body 4 according to: instruction signals from the operating unit 44; and instruction signals from the communication device 6 input via the main body communication unit 49.

For example, the main body control unit 52 establishes communication connection in a communication mode, such as Wi-Fi (registered trademark) or the like, with the communication device 6, via the main body communication unit 49. The main body control unit 52 transmits, to the communication device 6, the characteristic information recorded in the main body recording unit 48, lens position information related to each position of the zoom lens 411 and focus lens 412 detected by the main body position detecting unit 43, the latest live view image data (including the first time stamp) stored in the main body memory unit 47, the latest shot image data (including the first time stamp) recorded in the main body recording unit 48, the current position information acquired by the position acquiring unit 50, the posture information acquired by the posture acquiring unit 51, and the like. The main body control unit 52 transmits the latest shot image data, the current position information, and the posture information to the communication device 6 according to a shooting operation on the operating unit 44 or communication device 6 by a camera user. "The latest" means the latest along the time based on the time stamps (hereinafter, the same applies). Further, the main body control unit 52 receives, via the main body communication unit 49, a shooting instruction from the communication device 6 and an operation instruction for the main body optical system 41.

Configuration of Communication Device

The communication device 6 is configured as, for example, a digital camera, a digital video camera, a portable telephone, or a tablet type portable device (in FIG. 1, the communication device 6 illustrated as a portable telephone (smartphone)).

Hereinafter, main parts of the present invention will be mainly described, as a configuration of the communication device 6.

Figure 3:
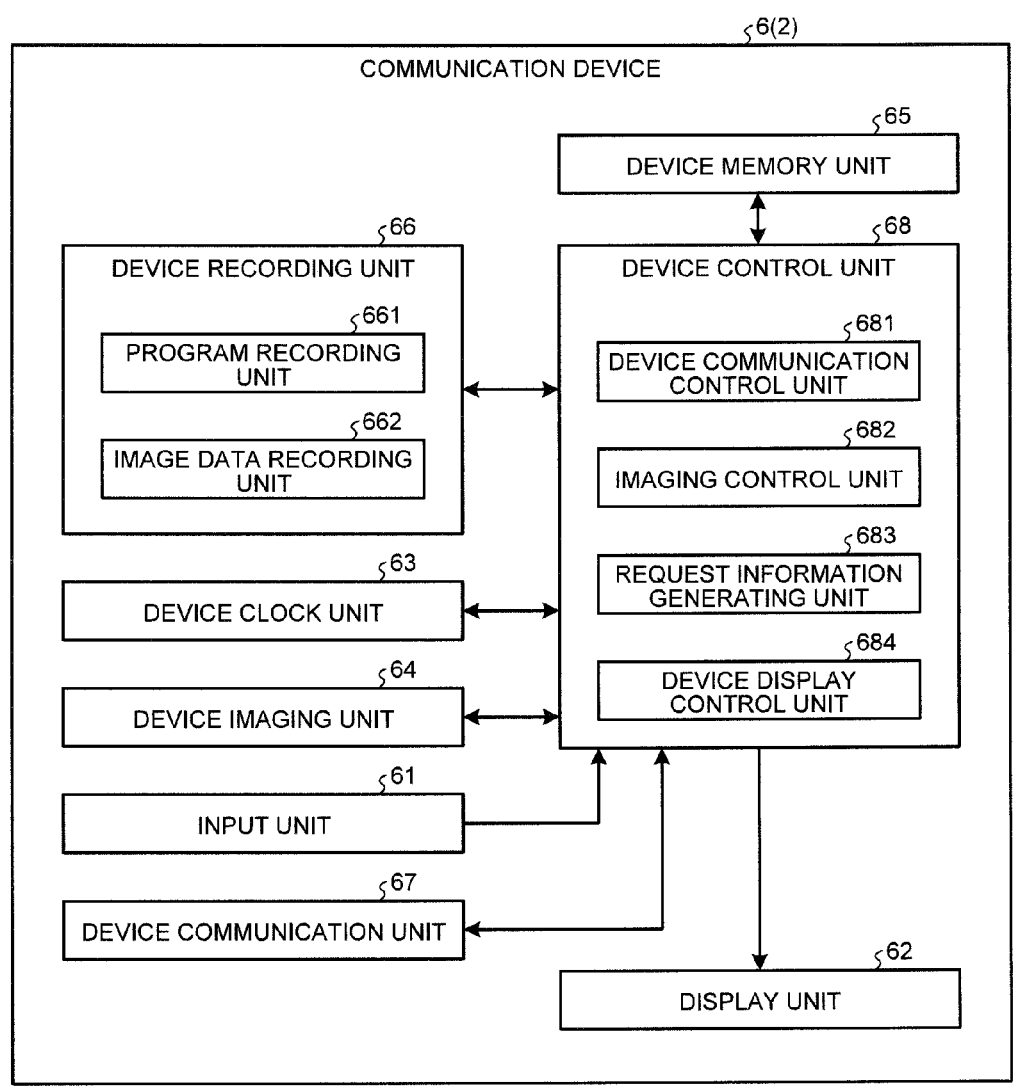
FIG. 3 is a block diagram illustrating a configuration of a communication device illustrated in FIG. 1.

FIG. 3 is a block diagram illustrating the configuration of the communication device 6.

This communication device 6 includes, as illustrated in FIG. 3, an input unit 61, a display unit 62, a device clock unit 63, a device imaging unit 64, a device memory unit 65, a device recording unit 66, a device communication unit 67, and a device control unit 68.

The input unit 61 is configured by using buttons, switches, a touch panel, or the like for receiving a user operation, and outputs, to the device control unit 68, an instruction signal according to the user operation.

The input unit 61 has a function as an operation reception unit according to the present invention.

The display unit 62 is configured by using a display panel made of a liquid crystal, organic electro-luminescence (EL), or the like, and is provided on a front face (see FIG. 6) of the communication device 6. The display unit 62 displays, under control by the device control unit 68, a predetermined image.

The device clock unit 63 has, in addition to a clocking function, a function of generating date and time information (hereinafter, referred to as "second time stamp") related to a date and a time of imaging by the device imaging unit 64. The second time stamp generated by the device clock unit 63 is output to the device control unit 68.

The device imaging unit 64 has a function as a first imaging unit according to the present invention and is provided on the front face (see FIG. 6) of the communication device 6. Under control by the device control unit 68, the device imaging unit 64 images a subject to generate image data (hereinafter, referred to as "in-camera image data"). This device imaging unit 64 is configured by using an optical system 641 (see FIG. 6) that forms a subject image, an imaging element (not illustrated) that receives the subject image formed by the optical system 641 and converts the subject image into an electric signal, a signal processing unit that generates digital image data by performing signal processing (A/D conversion or the like) on the electric signal (analog signal) from the imaging element, and the like. Under control by the device control unit 68, the in-camera image data generated by the device imaging unit 64: are added with a second time stamp related to a time and a date when the in-camera image data are generated; and are then stored or recorded in the device memory unit 65 or device recording unit 66.

The device memory unit 65 stores therein the in-camera image data imaged by the device imaging unit 64 and information received, via the device communication unit 67, from the imaging device main body 4 and image providing apparatus 3 (server 9).

The device recording unit 66 includes, as illustrated in FIG. 3, a program recording unit 661 and an image data recording unit 662.

The program recording unit 661 records therein various programs (including an image acquiring program and an image display program) executed by the device control unit 68, various data used during the execution of the programs, and the like.

The image data recording unit 662 records therein the shot image data (including the first time stamp) generated by the imaging device main body 4, the in-camera image data (including the second time stamp) generated by the device imaging unit 64, and composite image data (including a later described third time stamp) provided from the image providing apparatus 3. The composite image data are, under control by the device control unit 68, associated with the shot image data corresponding thereto.

Further, in the device recording unit 66, communication specification information of the imaging device main body 4 required in performing communication with the imaging device main body 4 and location information (uniform resource locator: URL) indicating a location on the Internet network N in the server 9 (FIG. 1) composing the image providing apparatus 3 are recorded.

The device communication unit 67 has a function as a portable communication unit according to the present invention, and is a communication interface for performing wireless communication of various data including signals required in the communication with the imaging device main body 4 and image providing apparatus 3 (server 9), under control by the device control unit 68, in a communication mode, such as Wi-Fi (registered trademark) or the like.

The device control unit 68 is configured by using a CPU or the like, and comprehensively controls operations of the communication device 6 by performing transfer or the like of instructions and data corresponding to the respective units composing the communication device 6 according to instruction signals and the like from the input unit 61. The device control unit 68 includes, as illustrated in FIG. 3, a device communication control unit 681, an imaging control unit 682, a request information generating unit 683, and a device display control unit 684.

The device communication control unit 681 executes the following process when the communication device 6 is set in a camera communication mode (a mode for shooting a subject by using the imaging device main body 4).

Specifically, the device communication control unit 681 establishes, based on the communication specification information of the imaging device main body 4 recorded in the device recording unit 66, communication connection with the imaging device main body 4 in a communication mode, such as Wi-Fi (registered trademark) or the like, via the device communication unit 67. The device communication control unit 681 receives, via the device communication unit 67, the characteristic information, the lens position information, the live view image data (including the first time stamp), the shot image data (including the first time stamp), the current position information, the posture information, and the like, from the imaging device main body 4.

Further, the device communication control unit 681 transmits, based on the location information (URL) of the image providing apparatus 3 (server 9) recorded in the device recording unit 66, an access signal (a composite image transmission request (including identification information for identifying the communication device 6 itself) requesting the server 9 to transmit composite image data) to the server 9 connected to the Internet network N, via the device communication unit 67, and establishes communication connection with the server 9. The device communication control unit 681 transmits transmission request information generated by the request information generating unit 683 to the server 9 and receives the composite image data from the server 9.

That is, the device communication control unit 681 has a function as a portable communication control unit according to the present invention.

The imaging control unit 682 executes the following process, when the communication device 6 is set in the camera communication mode.

Specifically, the imaging control unit 682 transmits, according to a shooting operation (first user operation) on the input unit 61 by a camera user, a shooting instruction (including a transfer request for the shot image data, current position information, and posture information acquired by that shooting) to perform shooting, via the device communication unit 67, to the imaging device main body 4. When the shot image data (including the first time stamp) are transferred from the imaging device main body 4, the imaging control unit 682 records the shot image data in the image data recording unit 662. Further, after the composite image data are transferred from the image providing apparatus 3 (server 9), the imaging control unit 682 records, in the image data recording unit 662, the composite image data in association with the shot image data recorded in the image data recording unit 662, according to a shooting operation on the input unit 61 by a camera user. Further, the imaging control unit 682 transmits, according to an operation on the input unit 61 by a camera user for operating (for causing the positions on the optical axis, of the zoom lens 411 and focus lens 412, to be changed by) the main body optical system 41, via the device communication unit 67, an operation instruction for the main body optical system 41, to the imaging device main body 4.

The imaging control unit 682 performs the following process, when the communication device 6 is set in a normal shooting mode (a mode for shooting a subject by using the device imaging unit 64).

Specifically, according to a shooting operation on the input unit 61 by a user of the communication device 6, the imaging control unit 682 causes the device imaging unit 64 to image a subject and records in-camera image data (including a second time stamp) generated by the device imaging unit 64 into the image data recording unit 662.

When the communication device 6 is set in the camera communication mode, the request information generating unit 683 generates, according to a shooting operation on the operating unit 44 or input unit 61 by a camera user, transmission request information requesting the image providing apparatus 3 (server 9) to transmit composite image data.

Specifically, the request information generating unit 683 generates, as the transmission request information, information formed of the current position information and posture information transferred from the imaging device main body 4 according to the shooting operation on the imaging device main body 4 (operating unit 44) or communication device 6 (input unit 61) by the camera user, the current position information and posture information having been added with time and date information related to a time and a date of the shooting operation. If the shooting operation is performed on the operating unit 44, the date and time information is the first time stamp added to the shot image data transferred from the imaging device main body 4, and if the shooting operation is performed on the input unit 61, the date and time information is the second time stamp generated by the device clock unit 63 at a time point when the shooting operation is performed.

The device display control unit 684 has a function as a display control unit according to the present invention. The device display control unit 684 controls operations of the display unit 62, to cause the display unit 62 to display a live view image corresponding to the live view image data stored in the device memory unit 65, respective images corresponding to the shot image data and composite image data recorded in the image data recording unit 662, an initial screen prompting a selection from various modes, and the like.

Configuration of Image Providing Apparatus

The image providing apparatus 3 provides, according to a request from the imaging device 2 (communication device 6), composite image data to the imaging device 2 (communication device 6). This image providing apparatus 3 includes, as illustrated in FIG. 1, a plurality (three in this first embodiment) of auxiliary imaging devices 8 and the server 9.

Configuration of Auxiliary Imaging Device

The three auxiliary imaging devices 8: each have a function as an auxiliary imaging unit according to the present invention; are configured as, for example, digital cameras, digital video cameras, or the like; and are respectively set (fixed) under a predetermined environment with their shooting ranges overlapping each other. The three auxiliary imaging devices 8 generate auxiliary image data used in generation of composite image data. The three auxiliary imaging devices 8 have the same configuration.

Of course, without being fixed, these auxiliary imaging devices 8 may be configured such that their shooting ranges are adjustable. Since many monitoring cameras receive an image of a wide angle of view from a fixed point by a single imaging unit, if only a particular area is selected, shooting image quality is degraded, but if a plurality of imaging units (auxiliary imaging devices 8) are used as described herein, shooting is not necessarily done from a fixed point and image quality upon selection of a particular area is also improved. By not adopting a fixed point, like a camera that enables panoramic shooting by image synthesis, enlargement of area and improvement in image quality by the synthesis are enabled and freedom of representation is expanded. Further, adjustment, such as focus control or blurring of background, has been difficult with the configuration of the wide angled monitoring camera. The plurality of auxiliary imaging devices 8 are configured to be able to control the frame rate, the exposure, the focus control, and the like in cooperation with one another so as to facilitate the synthesis or the like.

Hereinafter, main parts of the present invention will be mainly described, as a configuration of the auxiliary imaging device 8.

Figure 4:
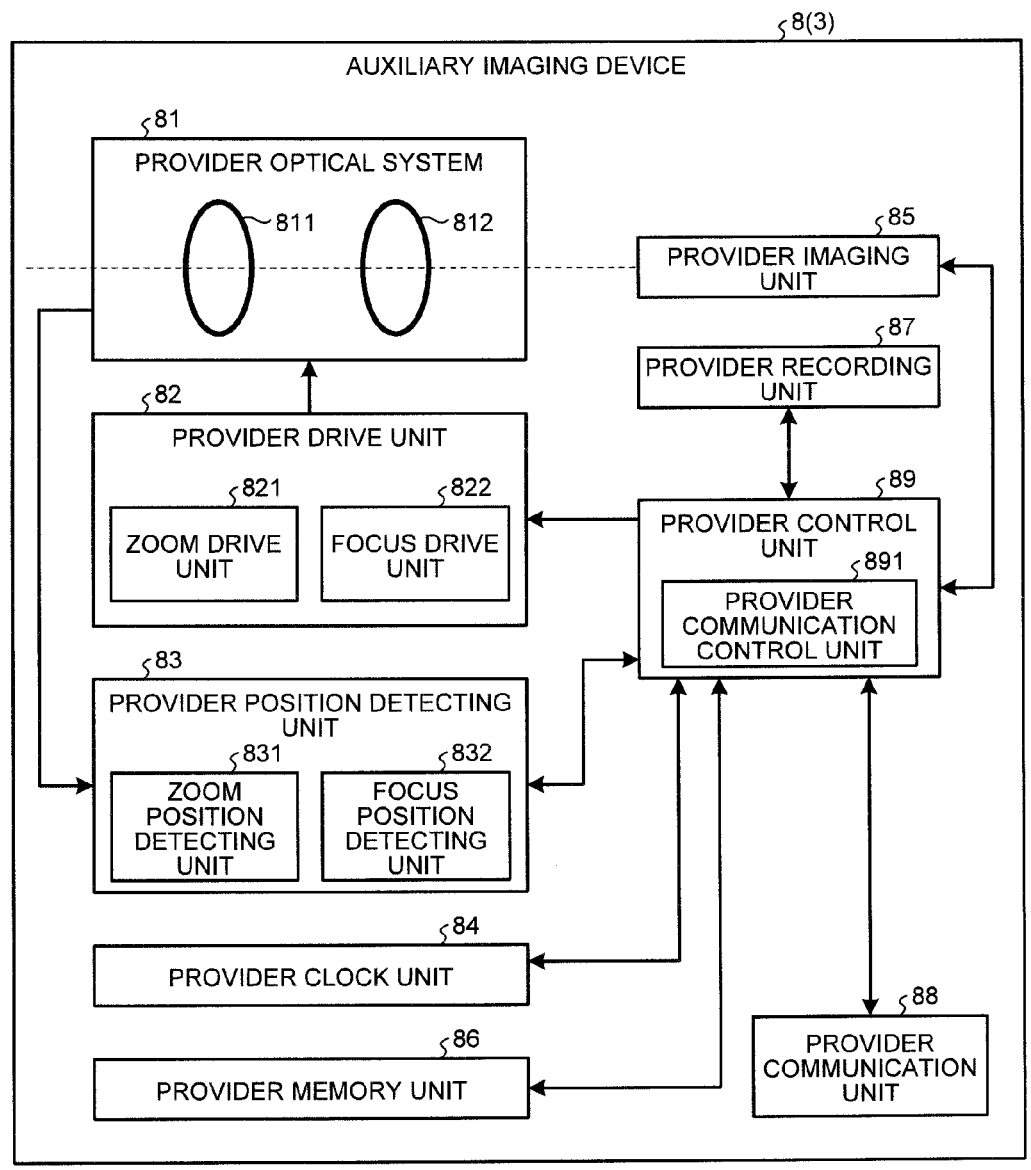
FIG. 4 is a block diagram illustrating a configuration of an auxiliary imaging device illustrated in FIG. 1.

FIG. 4 is a block diagram illustrating the configuration of the auxiliary imaging device 8.

The auxiliary imaging device 8 includes, as illustrated in FIG. 4, a provider optical system 81 having a zoom lens 811 and a focus lens 812, a provider drive unit 82 having a zoom drive unit 821 and a focus drive unit 822, a provider position detecting unit 83 having a zoom position detecting unit 831 and a focus position detecting unit 832, a provider clock unit 84, a provider imaging unit 85, a provider memory unit 86, a provider recording unit 87, a provider communication unit 88, and a provider control unit 89.

The units 81 to 83 respectively have the same configurations as the units 41 to 43 forming the imaging device main body 4 and thus a detailed description thereof will be omitted.

The provider clock unit 84 has, in addition to a clocking function, a function of generating date and time information (hereinafter, referred to as "third time stamp") related to a date and a time of imaging by the provider imaging unit 85. The third time stamp generated by the provider clock unit 84 is output to the provider control unit 89.

The provider imaging unit 85 has the same configuration as the main body imaging unit 46, and under control by the provider control unit 89, images a subject to generate auxiliary image data. The auxiliary image data generated sequentially by the provider imaging unit 85 are added with, under control by the provider control unit 89, a third time stamp related to a date and a time when the auxiliary image data are generated and identification information for identifying the auxiliary imaging device 8 itself, and are then sequentially stored in the provider memory unit 86.

The provider memory unit 86 sequentially stores therein, under control by the provider control unit 89, the auxiliary image data (including the third time stamp, and the identification information of the auxiliary imaging device 8) generated by the provider imaging unit 85.

The provider recording unit 87 records therein various programs executed by the provider control unit 89, characteristic information related to characteristics of the provider optical system 81, such as magnification, focal length, angle of view, aberration, and F-value (brightness) of the provider optical system 81, and the like.

The provider communication unit 88 is a communication interface for performing wireless communication of various data including signals required in communication with the server 9, under control of the provider control unit 89, in a predetermined communication mode.

The provider control unit 89 is configured by using a CPU or the like, and controls operations of the whole auxiliary imaging device 8. This provider control unit 89 includes, as illustrated in FIG. 4, a provider communication control unit 891.

The provider communication control unit 891 establishes communication connection with the server 9 via the provider communication unit 88. The communication connection between the auxiliary imaging device 8 and server 9 may be performed via the Internet network N or performed directly in a communication mode, such as Wi-Fi (registered trademark) or the like similarly to that between the imaging device main body 4 and communication device 6. The provider communication control unit 891 sequentially transmits the latest auxiliary image data (including the third time stamp, and the identification information of the auxiliary imaging device 8) stored in the provider memory unit 86, to the server 9.

Configuration of Sever

The server 9 combines the respective auxiliary image data generated by the plurality of auxiliary imaging devices 8 to generate composite image data.

Hereinafter, main parts of the present invention will be mainly described as a configuration of the server 9.

Figure 5:
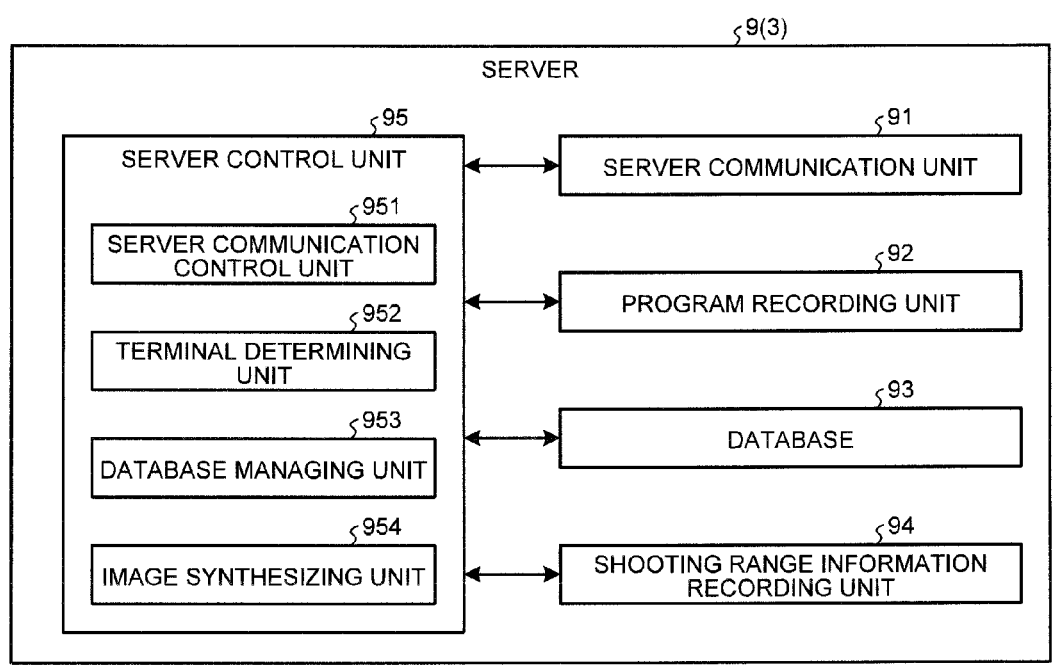
FIG. 5 is a block diagram illustrating a configuration of a server illustrated in FIG. 1.

FIG. 5 is a block diagram illustrating the configuration of the server 9.

The server 9 includes, as illustrated in FIG. 5, a server communication unit 91, a program recording unit 92, a database 93, a shooting range information recording unit 94, and a server control unit 95.

The server communication unit 91 has a function as a provider communication unit according to the present invention, and is a communication interface for performing wireless communication of various data including signals required in communication with the communication device 6 and auxiliary imaging device 8, under control by the server control unit 95, in a predetermined communication mode.

The program recording unit 92 records therein various programs (including an image providing program) executed by the server control unit 95, various data used during the execution of the programs, and the like.

The database 93 has a function as a provider recording unit according to the present invention, and under control by the server control unit 95, records therein, auxiliary image data (including the third time stamp, and the identification information of the auxiliary imaging device 8) received from each of the three auxiliary imaging devices 8 via the server communication unit 91, one by one of the auxiliary imaging devices 8 which is a transmission source of the auxiliary image data.

The shooting range information recording unit 94 records therein, for each of the three auxiliary imaging devices 8, shooting range information (information indicating a spatial field area with longitude and latitude) related to a shooting range (field area) of that auxiliary imaging device 8.

The server control unit 95 is configured by using a CPU or the like, and comprehensively controls operations of the server 9. This server control unit 95 includes, as illustrated in FIG. 5, a server communication control unit 951, a terminal determining unit 952, a database managing unit 953, and an image synthesizing unit 954.

The server communication control unit 951 has a function as a provider communication control unit according to the present invention, and establishes communication connection with the communication device 6 by controlling operations of the server communication unit 91 according to an access signal (a composite image transfer request (including the identification of that communication device 6)) transmitted from the communication device 6 via the Internet network N. The server communication control unit 951 receives transmission request information from the communication device 6, and transmits composite image data (including the third time stamp included in the auxiliary image data used in the generation of the composite image data) generated by the image synthesizing unit 954, to that communication device 6.

Further, via the server communication unit 91, the server communication control unit 951 establishes communication connection with each of the three auxiliary imaging devices 8 and sequentially receives the auxiliary image data (including the third time stamps, and the identification information of the auxiliary imaging devices 8) respectively from the three auxiliary imaging devices 8.

The terminal determining unit 952 determines (identifies), based on the access signal transmitted from the communication device 6 via the Internet network N, the communication device 6 of the transmission source that has made an access thereto.

The database managing unit 953 sequentially records, into the database 93, the auxiliary image data (including the third time stamps, and the identification information of the auxiliary imaging devices 8) received from the three auxiliary imaging devices 8 via the server communication unit 91, one by one of the auxiliary imaging devices 8 at the transmission source of the auxiliary image data, based on the identification information included in the auxiliary image data.

The image synthesizing unit 954 executes "generation condition determining process" of determining, based on the transmission request information received from the communication device 6 via the server communication unit 91 and the three pieces of shooting range information recorded in the shooting range information recording unit 94, whether or not a generation condition for generating composite image data is satisfied. Further, if, as a result of "generation condition determining process", the image synthesizing unit 954 determines that the generation condition is satisfied, the image synthesizing unit 954 executes "composite image generating process" of generating composite image data, which are generated by: extracting two or more auxiliary image data to be used in generation of composite image data, from the plurality of auxiliary image data recorded in the database 93; combining the extracted auxiliary image data; and adding thereto the third timestamp included in the auxiliary image data.

Details of "generation condition determining process" and "composite image generating process" will be described when later described operations of the server 9 are described.

Operations of Imaging System

Next, operations of the above described imaging system 1 will be described.

Figure 6:
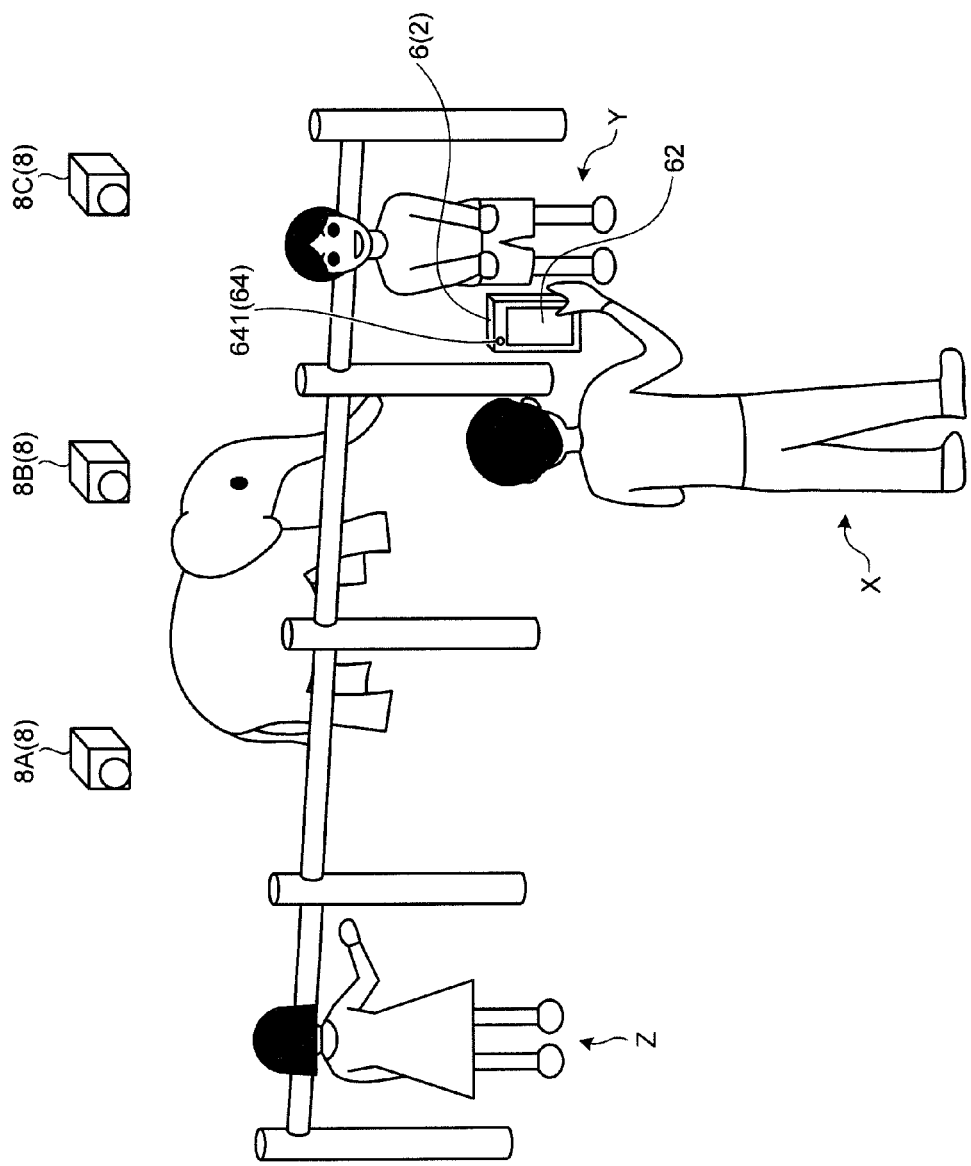
FIG. 6 is a diagram illustrating an example of a use mode of the imaging system illustrated in FIG. 1.

FIG. 6 is a diagram illustrating an example of a use mode of the imaging system 1. Specifically, FIG. 6 exemplifies a mode in which a zoo is supposed, and composite image data having therein an animal and visitors (including a camera user X, and subjects Y and Z) as subject images are generated by the camera user X visiting the zoo using the imaging device 2 and shooting the subject Y or subject Z (shooting the subject Y in the example of FIG. 6). Further, in FIG. 6, for convenience of explanation, the three auxiliary imaging devices 8 are represented by a first auxiliary imaging device 8A, a second auxiliary imaging device 8B, and a third auxiliary imaging device 8C, in order from the left side in FIG. 6.

Hereinafter, as the operations of the imaging system 1, operations of the imaging device main body 4, the operations of the communication device 6, operations of the auxiliary imaging device 8, and the operations of the server 9 will be described in order.

Operations of Imaging Device Main Body

Figure 7:
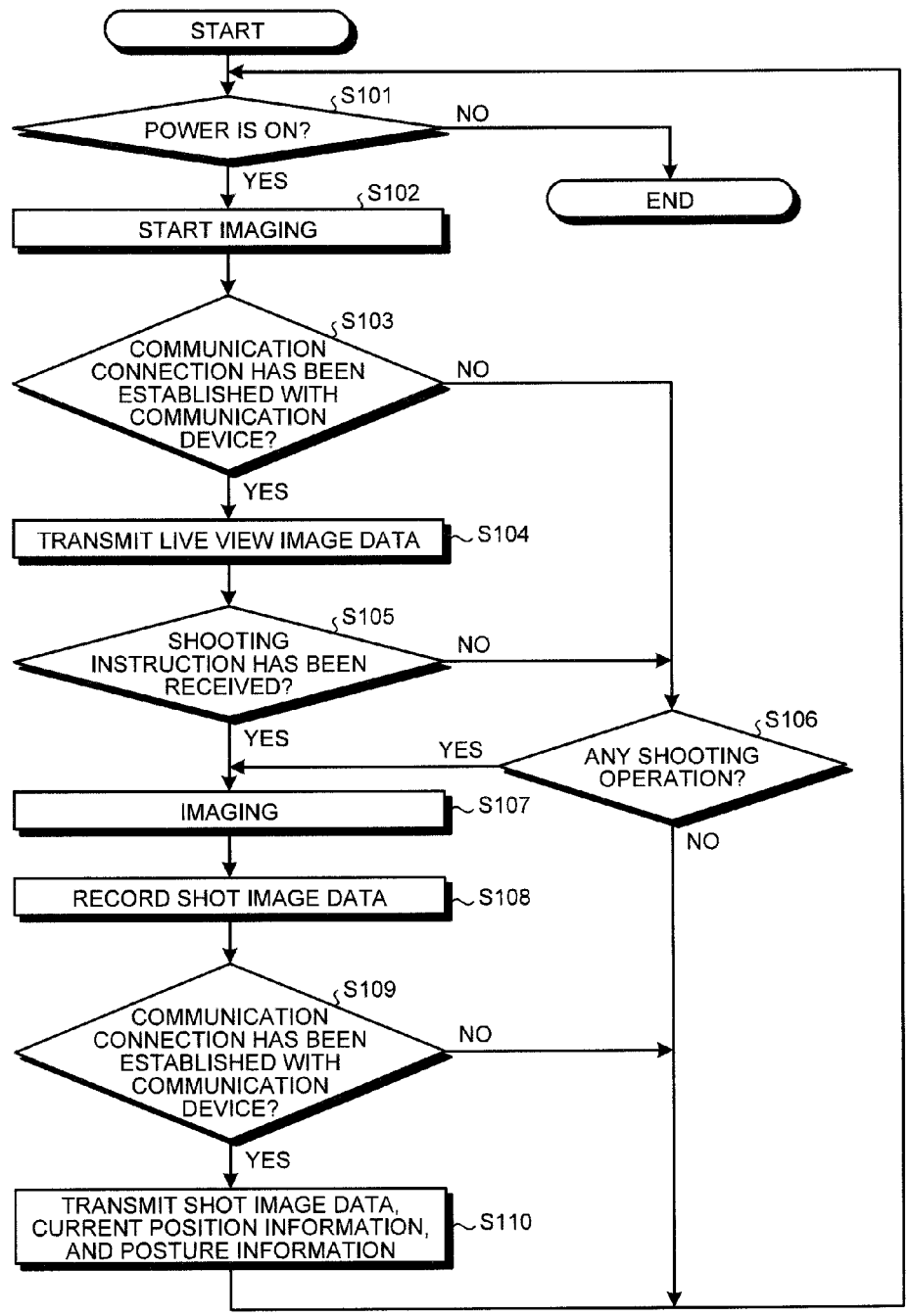
FIG. 7 is a flow chart illustrating operations of the imaging device main body illustrated in FIG. 1 and FIG. 2.

FIG. 7 is a flow chart illustrating the operations of the imaging device main body 4.

When power of the imaging device main body 4 is turned ON by an operation on the operating unit 44 by a camera user (Step S101: Yes), the main body control unit 52 causes the main body imaging unit 46 to start imaging (Step S102). Live view image data (including the first time stamp) generated by the main body imaging unit 46 are sequentially stored in the main body memory unit 47.

Subsequently, the main body control unit 52 determines whether or not communication connection in a communication mode, such as Wi-Fi (registered trademark) or the like, with the communication device 6, via the main body communication unit 49, has been established (Step S103).

If it is determined that the communication connection has not been established with the communication device 6 (Step S103: No), the imaging device main body 4 proceeds to Step S106.

On the contrary, if it is determined that the communication connection with the communication device 6 has been established (Step S103: Yes), the main body control unit 52 transmits, via the main body communication unit 49, the latest live view image data (including the first time stamp) stored in the main body memory unit 47, to the communication device 6 (Step S104).

Subsequently, the main body control unit 52 determines, whether or not a shooting instruction from the communication device 6 has been received via the main body communication unit 49 (Step S105).

If it is determined that the shooting instruction has not been received (Step S105: No), the main body control unit 52 determines whether of not a shooting operation on the operating unit 44 has been made by a camera user (Step S106). If it is determined that the communication connection has not established with the communication device 6 in Step S103 (Step S103: No) also, Step S106 is executed similarly.

On the contrary, if it is determined that the shooting instruction has been received (Step S105: Yes), the main body control unit 52 causes the main body imaging unit 46 to perform imaging (Step S107). If it is determined that the shooting operation has been made in Step S106 (Step S106: Yes) also, Step S107 is executed similarly. Further, if it is determined that the shooting operation has not been made in Step S106 (Step S106: No), the imaging device main body 4 returns to Step S101.

Figure 8:
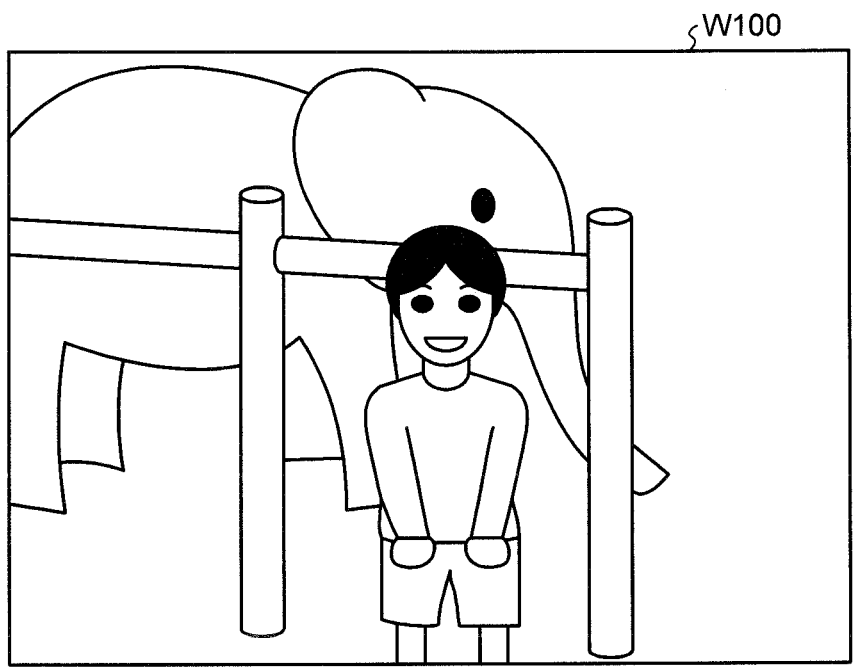
FIG. 8 is a diagram illustrating a shot image corresponding to shot image data imaged in Step S107 illustrated in FIG. 7 in the use mode illustrated in FIG. 6.

FIG. 8 is a diagram illustrating an example of a shot image W100 corresponding to the shot image data imaged in Step S107 in the use mode illustrated in FIG. 6. A live view image corresponding to the live view image data imaged in Step S102 in the use mode illustrated in FIG. 6 is the same image as the shot image W100.

After Step S107, the main body control unit 52 records the shot image data (the shot image W100 in the example of FIG. 6 and FIG. 8) generated by the imaging in Step S107, into the main body recording unit 48 (Step S108).

Subsequently, the main body control unit 52 determines, similarly to Step S103, whether or not communication connection with the communication device 6 has been established (Step S109).

If it is determined that the communication connection with the communication device 6 has been established (Step S109: Yes), the main body control unit 52 transmits to the communication device 6, via the main body communication unit 49 (Step S110), the latest shot image data (including the first time stamp) recorded in the main body recording unit 48 and the current position information and posture information respectively acquired by the position acquiring unit 50 and posture acquiring unit 51 when it is determined that the operation instruction has been received in Step S105 (Step S105: Yes) or when it is determined that the shooting operation has been made in Step S106 (Step S106: Yes). Thereafter, the imaging device main body 4 returns to Step S101.

On the contrary, if it is determined that the communication connection has not been established with the communication device 6 (Step S109: No), the imaging device main body 4 returns to Step S101. Although illustration thereof is omitted in FIG. 7, the main body control unit 52 transmits the shot image data (including the first time stamp), the current position information, and the posture information, which were planned to be transmitted at Step S110, as the communication connection with the communication device 6 is established.

Operations of Communication Device

Figure 9:
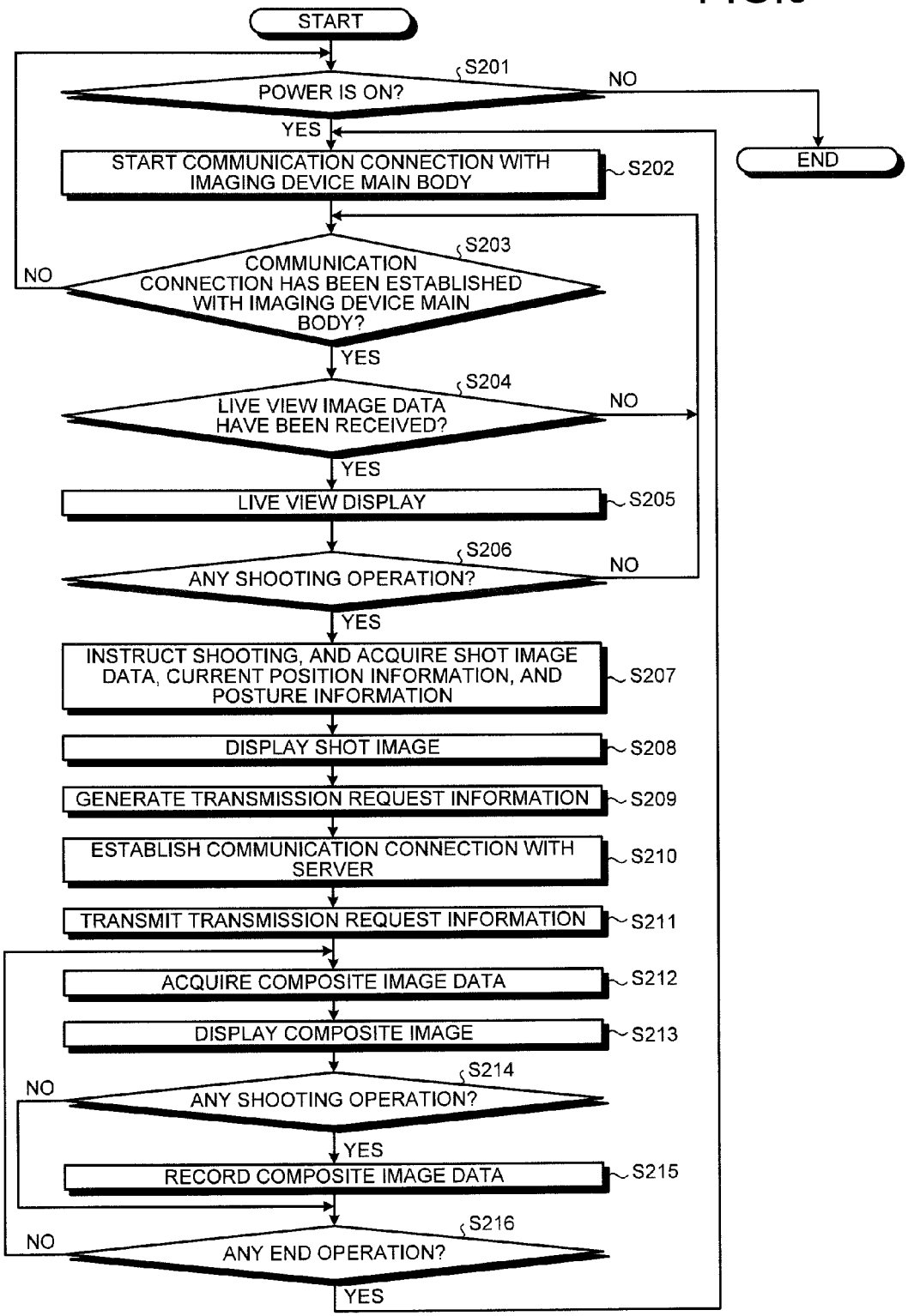
FIG. 9 is a flow chart illustrating operations of the communication device illustrated in FIG. 1 and FIG. 3.

FIG. 9 is a flow chart illustrating the operations of the communication device 6.

Hereinafter, the communication device 6 is assumed to be set in "camera communication mode".

When power of the communication device 6 is turned ON by an operation on the input unit 61 by a camera user (Step S201: Yes), the device communication control unit 681 starts, via the device communication unit 67, communication connection with the imaging device main body 4 (Step S202).

Subsequently, the device communication control unit 681 determines whether or not communication connection has been established with the imaging device main body 4 via the device communication unit 67 (Step S203).

If it is determined that the communication connection with the imaging device main body 4 has not been established (Step S203: No), the communication device 6 returns to Step S201.

On the contrary, if it is determined that the communication connection with the imaging device main body 4 has been established (Step S203: Yes), the device communication control unit 681 determines whether or not live view image data (including the first time stamp) have been received from the imaging device main body 4 via the device communication unit 67 (Step S204).

If it is determined that the live view image data have not been received (step S204: No), the communication device 6 returns to step S203.

On the contrary, if it is determined that the live view image data have been received (Step S204: Yes), the device communication control unit 681 stores the received live view image data (including the first time stamp) into the device memory unit 65. The device display control unit 684 causes the display unit 62 to display a live view image corresponding to the latest live view image data stored in the device memory unit 65 (Step S205).

Subsequently, the imaging control unit 682 determines whether or not a shooting operation on the input unit 61 by a camera user has been made (Step S206).

If it is determined that the shooting operation has not been made (Step S206: No), the communication device 6 returns to Step S203.

On the contrary, if it is determined that the shooting operation has been made (Step S206: Yes), the imaging control unit 682 executes the following process (Step S207).

That is, the imaging control unit 682 transmits a shooting instruction (including a transfer request for the shot image data, the current position information, and the posture information acquired in the shooting) to the imaging device main body 4 via the device communication unit 67. Further, the imaging control unit 682 records the shot image data (including the first time stamp) transferred from the imaging device main body 4 into the image data recording unit 662 and stores the current position information and posture information transferred from the imaging device main body 4 into the device memory unit 65.

Subsequently, the device display control unit 684 causes the display unit 62 to display a shot image corresponding to the latest shot image data recorded in the image data recording unit 662 (Step S208).

Subsequently, the request information generating unit 683 generates, as transmission request information, information generated by adding, to the current position information and posture information acquired in Step S207 according to the shooting operation on the imaging device main body 4 or communication device 6 by the camera user, the date and time information related to the date and time of that shooting operation (Step S209: request information generating step).

Subsequently, the device communication control unit 681 transmits, based on the location information (URL) recorded in the device recording unit 66, via the device communication unit 67, an access signal (a composite image transmission request (including the identification information of the communication device 6 itself) to the server 9 connected to the Internet network N, and establishes communication connection with the server 9 (Step S210). The device communication control unit 681 then transmits, via the device communication unit 67, the transmission request information generated in Step S209 to the server 9 (Step S211: communication step), receives the composite image data (including the third time stamp) from the server 9 (Step S212: communication step), and stores the received composite image data (including the third time stamp) into the device memory unit 65.

Subsequently, the device display control unit 684 causes the display unit 62 to display a composite image corresponding to the latest composite image data stored in the device memory unit 65 (Step S213).

Figure 10:
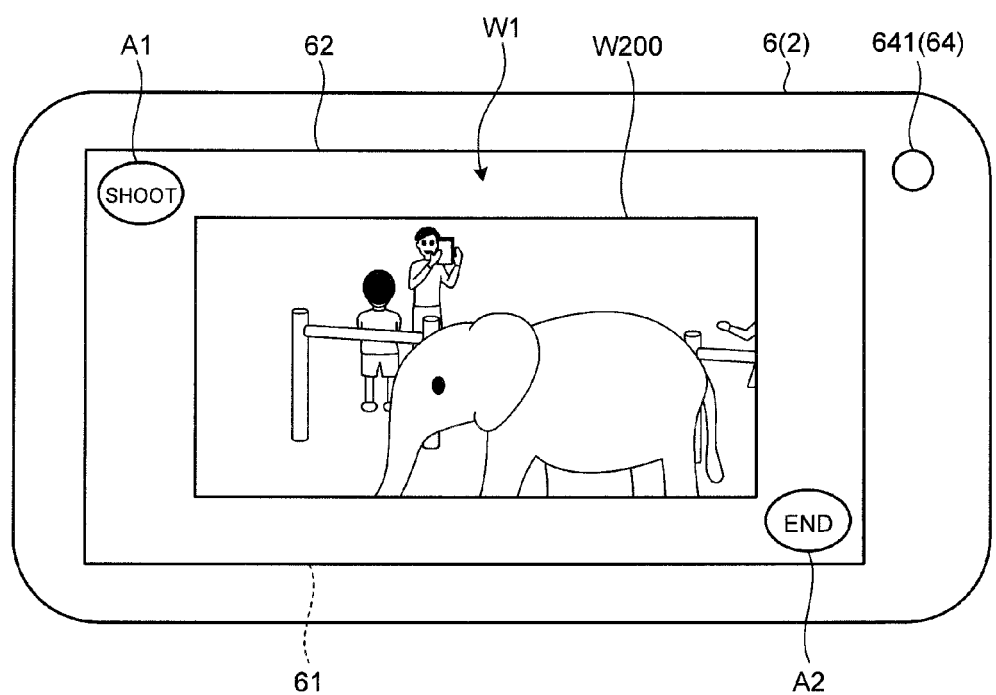
FIG. 10 is a diagram illustrating an example of a screen displayed in Step S213 illustrated in FIG. 9 in the use mode illustrated in FIG. 6.

FIG. 10 is a diagram illustrating an example of a screen W1 displayed in Step S213 in the use mode illustrated in FIG. 6.

For example, at Step S213, the device display control unit 684 causes the display unit 62 to display the screen W1 illustrated in FIG. 10.

On this screen W1, as illustrated in FIG. 10, an operating icon A1 for receiving a shooting operation for recording composite image data, an operating icon A2 for receiving an end operation for ending display of a composite image, and a composite image W200 corresponding to the composite image data transferred from the server 9 are displayed.

Subsequently, the imaging control unit 682 determines whether or not a shooting operation (a touch on the operating icon A1 by an operation on the touch panel (input unit 61) in the example of FIG. 10) on the input unit 61 by a camera user has been made (Step S214).

If it is determined that the shooting operation has not been made (Step S214: No), the communication device 6 returns to Step S216.

On the contrary, if it is determined that the shooting operation has been made (Step S214: Yes), the imaging control unit 682 records, in the image data recording unit 662, the latest composite image data (including the third time stamp) stored in the device memory unit 65 in association with the shot image data added with the first time stamp indicating approximately the same date and time as the third time stamp included in the composite image data, from the plurality of shot image data (including the first time stamps) recorded in the image data recording unit 662 (Step S215).

After Step S215, the device control unit 68 determines whether or not an end operation (a touch on the operating icon A2 by an operation on the touch panel (input unit 61) in the example of FIG. 10) on the input unit 61 by a camera user has been made (Step S216). If it is determined that the shooting operation has not been made in Step S214 (Step S214: No) also, Step S216 is similarly executed.

If it is determined that the end operation has been made (Step S216: Yes), the communication device 6 returns to Step S202.

On the contrary, if it is determined that the end operation has not been made (Step S216: No), the communication device 6 returns to Step S212.

The above described operations of the imaging device main body 4 and communication device 6 illustrated in FIG. 7 and FIG. 9 correspond to an image acquiring method according to the present invention.

Operations of Auxiliary Imaging Device

Figure 11:
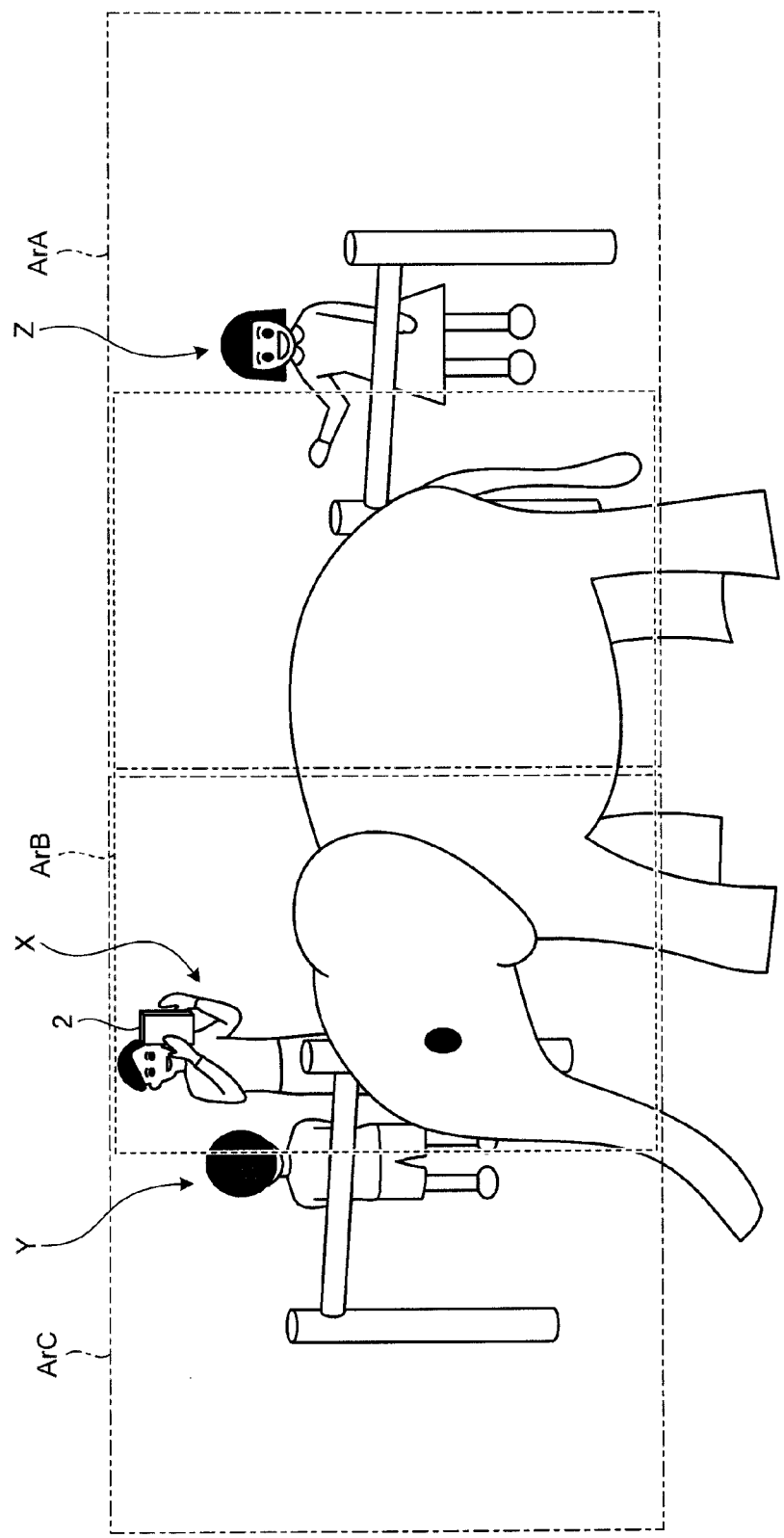
FIG. 11 is a diagram illustrating shooting ranges of a first to third auxiliary imaging devices in the use mode illustrated in FIG. 6.
Figure 12A:
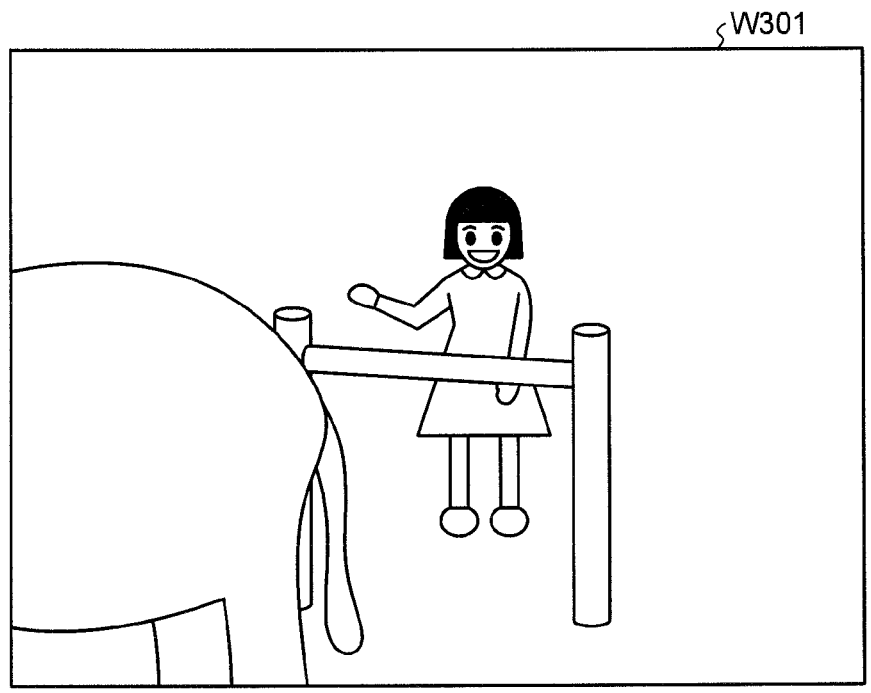
FIG. 12A is a diagram illustrating a first auxiliary image corresponding to auxiliary image data imaged by the first auxiliary imaging device in the use mode illustrated in FIG. 6 and FIG. 11.
Figure 12B:
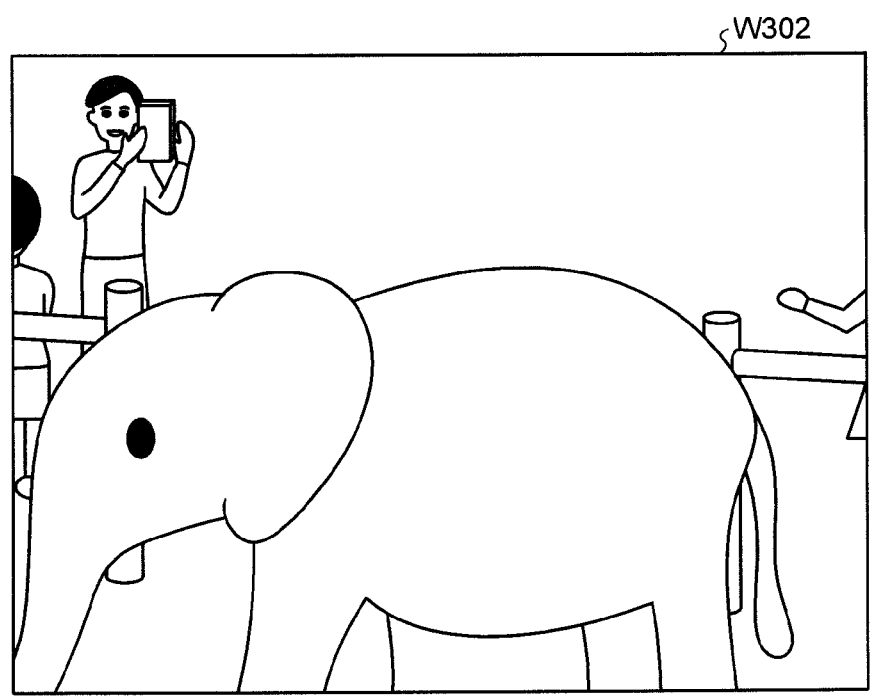
FIG. 12B is a diagram illustrating a second auxiliary image corresponding to auxiliary image data imaged by the second auxiliary imaging device in the use mode illustrated in FIG. 6 and FIG. 11.
Figure 12C:
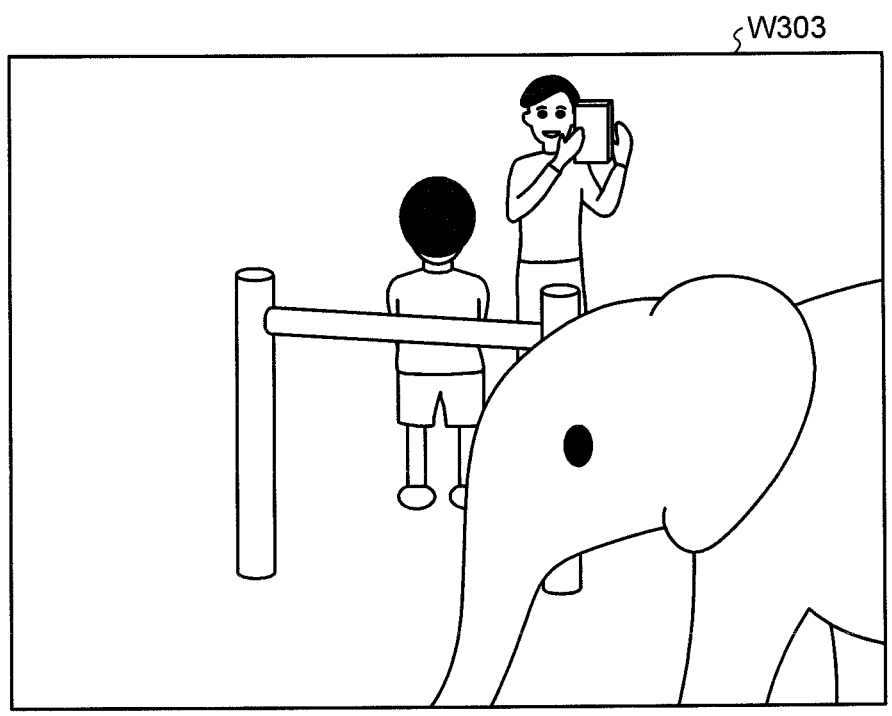
FIG. 12C is a diagram illustrating a third auxiliary image corresponding to auxiliary image data imaged by the third auxiliary imaging device in the use mode illustrated in FIG. 6 and FIG. 11.

FIG. 11 is a diagram illustrating shooting ranges of the first to third auxiliary imaging devices 8A to 8C in the use mode illustrated in FIG. 6. FIG. 12A to FIG. 12C are diagrams illustrating first to third auxiliary images W301 to W303 corresponding to auxiliary image data imaged respectively by the first to third auxiliary imaging devices 8A to 8C in the use mode illustrated in FIG. 6 and FIG. 11.

First, before operations of the auxiliary imaging device 8 are described, the shooting ranges of the first to third auxiliary imaging devices 8A to 8C will be described with reference to FIG. 6 and FIG. 11.

The first auxiliary imaging device 8A is, as illustrated in FIG. 11, arranged in the zoo to achieve a shooting range ArA with a spot where the subject Z is positioned being at the approximate center thereof. Accordingly, the first auxiliary imaging device 8A generates, by imaging, auxiliary image data corresponding to the auxiliary image W301 illustrated in FIG. 12A.

The second auxiliary imaging device 8B is, as illustrated in FIG. 11, arranged in the zoo such that a shooting range ArB thereof partially overlaps with the shooting range ArA of the first auxiliary imaging device 8A and becomes a shooting range resulting from movement of the shooting range ArA to the left side in the horizontal direction. Accordingly, the second auxiliary imaging device 8B generates, by imaging, auxiliary image data corresponding to the auxiliary image W302 illustrated in FIG. 12B.

The third auxiliary imaging device 8C is, as illustrated in FIG. 11, arranged in the zoo such that a shooting range ArC thereof partially overlaps with the shooting range ArB of the second auxiliary imaging device 8B and becomes a shooting range with a spot where the subject Y is currently positioned being positioned at the approximate center thereof. Accordingly, the third auxiliary imaging device 8C generates, by imaging, auxiliary image data corresponding to the auxiliary image W303 illustrated in FIG. 12C.

In the shooting range information recording unit 94 of the server 9, shooting range information (information indicating the spatial field areas with longitude and latitude) related to the above described shooting ranges ArA to ArC is recorded in advance.

Figure 13:
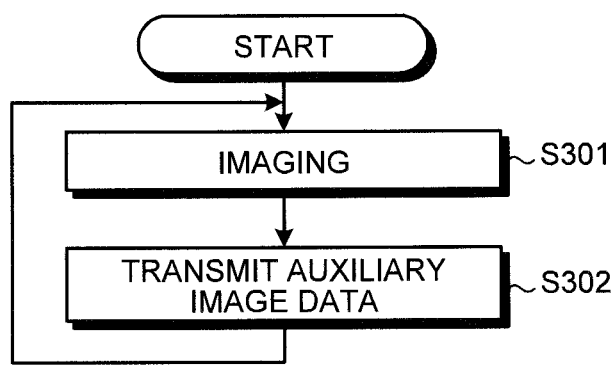
FIG. 13 is a flow chart illustrating operations of the auxiliary imaging device illustrated in FIG. 1 and FIG. 4.

FIG. 13 is a flow chart illustrating the operations of the auxiliary imaging device 8.

The operations of the first to third auxiliary imaging devices 8A to 8C are the same. Therefore, hereinafter, the operations of one of the auxiliary imaging devices 8 will be described.

The provider control unit 89 causes the provider imaging unit 85 to start imaging, according to, for example, an instruction from the server 9 (Step S301: imaging step) and sequentially stores the auxiliary image data (including the third time stamp, and the identification information of the auxiliary imaging device 8) generated by the provider imaging unit 85, in the provider memory unit 86.

Subsequently, the provider communication control unit 891 sequentially transmits the latest auxiliary image data (including the third time stamp, and the identification information of the auxiliary imaging device 8) stored in the provider memory unit 86 to the server 9 (Step S302).

Operations of Sever

Figure 14:
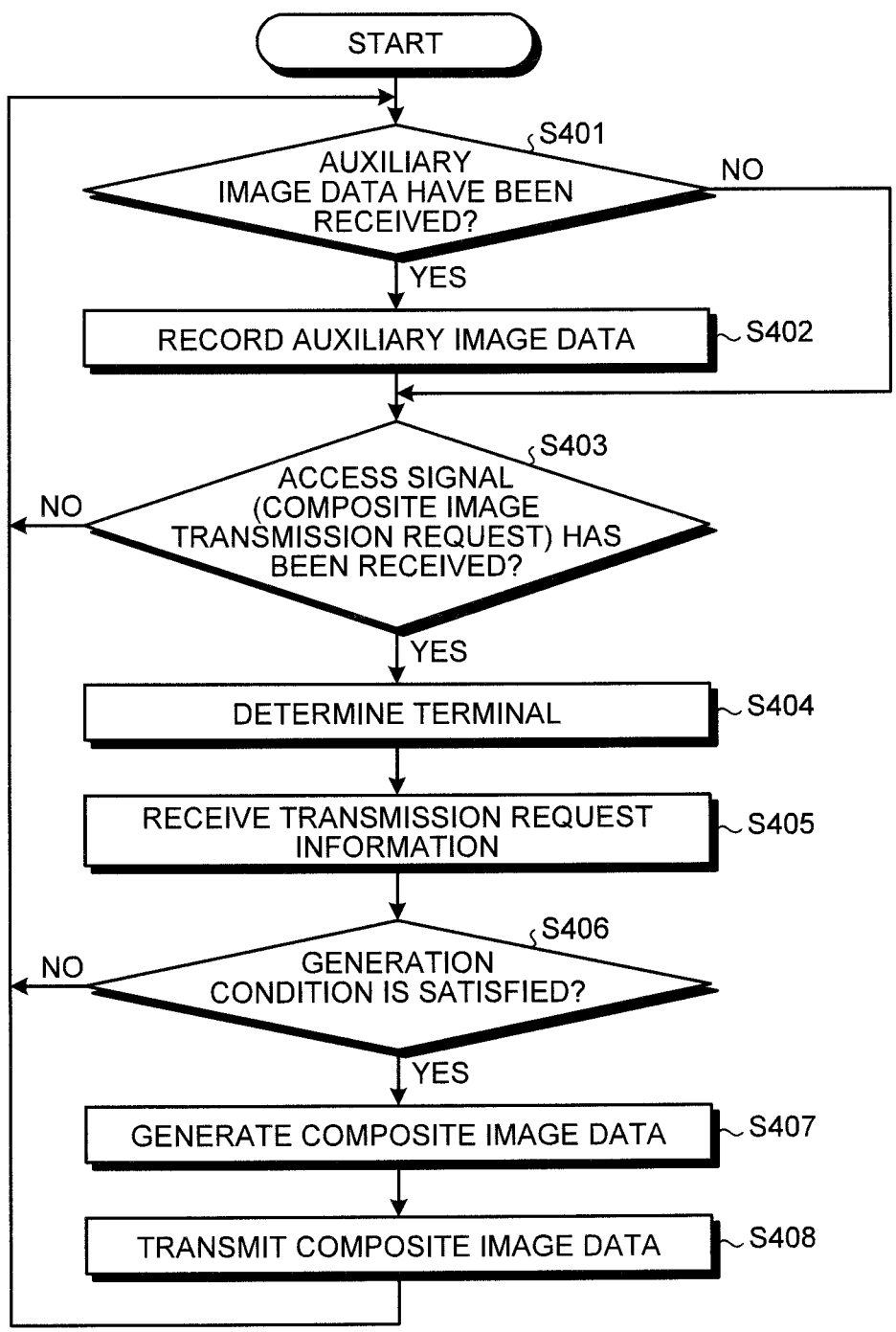
FIG. 14 is a flow chart illustrating operations of the server illustrated in FIG. 1 and FIG. 5.

FIG. 14 is a flow chart illustrating the operations of the server 9.

The server communication control unit 951 determines whether or not auxiliary image data (including a third time stamp, and identification information of the auxiliary imaging device 8) have been received from the auxiliary imaging device 8 via the server communication unit 91 (Step S401).

If it is determined that the auxiliary image data have been received (Step S401: Yes), the database managing unit 953 sequentially records, in the database 93, based on the identification information included in the auxiliary image data, the received auxiliary image data (the third time stamp, and the identification information of the auxiliary imaging device 8) for each of the auxiliary imaging device 8, which is the transmission source of the auxiliary image data (Step S402).

Subsequently, the server communication control unit 951 determines whether or not an access signal (a composite image transmission request (including the identification information of the communication device 6)) has been received from the communication device 6 via the server communication unit 91 and the Internet network N (Step S403).

If it is determined that the access signal has not been received (Step S403: No), the server 9 returns to step S401.

On the contrary, if it is determined that the access signal has been received (Step S403: Yes), the terminal determining unit 952 identifies the communication device 6 of the transmission source that has made the access thereto, based on the access signal (Step S404).

Subsequently, the server communication control unit 951 receives, via the server communication unit 91 and the Internet network N, transmission request information (current position information and posture information (including date and time information)) from the communication device 6 (Step S405: reception step).

Subsequently, the image synthesizing unit 954 executes the generation condition determining process (Step S406).

Specifically, at Step S406, the image synthesizing unit 954 grasps, based on the current position information included in the transmission request information acquired in Step S405, the position (longitude and latitude) of the imaging device 2 (imaging device main body 4). The image synthesizing unit 954 then refers to the three pieces of shooting range information recorded in the shooting range information recording unit 94 to determine whether or not the grasped position of the imaging device 2 is included in any of the shooting ranges (spatial ranges represented by longitude and latitude, in the example of FIG. 11, the shooting ranges ArA to ArC) of the first to third auxiliary imaging devices 8A to 8C (whether or not the generation condition is satisfied).

If it is determined that the generation condition is not satisfied (the position of the imaging device 2 is not included in any of the shooting ranges of the first to third auxiliary imaging devices 8A to 8C), the server 9 returns to Step S401.

On the contrary, if it is determined that the generation condition is satisfied (the position of the imaging device 2 is included in any of the shooting ranges of the first to third auxiliary imaging devices 8A to 8C), the image synthesizing unit 954 executes a composite image generating process (Step S407: image synthesizing step).

Specifically, the image synthesizing unit 954 grasps, at Step S407, based on the posture information included in the transmission request information acquired in Step S405, an orientation of the imaging device 2 (imaging device main body 4). Further, the image synthesizing unit 954 refers to the three pieces of shooting range information recorded in the shooting range information recording unit 94, and based on the grasped position and orientation of the imaging device 2, predicts whether the subject of the imaging device 2 is included in any of the shooting ranges of the first to third auxiliary imaging devices 8A to 8C. Based on a result of that prediction, the image synthesizing unit 954 reads out, from the database 93, two or more auxiliary image data of the three auxiliary image data (imaged respectively by the first to third auxiliary imaging devices 8A to 8C) added with the third time stamps indicating approximately the same dates and times as the date and time based on the date and time information included in the transmission request information acquired in Step S405, combines the read out two or more auxiliary image data, add thereto the third time stamp included in those auxiliary image data, to thereby generate composite image data.

More specifically, using FIG. 6, FIG. 11, and FIG. 12A to FIG. 12C as an example, Steps S406 and S407 will be described.

In the example of FIG. 6 and FIG. 11, the camera user X is imaging the subject Y by using the imaging device 2. The position of the imaging device 2 and the subject Y of the imaging device 2 are each included in the shooting ranges ArB and ArC of the second and third auxiliary imaging devices 8B and 8C. Thus, at Step S406 and S407, the image synthesizing unit 954 recognizes or predicts that the position and subject Y of the imaging device 2 are included in each of the shooting ranges ArB and ArC. The image synthesizing unit 954 then combines, at Step S407, the two auxiliary image data (the auxiliary images W302 and W303 illustrated in FIG. 12B and FIG. 12C) respectively corresponding to the recognized or predicted shooting ranges ArB and ArC, to thereby generate composite image data (the composite image W200 illustrated FIG. 10).

Further, if, differently from the example of FIG. 6 and FIG. 11, the camera user X is imaging the subject Z by using the imaging device 2, the subject Z of the imaging device 2 is included in each of the respective shooting ranges ArA and ArB of the first and second auxiliary imaging devices 8A and 8B. In such a case, the image synthesizing unit 954 recognizes, at Step S406, that the position of the imaging device 2 is included in each of the shooting ranges ArB and ArC, as described above. Further, the image synthesizing unit 954 predicts, at Step S407, that the subject Z of the imaging device 2 is included in each of the shooting ranges ArA and ArB. The image synthesizing unit 954 then combines the three auxiliary image data (the auxiliary images W301 to W303 illustrated in FIG. 12A to FIG. 12C) corresponding to all of the recognized and predicted shooting ranges ArA to ArC to thereby generate composite image data.

If, differently from the example of FIG. 6 and FIG. 11, the position and subject of the imaging device 2 are included in only one shooting range of the respective shooting ranges ArA to ArC of the first to third auxiliary imaging devices 8A to 8C, the image synthesizing unit 954 combines two auxiliary image data corresponding to that one shooting range and a shooting range adjacent to that one shooting range, to thereby generate composite image data. The adjacent shooting range is, if that one shooting range is the shooting range ArA, the shooting range ArB, and if the one shooting range is the shooting range ArC, the shooting range ArB. Further, if the one shooting range is the shooting range ArB, either of the shooting ranges ArA and ArC may be the adjacent shooting range.

After Step S407, the server communication control unit 951 transmits, via the server communication unit 91 and the Internet network N, the composite image data generated in Step S407 (including the third time stamp) to the communication device 6 identified in Step S404 (Step S408: transmission step). Thereafter, the communication device 6 returns to Step S401.

The above described operations of the auxiliary imaging device 8 and the server 9 illustrated in FIG. 13 and FIG. 14 correspond to an image providing method according to the present invention.

The above described imaging device 2 according to the first embodiment generates, if a shooting operation is received, transmission request information including current position information related to a current position of the imaging device 2 and posture information related to a posture (orientation) of the imaging device 2 (imaging device main body 4) and transmits the transmission request information to the image providing apparatus 3.

The image providing apparatus 3 according to this first embodiment combines, if the transmission request information is received from the imaging device 2, based on the transmission request information and shooting range information that is related to respective shooting ranges (field areas) of the auxiliary imaging devices 8, a plurality of auxiliary image data imaged approximately at the same time under approximately the same environment as the spot where the imaging was performed by the imaging device 2, and transmits the combined composite image data to the imaging device 2. The imaging device 2 receives the composite image data from the image providing apparatus 3.

Therefore, effectively by the imaging device 2 and image providing apparatus 3 according to this first embodiment, a camera user is able to acquire, together with a shot image imaged by the imaging device 2, a composite image, which has been imaged under approximately the same environment as the spot where the imaging is performed and approximately at the same time by a plurality of imaging devices (auxiliary imaging devices 8) different from the imaging device 2 and which has been synthesized, and thus user friendliness is able to be improved.

Of course, since what is expected here is acquirement of a beautiful image as an auxiliary image so that the environment enjoyed by the shooter is able to be recalled later, the shooting spot and shooting direction are not necessarily limited. If results of combining a plurality of images by high image quality shooting, characterized by background blurring, sharp focusing, and the like, are able to be extracted and received, various applications will be possible. For example, even if yourself is not photographed therein, an image of a lion that roared in the distance at that time may be acquired. In this case, a change in an image of an event that occurred around the shooting time may be determined by a change in sound, and a shooting result triggered by the determination may be acquired. Thereby, just by hearing the roar of a lion, how the face of the lion looked at that time is able to be experienced, and breadth of experience is broadened and the shot time is able to be lively recalled. That is, what a user felt in a shooting environment with the five senses may be determined by various sensors provided in a device carried by the user and auxiliary shooting may be initiated by that determination and association with an image shot by the user may be performed. Further, for simplification, description with respect to the same timing has been made, but the same shooting timing is not necessarily anything to be particular about, with respect to the shooting operation of the user and the shooting of the auxiliary image. For example, by combining an image of a zoo without any visitors after the user has left, the user (shooter) is able to think of the place that is without the user. That is, a device or a system may be configured, which includes a shooting situation acquiring unit that acquires a shooting situation including a position of that portable device and a time, and in which the request information generating unit performs the generation of the transmission request information triggered by a characteristic situational change in the shooting situation acquired by the shooting situation acquiring unit around the reception of the first user operation by the operation reception unit.

Further, the imaging device 2 according to the first embodiment generates transmission request information including current position information related to a current position of the imaging device 2 at the time of receiving a shooting operation and posture information related to a posture (orientation) of the imaging device 2 (imaging device main body 4).

That is, the image providing apparatus 3 combines, based on the transmission request information, auxiliary image data imaged by the auxiliary imaging devices 8 with shooting ranges in which the imaging device 2 (the camera user X in the example of FIG. 6) and a subject (the subject Y in the example of FIG. 6) are included, and provides the combined composite image data to the imaging device 2. Therefore, by the imaging device 2 and image providing apparatus 3 according to this first embodiment, a camera user is able to acquire a highly interesting composite image, which is shot from a position different from that of the imaging device 2 and represents a shooting scene of the camera user using the imaging device 2.

Second Embodiment

Next, a second embodiment of the present invention will be described.

In the description below, to configurations and steps that are the same as those of the above described first embodiment, the same signs will be appended, and detailed description thereof will be omitted or simplified.

In an imaging system according to this second embodiment, a communication normal mode for shooting a subject by using an imaging device main body and a communication panoramic mode for acquiring composite image data from a server, are independently provided. Further, the imaging system according to this second embodiment is configured to generate, according to an area specifying operation (second user operation) for specifying a partial area of a composite image on a communication device by a camera user, an extracted image corresponding to the specified area.

Configuration of Imaging System

Hereinafter, an imaging system 1A (an imaging device 2A and an image providing apparatus 3A) according to this second embodiment will be described.

The attachment 7 composing the imaging device 2A has the same configuration as the attachment 7 (FIG. 1) described in the above first embodiment. Further, the auxiliary imaging devices 8 composing the image providing apparatus 3A have the same configuration as the auxiliary imaging devices 8 (FIG. 1 and FIG. 4) described in the above first embodiment. Therefore, hereinafter, configurations of an imaging device main body 4A and a communication device 6A, which compose the imaging device 2A, and a server 9A, which composes the image providing apparatus 3A, will be described.

Configuration of Imaging Device Main Body

Figure 15:
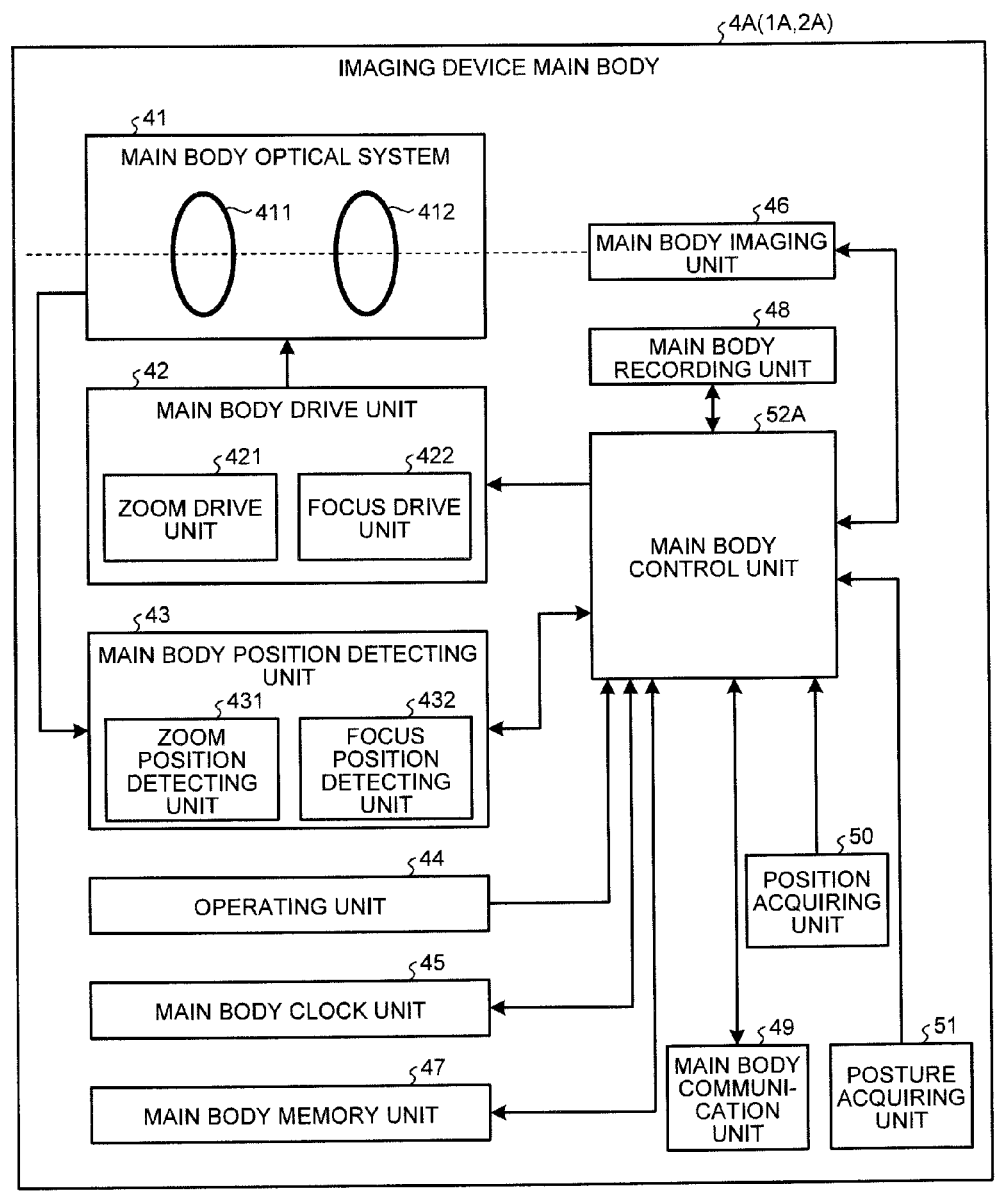
FIG. 15 is a block diagram illustrating a configuration of an imaging device main body according to a second embodiment of the present invention.

FIG. 15 is a block diagram illustrating a configuration of the imaging device main body 4A.

In the imaging device main body 4A according to this second embodiment, a part of the function of the main body control unit 52 of the imaging device main body 4 (FIG. 2) described in the above first embodiment has been changed.

Specifically, in contrast to the main body control unit 52 described in the above first embodiment, a main body control unit 52A (FIG. 15) composing the imaging device main body 4A according to this second embodiment is configured to transmit the current position information and posture information to the communication device 6A when the communication device 6A separately makes a transfer request for the current position information and posture information, instead of when a shooting operation has been made on the imaging device main body 4A (operating unit 44) or communication device 6A (input unit 61) by a camera user.

Configuration of Communication Device

Figure 16:
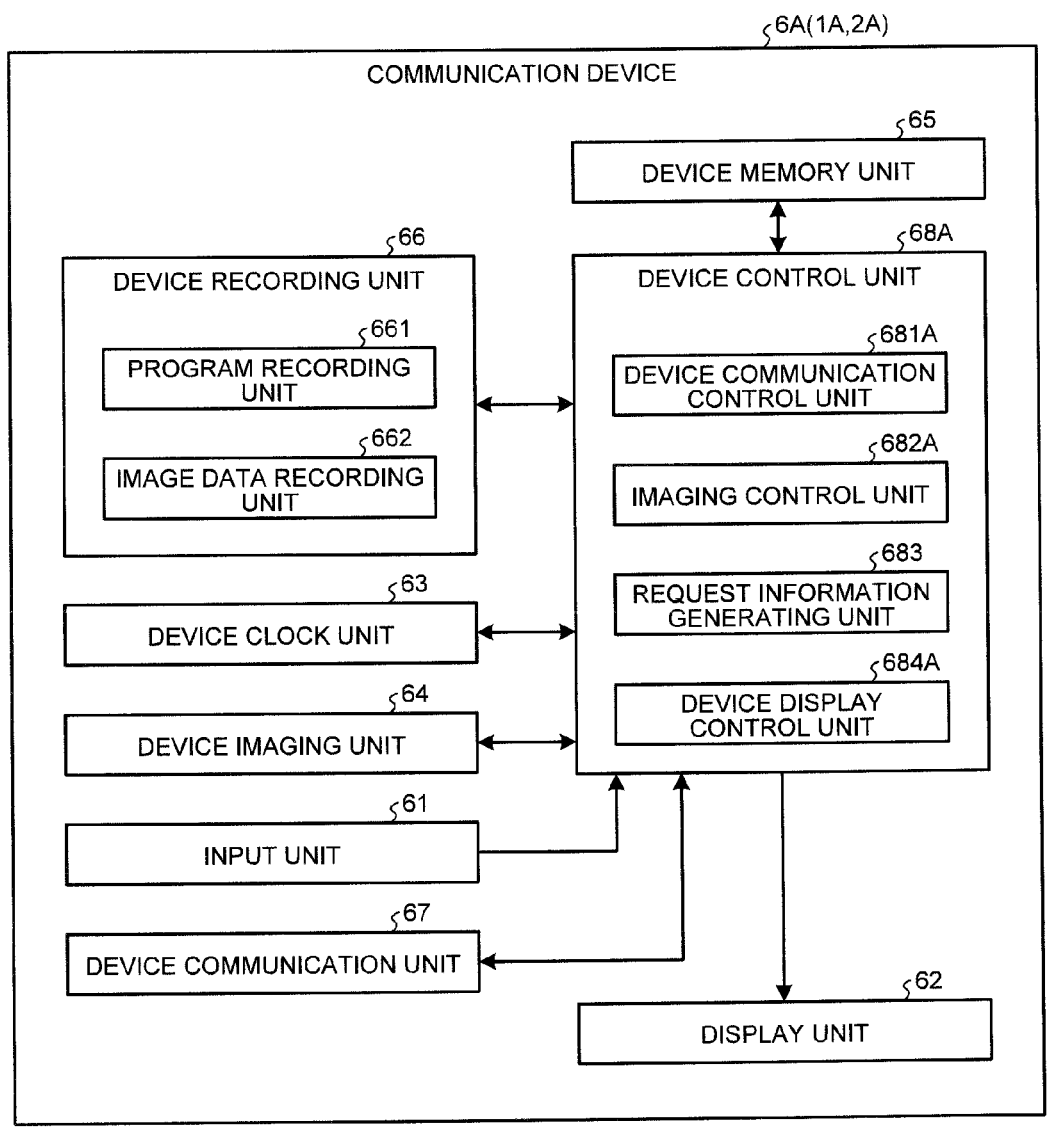
FIG. 16 is a block diagram illustrating a configuration of a communication device according to the second embodiment of the present invention.

FIG. 16 is a block diagram illustrating the configuration of the communication device 6A.

In the communication device 6A according to this second embodiment, a part of the function of the device control unit 68 of the communication device 6 (FIG. 3) described in the above first embodiment has been changed.

Specifically, a device control unit 68A composing the communication device 6A according to this second embodiment includes, as illustrated in FIG. 16, in addition to the request information generating unit 683, and in contrast to the device control unit 68 described in the above first embodiment, a device communication control unit 681A, an imaging control unit 682A, and a device display control unit 684A, which have been partially changed in functions from the device communication control unit 681, imaging control unit 682, and device display control unit 684.

If the communication device 6A is set in the communication normal mode (the mode for shooting a subject by using the imaging device main body 4), similarly to the function of the device communication control unit 681 described in the above first embodiment, the device communication control unit 681A has a function of establishing communication connection with the imaging device main body 4A and receiving characteristic information, lens position information, live view image data, and shot image data from the imaging device main body 4A.

On the contrary, if the communication device 6A is set in the communication panoramic mode (the mode for acquiring composite image data from the server 9A), similarly to the function of the device communication control unit 681 described in the above first embodiment, the device communication control unit 681A has a function of establishing communication connection with the imaging device main body 4A, receiving current position information and posture information from the imaging device main body 4A, establishing communication connection with the server 9A, and receiving composite image data from the server 9A, as well as the following function.

That is, according to an area specifying operation (operation for specifying a partial area of a composite image) on the input unit 61 by a camera user, the device communication control unit 681A transmits to the server 9A connected to the Internet network N, via the device communication unit 67, an access signal (an extracted image transmission request (including identification information identifying the communication device 6A itself) requesting the server 9A to transmit extracted image data) and area information related to that area, and receives the extracted image data from the server 9A.

When the communication device 6A is set in the communication normal mode, the imaging control unit 682A has, similarly to the function executed in the camera communication mode by the imaging control unit 682 described in the above first embodiment, a function of receiving shot image data from the imaging device main body 4 according to a shooting operation on the input unit 61 by a camera user and recording the shot image data into the image data recording unit 662, and a function of transmitting an operation instruction for the main body optical system 41 to the imaging device main body 4 according to an operation for operating the main body optical system 41 on the input unit 61 by the camera user.

On the contrary, when the communication device 6A is set in the communication panoramic mode, the imaging control unit 682A has, similarly to the function executed in the camera communication mode by the imaging control unit 682 described in the above first embodiment, a function of recording, into the image data recording unit 662, the composite image data in association with the shot image data according to a shooting operation on the input unit 61 by a camera user, as well as the following function.

That is, the imaging control unit 682A records the extracted image data transferred from the server 9A according to the area specifying operation on the input unit 61 by the camera user in association with the shot image data, into the image data recording unit 662.

The device display control unit 684A has, in addition to a function similar to that of the device display control unit 684 described in the above first embodiment, a function of controlling the operations of the display unit 62 and causing the display unit 62 to display an extracted image corresponding to the extracted image data, when the extracted image data are received from the server 9A.

Configuration of Sever

Figure 17:
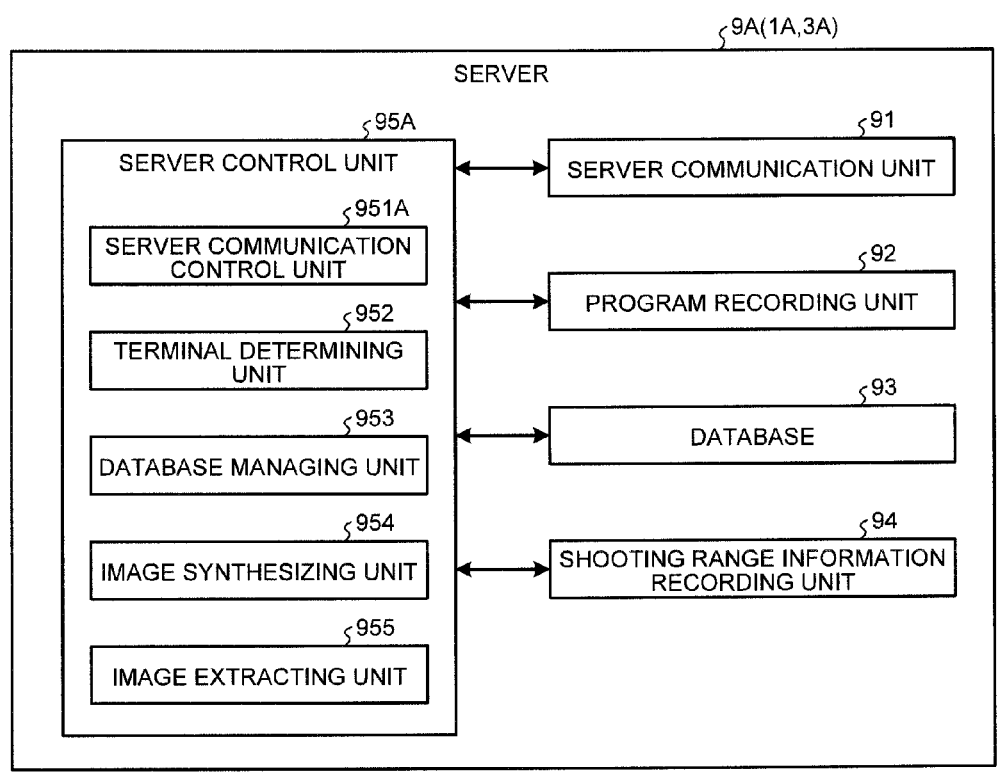
FIG. 17 is a block diagram illustrating a configuration of a server according to the second embodiment of the present invention.

FIG. 17 is a block diagram illustrating the configuration of the server 9A.

In the server 9A according to this second embodiment, a part of the function of the server control unit 95 of the server 9 (FIG. 5) described in the above first embodiment has been changed.

Specifically, a server control unit 95A composing the server 9A according to this second embodiment includes, in contrast to the server control unit 95 described in the above first embodiment, an image extracting unit 955 added thereto and a server communication control unit 951A, which is the server communication control unit 951 with a part of its function having been changed, as well as the terminal determining unit 952, the database managing unit 953, and the image synthesizing unit 954.

The image extracting unit 955 extracts, based on the area information received from the communication device 6A via the server communication unit 91, an area based on the area information from a composite image corresponding to the composite image data generated by the image synthesizing unit 984 to generate extracted image data added with a third time stamp included in the composite image data.

The server communication control unit 951A has, in addition to a function similar to that of the server communication control unit 951 described in the above first embodiment, the following function.

That is, the server communication control unit 951A transmits, according to an access signal (an extracted image transmission request (including the area information, and the identification information of the communication device 6A)) transmitted from the communication device 6A via the Internet network N, the extracted image data (including the third time stamp) generated by the image extracting unit 955, to the communication device 6A.

Operations of Imaging System

Next, operations of the imaging system 1A according to this second embodiment will be described.

Operations of the auxiliary imaging devices 8 according to this second embodiment are the same as the operations (FIG. 13) of the auxiliary imaging devices 8 described in the above first embodiment. Therefore, hereinafter, operations of each of the imaging device main body 4A, the communication device 6A, and the server 9A according to this second embodiment will be described.

Operations of Imaging Device Main Body

Figure 18:
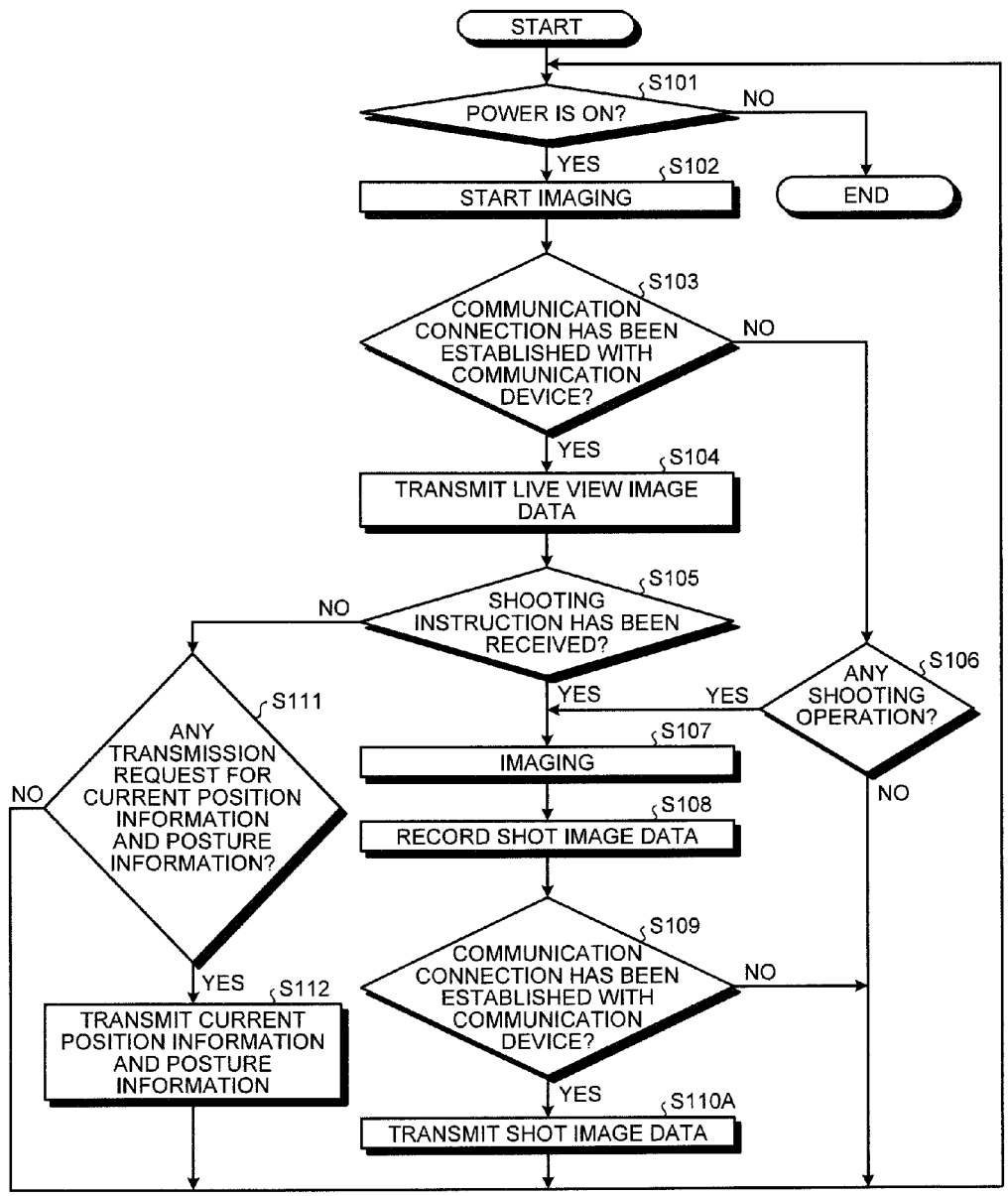
FIG. 18 is a flow chart illustrating operations of the imaging device main body illustrated in FIG. 15.

FIG. 18 is a flow chart illustrating the operations of the imaging device main body 4A.

The operations of the imaging device main body 4A according to this second embodiment are, as illustrated in FIG. 18, different from the operations (FIG. 7) of the imaging device main body 4 described in the above first embodiment only in that Step S110A has been added instead of Step S110, and Steps S111 and S112 have been added. Therefore, hereinafter, only Steps S110A, S111, and S112 will be described.

Step S110A is executed if, at Step S109, it is determined that communication connection has been established with the communication device 6A (Step S109: Yes).

Specifically, at Step S110A, the main body control unit 52A transmits, via the main body communication unit 49, only the latest shot image data (including the first time stamp) recorded in the main body recording unit 48, to the communication device 6A. Thereafter, the imaging device main body 4A returns to Step S101.

If, at Step S109, it is determined that the communication connection with the communication device 6A has not been established (Step S109: No), the imaging device main body 4A transmits the shot image data (including the first time stamp) planned to be transmitted in Step S110A, to the communication device 6A as communication connection with the communication device 6A is established.

Step S111 is executed if, at Step S105, it is determined that a shooting instruction has not been received (Step S105: No).

Specifically, the main body control unit 52A determines, at Step S111, whether or not a transmission request for current position information and posture information has been received from the communication device 6 via the main body communication unit 49.

If it is determined that the transmission request for the current position information and posture information has not been received (Step S111: No), the imaging device main body 4A returns to step S101.

On the contrary, if it is determined that the transmission request for the current position information and posture information has been received (Step S111: Yes), the main body control unit 52A transmits the current position information and posture information respectively acquired by the position acquiring unit 50 and posture acquiring unit 51 upon receipt of the transmission request, to the communication device 6A (Step S112). Thereafter, the imaging device main body 4A returns to Step S101.

Operations of Communication Device

Figure 19:
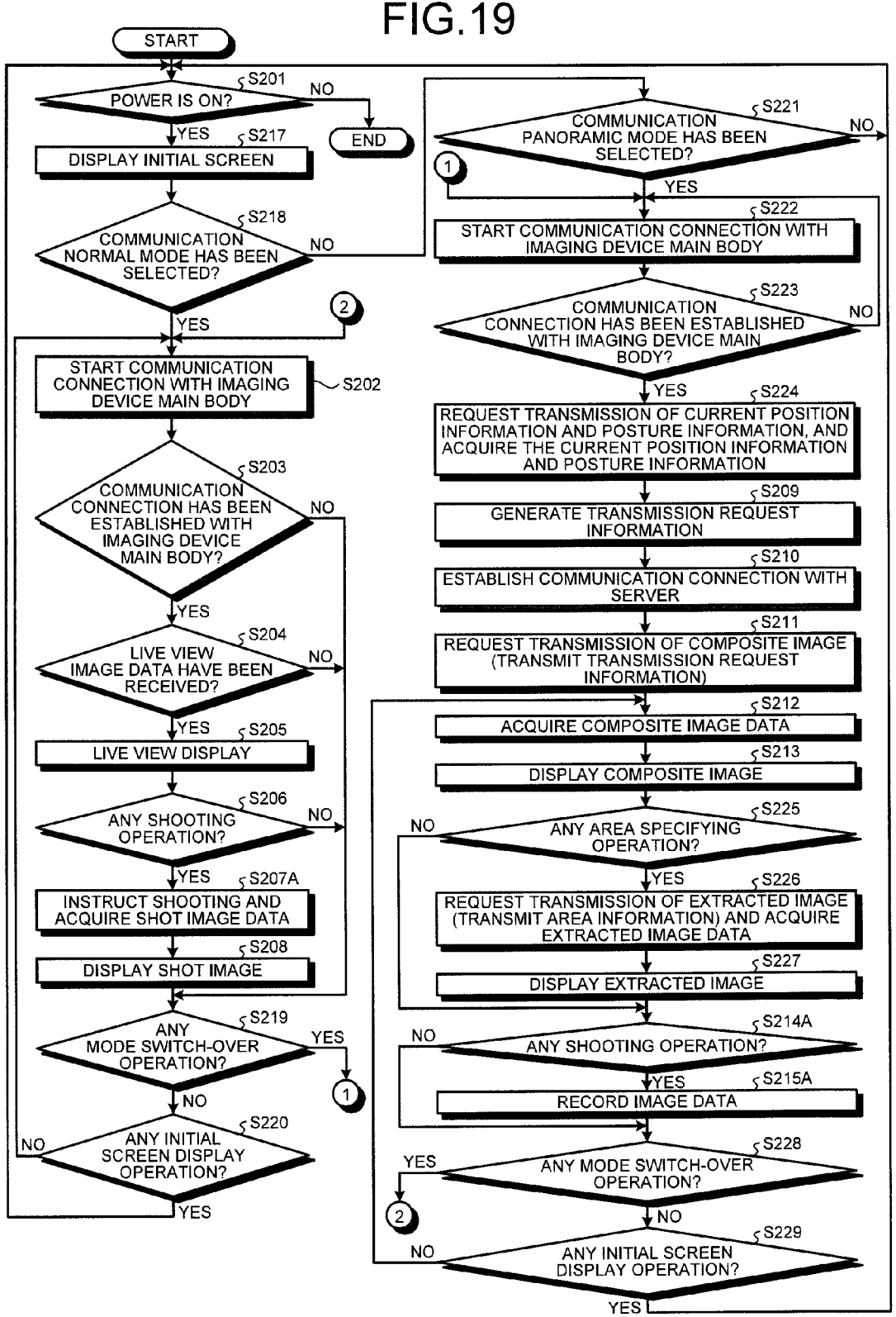
FIG. 19 is a flow chart illustrating operations of the communication device illustrated in FIG. 16.

FIG. 19 is a flow chart illustrating the operations of the communication device 6A.

The operations of the communication device 6A according to this second embodiment are, as illustrated in FIG. 19, different from the operations (FIG. 9) of the communication device 6 described in the above first embodiment only in that Step S216 has been omitted, Steps S207A, S214A, and S215A have been added instead of Steps S207, S214, and S215, and Steps S217 to S229 have been added. Therefore, hereinafter, only Steps S207A, S214A, S215A, and S217 to S229 will be described.

Step S217 is executed after power of the communication device 6A is turned ON at Step S201 (Step S201: Yes).

Specifically, at Step S217, the device display control unit 684A causes the display unit 62 to display an initial screen prompting a selection from various modes (communication normal mode and communication panoramic mode).

Subsequently, the device control unit 68A determines whether or not "communication normal mode" has been selected by an operation on the input unit 61 by a camera user (Step S218).

If it is determined that "communication normal mode" has been selected (Step S218: Yes), the communication device 6A proceeds to Step S202.

On the contrary, if it is determined that "communication normal mode" has not been selected (Step S218: No), the communication device 6A proceeds to Step S221.

Step S207A is executed if, at Step S206, it is determined that a shooting operation has been made (Step S206: Yes).

Specifically, at Step S207A, the imaging control unit 682 transmits the shooting instruction (including the transmission request for the shot image data acquired by the shooting), via the device communication unit 67, to the imaging device main body 4A, and records the shot image data transferred from the imaging device main body 4A, into the image data recording unit 662. Thereafter, the communication device 6A returns to Step S208.

Figure 20:
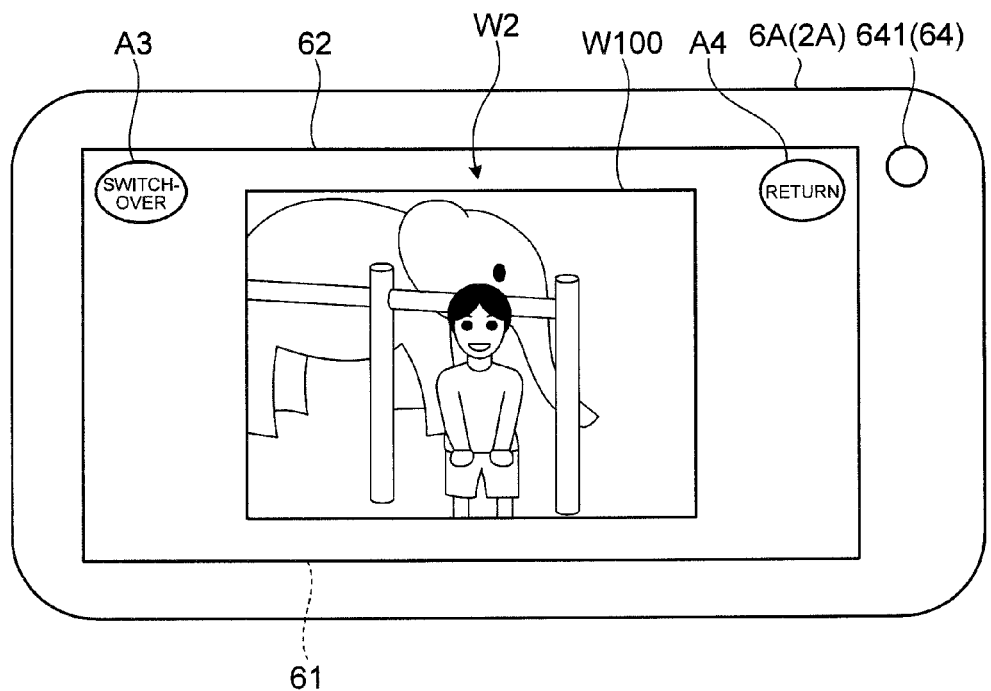
FIG. 20 is a diagram illustrating an example of a screen displayed in Step S208 illustrated in FIG. 19 in the use mode illustrated in FIG. 6.

FIG. 20 is a diagram illustrating an example of a screen W2 displayed in Step S208 in the use mode illustrated in FIG. 6.

For example, at Step S208, the device display control unit 684A causes the display unit 62 to display the screen W2 illustrated in FIG. 20.

On this screen W2, as illustrated in FIG. 20, an operating icon A3 for receiving a mode switch-over operation (first or third user operation) for switching over modes (communication normal mode and communication panoramic mode), an operating icon A4 for receiving an initial screen display operation for returning the displayed screen to the initial screen, and the shot image W100 corresponding to the shot image data transferred from the imaging device main body 4A are displayed.

Step S219 is executed: after Step S208; if it is determined at Step S203 that the communication connection has not been established with the imaging device main body 4A (Step S203: No); if at Step S204 it is determined that the live view image data have not been received (Step S204: No); or if at Step S206 it is determined that the shooting operation has not been made (Step S206: No).

Specifically, at Step S219, the device control unit 68A determines whether or not a mode switch-over operation (a touch on the operating icon A3 by an operation on the touch panel (input unit 61) in the example of FIG. 20) has been made on the input unit 61 by a camera user.

If it is determined that the mode switch-over operation has been made (Step S219: Yes), the communication device 6A proceeds to Step S222 and the communication normal mode is switched over to the communication panoramic mode.

On the contrary, if it is determined that the mode switch-over operation has not been made (Step S219: No), the device control unit 68A determines whether or not an initial screen display operation (a touch on the operating icon A4 by an operation on the touch panel (input unit 61) in the example of FIG. 20) has been made by a camera user (Step S220).

If it is determined that the initial screen display operation has been made (Step S220: Yes), the communication device 6A returns to Step S201 and displays the initial screen at Step S217.

On the contrary, if it is determined that the initial screen display operation has not been made (Step S220: No), it returns to Step S202 and continues the mode that has been set already (communication normal mode).

Step S221 is executed if, at Step S218, it is determined that "communication normal mode" has not been selected (Step S218: No).

Specifically, at Step S221, the device control unit 68A determines whether or not "communication panoramic mode" has been selected by an operation (first user operation) on the input unit 61 by a camera user.

If it is determined that "communication panoramic mode" has not been selected (Step S221: No), the communication device 6A returns to Step S201.

On the contrary, if it is determined that "communication panoramic mode" has been selected (Step S221: Yes), the device communication control unit 681A starts communication connection with the imaging device main body 4A (Step S222) and determines whether or not the communication connection has been established (Step S223), similarly to Steps S202 and S203.

If it is determined that the communication connection with the imaging device main body 4A has not been established (Step S223: No), the communication device 6A returns to Step S222.

On the contrary, if it is determined that the communication connection with the imaging device main body 4A has been established (Step S223: Yes), the device communication control unit 681A, via the device communication unit 67, requests the imaging device main body 4A to transmit current position information and posture information, and stores the current position information and posture information transferred from the imaging device main body 4A, into the device memory unit 65 (Step S224). Thereafter, the communication device 6A proceeds to Step S209.

Step S225 is executed after Step S213.

Figure 21:
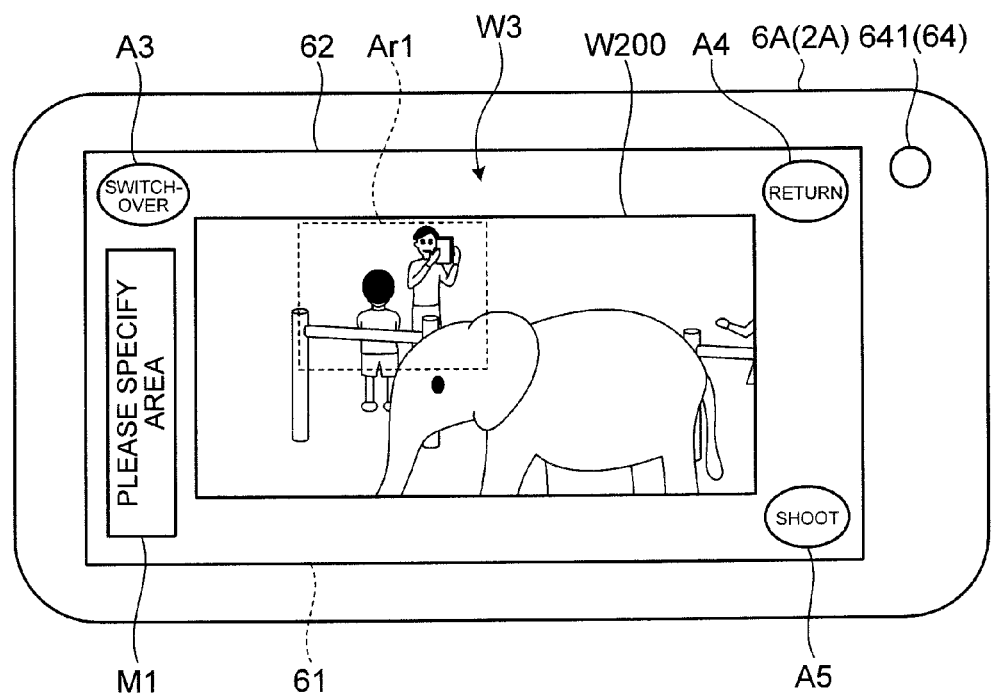
FIG. 21 is a diagram illustrating an example of a screen displayed in Step S213 illustrated in FIG. 19 in the use mode illustrated in FIG. 6.

FIG. 21 is a diagram illustrating an example of a screen W3 displayed in Step S213 in the use mode illustrated in FIG. 6.

For example, at Step S213, the device display control unit 684A causes the display unit 62 to display the screen W3 illustrated in FIG. 21.

On this screen W3, as illustrated in FIG. 21, in addition to the operating icons A3 and A4 illustrated in FIG. 20, an operating icon A5 for receiving a shooting operation, a composite image W200 corresponding to the composite image data transferred from the server 9A, and a message image M1 prompting specification of a partial area of the composite image W200 are displayed.

At Step S225, the device control unit 68A then determines whether or not an area specifying operation (specification of an area Ar1 by a pinch operation on the touch panel (input unit 61) in the example of FIG. 21) specifying a partial area of the composite image has been made on the input unit 61 by a camera user.

If it is determined that the area specifying operation has not been made (Step S225: No), the communication device 6A proceeds to Step S214A.

On the contrary, if it is determined that the area specifying operation has been made (Step S225: Yes), the device communication control unit 681A: transmits an access signal (an extracted image transmission request (including the identification information of the communication device 6A itself)) and area information (including the third time stamp included in the composite image data upon the specification of the area) related to the area specified by the area specifying operation, to the server 9A connected to the Internet network N, via the device communication unit 67; receives the extracted image data (including the third time stamp) from the server 9A (Step S226); and stores the received extracted image data (including the third time stamp) into the device memory unit 65.

Subsequently, the device display control unit 684A causes the display unit 62 to display an extracted image (an image in the area Ar1 in the example of FIG. 21) corresponding to the latest extracted image data stored in the device memory unit 65 (Step S227).

Subsequently, the imaging control unit 682A determines whether or not a shooting operation has been made on the input unit 61 by a camera user (Step S214A). If it is determined in Step S225 that the area specifying operation has not been made (Step S225: No), the same Step S214A (determination of whether or not the operating icon A5 has been touched by an operation on the touch panel (input unit 61) in the examples of FIG. 21) is also executed.

If it is determined that the shooting operation has not been made (Step S214A: No), the communication device 6A proceeds to Step S228.

On the contrary, if it is determined that the shooting operation has been made (Step S214A: Yes), the imaging control unit 682A records the latest composite image data or extracted image data stored in the device memory unit 65, into the image data recording unit 662 (Step S215A).

Subsequently, similarly to Step S219, the device control unit 68A determines whether or not a mode switch-over operation (a touch on the operating icon A3 by an operation on the touch panel (input unit 61) in the example of FIG. 21) has been made on the input unit 61 by a camera user (Step S228). If, at Step S214A, it is determined that the shooting operation has not been made (Step S214A: No), the same Step S228 is also executed.

If it is determined that the mode switch-over operation has been made (Step S228: Yes), the communication device 6A proceeds to Step S202 and the communication panoramic mode is switched over to the communication normal mode.

On the contrary, if it is determined that the mode switch-over operation has not been made (Step S228: No), similarly to Step S220, the device control unit 68A determines whether or not an initial screen display operation (a touch on the operating icon A4 by an operation on the touch panel (input unit 61) in the example of FIG. 21) has been made by a camera user (Step S229).

If it is determined that the initial screen display operation has been made (Step S229: Yes), the communication device 6A returns to Step S201 and displays the initial screen at Step S217.

On the contrary, if it is determined that the initial screen display operation has not been made (Step S229: No), it returns to Step S212 and continues the mode that has been set already (communication panoramic mode).

Operations of Sever

Figure 22:
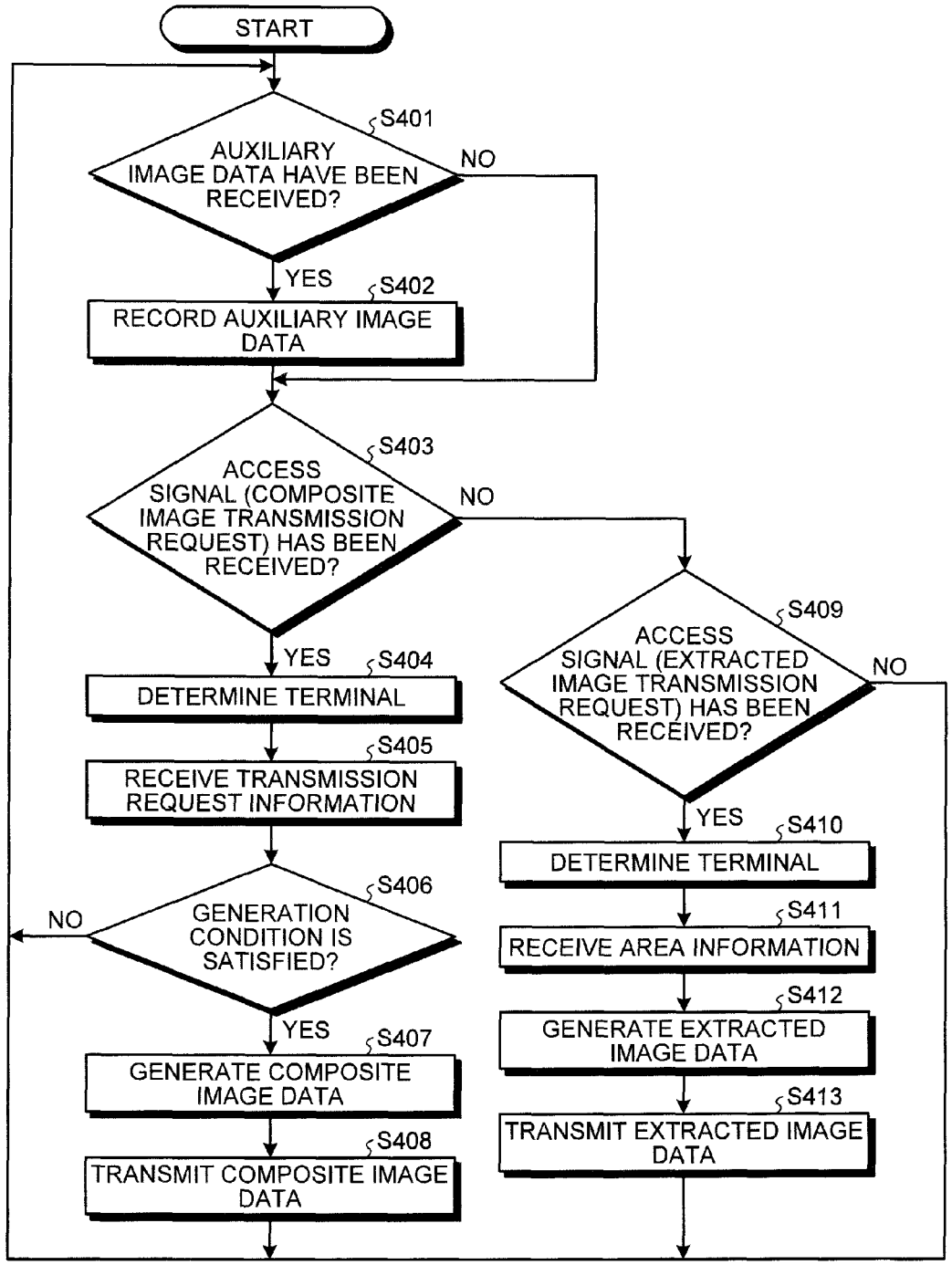
FIG. 22 is a flow chart illustrating operations of the server illustrated in FIG. 17.

FIG. 22 is a flow chart illustrating the operations of the server 9A.

The operations of the server 9A according to this second embodiment are, as illustrated in FIG. 22, different from the operations (FIG. 14) of the server 9 described in the above first embodiment, only in that Steps S409 to S413 have been added. Therefore, hereinafter, only Steps S409 to S413 will be described.

Step S409 is executed if, at Step S403, it is determined that an access signal (composite image transmission request) has not been received (Step S403: No).

Specifically, the server communication control unit 951A determines, at Step S409, whether or not an access signal (extracted image transmission request (including the identification information of the communication device 6A)) has been received from the communication device 6A via the server communication unit 91 and the Internet network N.

If it is determined that the access signal (extracted image transmission request) has not been received (Step S409: No), the server 9A returns to step S401.

On the contrary, if it is determined that the access signal (extracted image transmission request) has been received (Step S409: Yes), the terminal determining unit 952 identifies, based on the access signal, the communication device 6A of the transmission source that has made the access thereto (Step S410).

Subsequently, the server communication control unit 951A receives, via the server communication unit 91 and the Internet network N, the area information (including the third time stamp) from the communication device 6A (Step S411).

Subsequently, the image extracting unit 955 generates extracted image data by: extracting, based on the area information (including the third time stamp) received in Step S411, from a composite image corresponding to composite image data, which were generated in Step S407 and added with a third time stamp indicating approximately the same date and time as those of the third time stamp added to the area information, an area based on the area information; and adding thereto the third time stamp included in the composite image data (Step S412).

Subsequently, the server communication control unit 951A transmits, via the server communication unit 91 and the Internet network N, the extracted image data (including the third time stamp) generated in Step S412, to the communication device 6A identified in Step S410 (Step S413). Thereafter, the communication device 6A returns to Step S401.

Of course, since what is expected here is acquirement of a beautiful image as an auxiliary image so that the environment enjoyed by the shooter is able to be recalled later, the shooting spot and shooting direction are not necessarily limited. For example, satisfaction of a user is not believed to be obtained if shooting results of the timings at which the eyes were closed by blinking are collected, and thus an auxiliary image may be obtained by selecting the best timing or selecting the one with the optimum expression and pose. Further, the angle of view may be appropriately changed according to the composition and how much of the subject is taken.

If results of combining a plurality of images by high image quality shooting, characterized by background blurring, sharp focusing, and the like, are able to be extracted and received, various limitations are able to be omitted and even more various applications become possible. For example, even if yourself is not photographed therein, an image of a bird that sang then in the distance may be acquired. In this case, an event that occurred around the shooting time may be determined by a change in the image or a change in sound, and a shooting result triggered by the determination may be acquired. Thereby, just by hearing the song of a bird, how the markings of the bird that was singing looked is able to be experienced, and thus breadth of experience is able to be increased and the shot time is able to be lively recalled. That is, what a user felt in that shooting environment with the five senses may be determined by various sensors provided in a device carried by the user and auxiliary shooting may be initiated by that determination and association with an image shot by the user may be performed. Further, for simplification, description with respect to the same timing has been made, but the same timing is not necessarily anything to be particular about, with respect to the shooting operation of the user and the shooting of the auxiliary image. For example, by combining an image of a zoo without any visitors after the user has left, the user (shooter) is able to think of the place that is without the user. That is, a device or a system may be configured, which includes a shooting situation acquiring unit that acquires a shooting situation including a position of that portable device and a time, and in which the request information generating unit performs the generation of the transmission request information triggered by a characteristic situational change in the shooting situation acquired by the shooting situation acquiring unit around the reception of the first user operation by the operation reception unit.

According to the above described second embodiment, in addition to effects similar to those of the above first embodiment, the following effects are achieved.

The imaging device 2A according to this second embodiment sequentially switches over to the communication normal mode or communication panoramic mode, according to mode switch-over operations on the input unit 61 by a camera user. The imaging device 2A displays an image (live view image, or shot image) imaged by the imaging device main body 4A in the communication normal mode and displays a composite image provided by the image providing apparatus 3A in the communication panoramic mode.

Therefore, by the imaging device 2A and the image providing apparatus 3A according to this second embodiment, a camera user is able to acquire a live view image, a shot image, and a composite image, by a mode switch-over operation, even without performing a shooting operation, and thus user friendliness is able to be improved further.

Further, the imaging device 2A according to this second embodiment transmits, if an area specifying operation has been made on the input unit 61 by a camera user when a composite image is being displayed, area information related to the specified area, to the image providing apparatus 3A. If the image providing apparatus 3A receives the area information from the imaging device 2A, the image providing apparatus 3A extracts, from composite image data, extracted image data corresponding to an area based on the area information, and transmits the extracted image data to the imaging device 2A. The imaging device 2A then receives the extracted image data from the image providing apparatus 3A.

Therefore, by the imaging device 2A and image providing apparatus 3A according to this second embodiment, a camera user is able to easily acquire an extracted image of an area required according to the camera user's taste by an area specifying operation and user friendliness is able to be improved further.

Modified Example of Second Embodiment

In the above described second embodiment, a configuration in which the function of the image extracting unit 955 composing the server 9A is provided in the communication device 6A instead of the server 9A, may be adopted.

Third Embodiment

Next, a third embodiment of the present invention will be described.

In the description below, to configurations and steps that are the same as those of the above described first and second embodiments, the same signs will be appended, and detailed description thereof will be omitted or simplified.

An imaging system according to this third embodiment has a process of generating transmission request information, a generation condition determining process, and a composite image generating process, which are different from those by the imaging system 1 (FIG. 1) described in the above first embodiment. Further, the imaging system according to this third embodiment is configured to generate, similarly to the imaging system 1A according to the above second embodiment, an extracted image according to an area specifying operation on a communication device by a camera user.

Configuration of Imaging System

Hereinafter, an imaging system 1B (imaging device 2B and image providing apparatus 3B) according to this third embodiment will be described.

Configurations of the imaging device main body 4 and attachment 7 composing the imaging device 2B are the same as those of the imaging device main body 4 (FIG. 2) and attachment 7 (FIG. 1) described in the above first embodiment. Further, the auxiliary imaging devices 8 composing the image providing apparatus 3B have the same configuration as that of the auxiliary imaging devices 8 (FIG. 1 and FIG. 4) described in the above first embodiment. Therefore, hereinafter, configurations of a communication device 6B composing the imaging device 2B, and a server 9B composing the image providing apparatus 3B will be described.

Configuration of Communication Device

Figure 23:
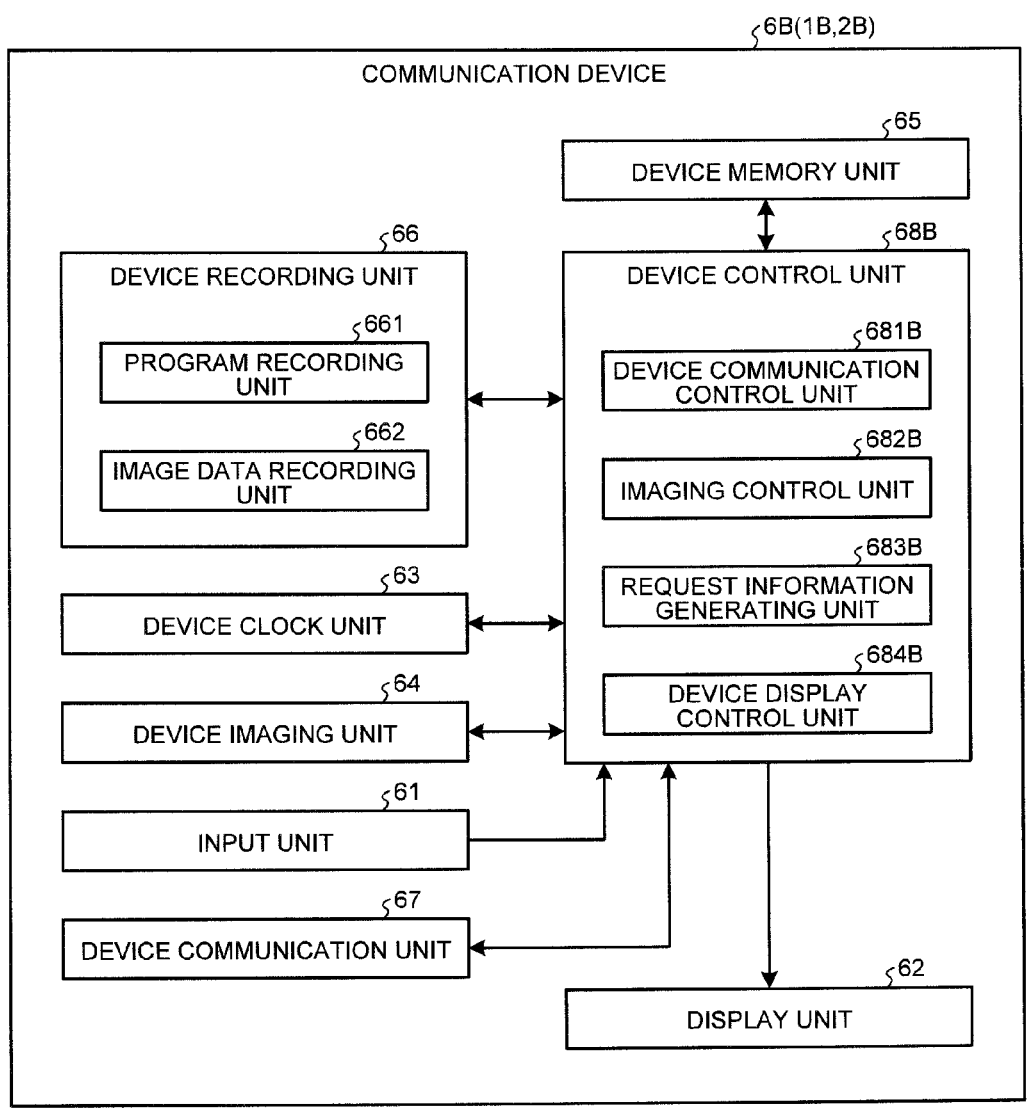
FIG. 23 is a block diagram illustrating a configuration of a communication device according to a third embodiment of the present invention.

FIG. 23 is a block diagram illustrating the configuration of the communication device 6B.

In the communication device 6B according to this third embodiment, a part of the function of the device control unit 68 of the communication device 6 (FIG. 3) described in the above first embodiment has been changed.

Specifically, a device control unit 68B composing the communication device 6B according to this third embodiment includes, as illustrated in FIG. 23, in contrast to the device control unit 68 described in the above first embodiment, a device communication control unit 681B, an imaging control unit 682B, a request information generating unit 683B, and a device display control unit 684B, which correspond to the device communication control unit 681, the imaging control unit 682, the request information generating unit 683, and the device display control unit 684 with parts of their functions having been changed.

The device communication control unit 681B has, in addition to a function similar to that of the device communication control unit 681 described in the above first embodiment, the following function.

That is, the device communication control unit 681B transmits, via the device communication unit 67, according to an area specifying operation (an operation (second user operation) for specifying a partial area of a composite image) and a composite position specifying operation (an operation for specifying a position where an image of the partial area is placed in a shot image) on the input unit 61 by a camera user, area information related to the area, to the server 9B connected to the Internet network N, and receives extracted image data from the server 9B.

The imaging control unit 682B has, in addition to a function similar to that of the imaging control unit 682 described in the above first embodiment, the following function.

That is, the imaging control unit 682B records, in a state where a resynthesized image is being displayed on the display unit 62 by the device display control unit 684B, according to a shooting operation on the input unit 61 by a camera user, resynthesized image data corresponding to the resynthesized image, into the image data recording unit 662. Further, in a state where the communication device 6B is set in the camera communication mode, the imaging control unit 682B causes, according to a shooting operation on the operating unit 44 or input unit 61 by the camera user, the device imaging unit 64 to image the camera user (shooter) as a subject and stores in-camera image data (including a second time stamp) generated by the imaging into the device memory unit 65.

The request information generating unit 683B generates, in a state where the communication device 6B is set in the camera communication mode, transmission request information different from the transmission request information described in the above first embodiment.

Specifically, the request information generating unit 683B reads out the in-camera image data (including the second time stamp) that have been imaged by the device imaging unit 64 according to the shooting operation on the operating unit 44 or input unit 61 by the camera user and have been stored in the device memory unit 65. Further, the request information generating unit 683B performs a face detecting process on the read in-camera image data and extracts feature information (shape feature information related to a size and a shape of the face outline, eyes, mouth, and the like; shading feature information related to a color and a brightness of the facial skin; and the like) from a detected face area (a face area of the camera user (shooter)). The request information generating unit 683B then generates, as transmission request information, information generated by associating the extracted feature information, and the current position information and posture information transferred from the imaging device main body 4 according to the shooting operation, with one another, and adding thereto date and time information related to a date and a time of the shooting operation. The time and date information is the first time stamp added to the shot image data transferred from the imaging device main body 4 if the shooting operation has been made on the operating unit 44, and is the second time stamp (the second time stamp added to the in-camera image data) generated at the time point of the shooting operation by the device clock unit 63 if the shooting operation has been made on the input unit 61.

The above described feature information is not limited to the feature information of the face area and the feature information may be information on shapes, colors, and the like of the clothes, hat, belongings, or the like.

The device display control unit 684B has, in addition to a function that is the same as that of the device display control unit 684 described in the above first embodiment, the following function.

That is, if extracted image data are received from the server 9B, the device display control unit 684B generates a resynthesized image resulting from placement of the extracted image corresponding to the extracted image data at a composite position specified by a camera user over the shot image. The device display control unit 684B controls the operations of the display unit 62 and causes the display unit 62 to display the generated resynthesized image.

Configuration of Sever

Figure 24:
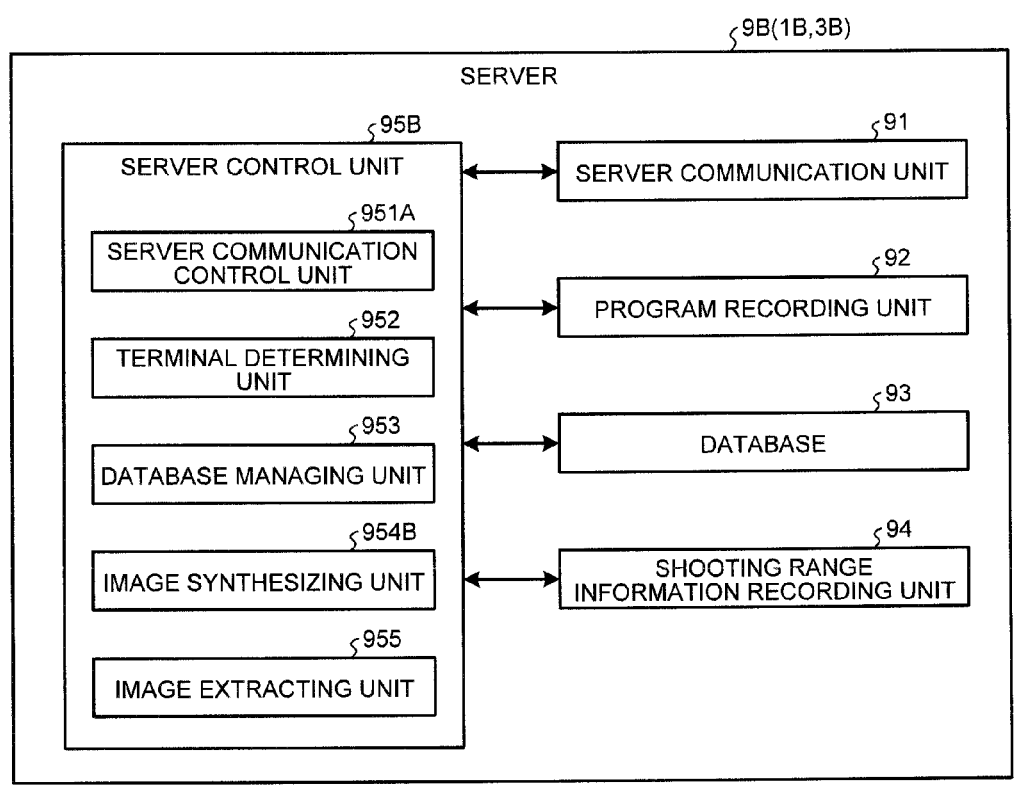
FIG. 24 is a block diagram illustrating a configuration of a server according to the third embodiment of the present invention.

FIG. 24 is a block diagram illustrating the configuration of the server 9B.

In the server 9B according to this third embodiment, a part of the function of the server control unit 95 of the server 9 (FIG. 5) described in the above first embodiment has been changed.

Specifically, a server control unit 95B composing the server 9B according to this third embodiment includes, in contrast to the server control unit 95 described in the above first embodiment, in addition to the terminal determining unit 952 and database managing unit 953, an image synthesizing unit 954B, which is the image synthesizing unit 954 with a part of its function having been changed, and the server communication control unit 951A and image extracting unit 955 described in the second embodiment.

Since transmission request information thereof is different from the transmission request information described in the above first embodiment, the image synthesizing unit 954B executes "generation condition determining process" and "composite image generating process" different from "generation condition determining process" and "composite image generating process" described in the above first embodiment.

Details of "generation condition determining process" and "composite image generating process" according to this third embodiment will be described when later described operations of the server 9B are described.

Operations of Imaging System

Next, operations of the imaging system 1B according to this third embodiment will be described.

Operations of the imaging device main body 4 and auxiliary imaging devices 8 according to this third embodiment are respectively the same as the operations (FIG. 7 and FIG. 13) of the imaging device main body 4 and auxiliary imaging devices 8 described in the above first embodiment. Therefore, hereinafter, operations of each of the communication device 6B and the server 9B according to this third embodiment will be described.

Operations of Communication Device

Figure 25:
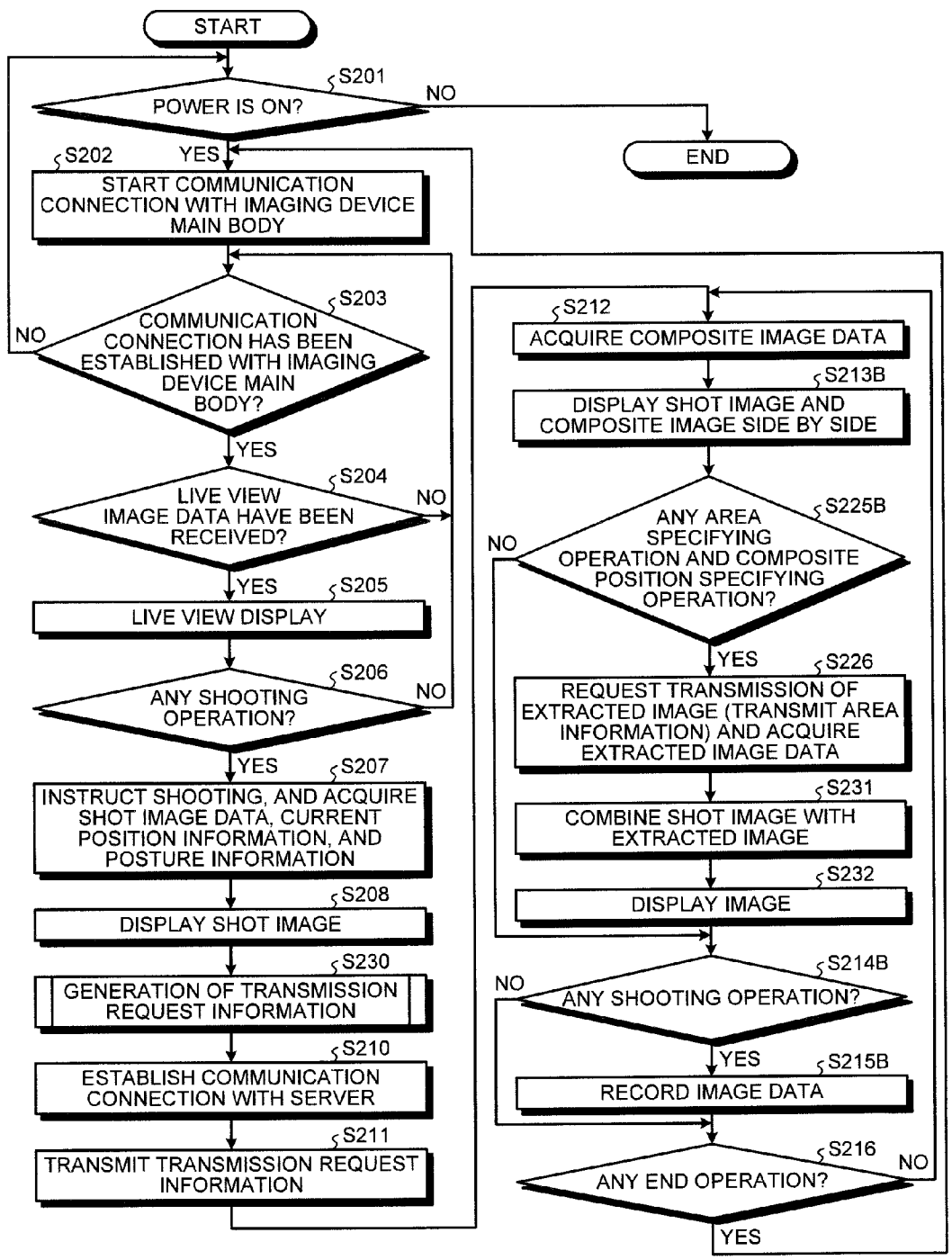
FIG. 25 is a flow chart illustrating operations of the communication device illustrated in FIG. 23.

FIG. 25 is a flow chart illustrating the operations of the communication device 6B.

The operations of the communication device 6B according to this third embodiment are, as illustrated in FIG. 25, different from the operations (FIG. 9) of the communication device 6 described in the above first embodiment only in that instead of Steps S209 and S213 to S215, Steps S230, and S213B to S215B have been added, and Step S225B that is approximately the same as Step S225 described in the above second embodiment, Step S226 described in the above second embodiment, and Steps S231 and S232 have been added. Therefore, hereinafter, only Steps S230, S213B to S215B, S225B, S226, S231, and S232 will be described.

Step S230 is executed after Step S208.

Figure 26:
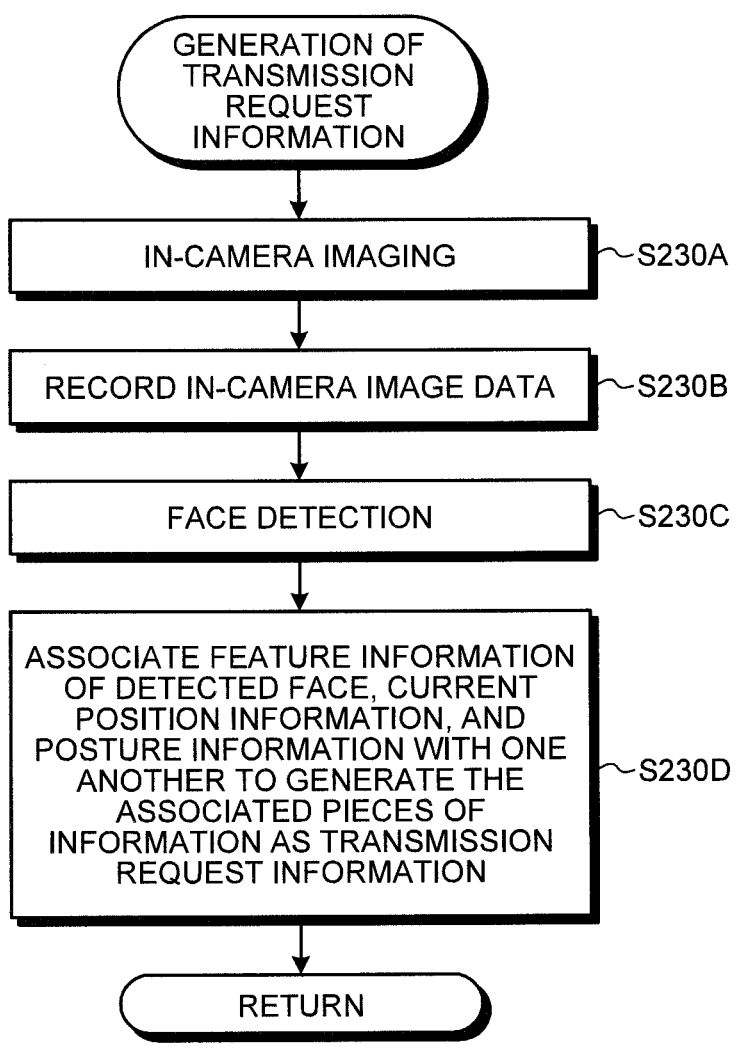
FIG. 26 is a flow chart illustrating a process (Step S230) of generating transmission request information illustrated in FIG. 25.

FIG. 26 is a flow chart illustrating a process (Step S230) of generating transmission request information illustrated in FIG. 25.

The imaging control unit 682B causes the device imaging unit 64 to image (in-camera image) a camera user (the camera user X in the example of FIG. 6) as a subject (Step S230A).

Figure 27:
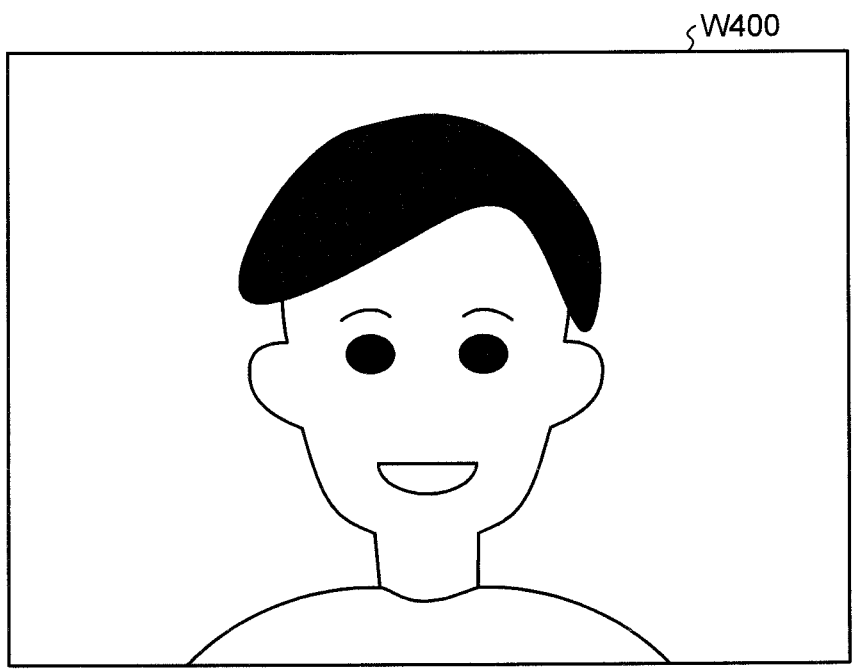
FIG. 27 is a diagram illustrating an example of an in-camera image corresponding to in-camera image data imaged in Step S230A illustrated in FIG. 26 in the use mode illustrated in FIG. 6.

FIG. 27 is a diagram illustrating an example of an in-camera image W400 corresponding to the in-camera image data imaged in Step S230A in the use mode illustrated in FIG. 6.

Subsequently, the imaging control unit 682B stores the in-camera image data (the in camera image W400 illustrated in FIG. 27 in the example of FIG. 6, including the second time stamp) generated by the in-camera imaging, into the device memory unit 65 (Step S230B).

Subsequently, the request information generating unit 683B reads out the in-camera image data stored in Step S230B in the device memory unit 65 and performs a face detecting process on the read in-camera image data (Step S230C).

Subsequently, the request information generating unit 683B extracts feature information in a face area (the face area of the camera user X in the example of FIG. 6 and FIG. 27) detected in Step S230C. The request information generating unit 683B generates, as transmission request information, information generated by associating the extracted feature information with the current position information and posture information transferred from the imaging device main body 4 in Step S207 and adding thereto date and time information related to a date and a time of the shooting operation in Step S206 (Step S230D). Thereafter, the communication device 6B returns to the main routine illustrated in FIG. 25.

Step S213B is executed after Step S212.

Specifically, at Step S213B, the device display control unit 684B causes the display unit 62 to display a shot image corresponding to the latest shot image data recorded in the image data recording unit 662 and a composite image corresponding to the latest composite image data stored in the device memory unit 65, side by side.

Figure 28:
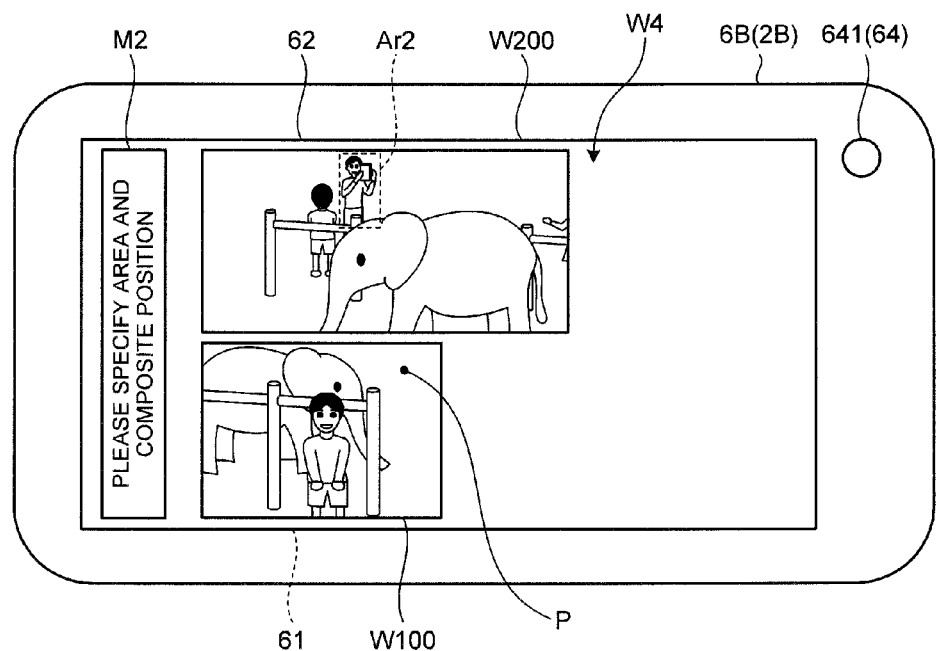
FIG. 28 is a diagram illustrating an example of a screen displayed in Step S213B illustrated in FIG. 25 in the use mode illustrated in FIG. 6.

FIG. 28 is a diagram illustrating an example of a screen W4 displayed in Step S213B in the use mode illustrated in FIG. 6.

For example, at Step S213B, the device display control unit 684B causes the display unit 62 to display the screen W4 illustrated in FIG. 28.

On this screen W4, as illustrated in FIG. 28, the shot image W100 (the same as the shot image W100 illustrated in FIG. 8) corresponding to the latest shot image data, the composite image W200 (the same as the composite image W200 illustrated in FIG. 10) corresponding to the latest composite image data, and a message image M2 prompting a partial area of the composite image W200 to be specified and a position to place an image of the partial area in the shot image W100 to be specified are displayed.

Subsequently, the device control unit 68B determines whether or not an area specifying operation (specification of an area Art by a pinch operation on the touch panel (input unit 61) in the example of FIG. 28) specifying the partial area of the composite image on the input unit 61 by the camera user and a composite position specifying operation (a touch on a composite position P by an operation on the touch panel (input unit 61) in the example of FIG. 28) specifying a position at which the image of the partial area is to be placed in the shot image have been made (Step S225B). As described above, without such operations, a composition or the like may be automatically selected.

If it is determined that the area specifying operation and composite position specifying operation have not been made (Step S225B: No), the communication device 6B proceeds to Step S214B.

On the contrary, if it is determined that the area specifying operation and composite position specifying operation have been made (Step S225B: Yes), the communication device 6B proceeds to Step S226 described in the above second embodiment.

Step S231 is executed after Step S226.

Specifically, at Step S231, the device display control unit 684B generates a resynthesized image generated by placing the extracted image corresponding to the extracted image data transferred from the server 9B in Step S226 at the composite position specified by the camera user in the shot image corresponding to the shot image data transferred from the imaging device main body 4 in Step S207. The device display control unit 684B causes the display unit 62 to display the generated resynthesized image (Step S232).

Figure 29:
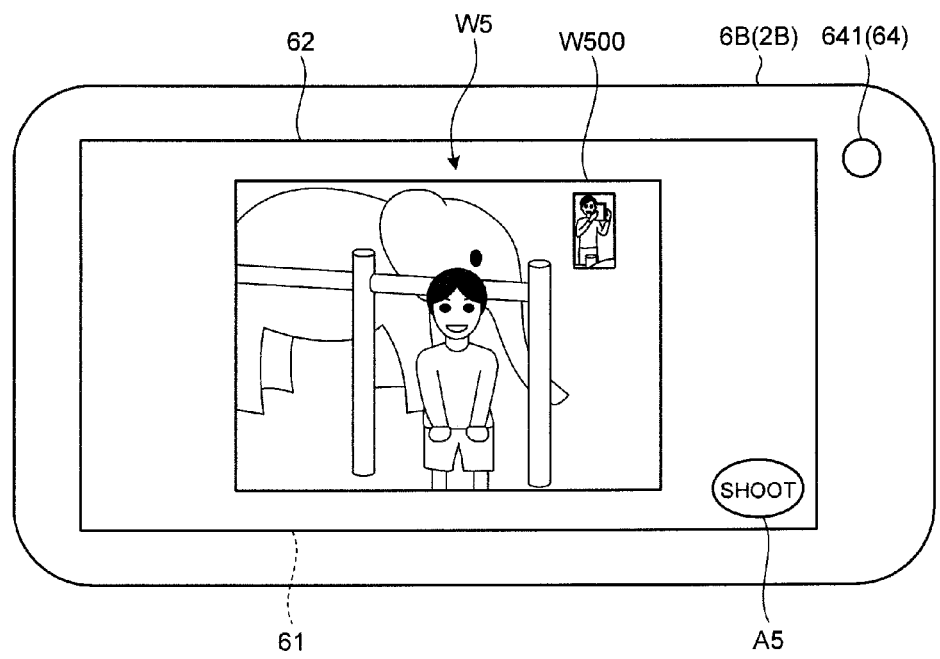
FIG. 29 is a diagram illustrating an example of a screen displayed in Step S232 illustrated in FIG. 25 in the use mode illustrated in FIG. 6.

FIG. 29 is a diagram illustrating an example of a screen W5 displayed at Step S232 in the use mode illustrated in FIG. 6.

For example, at Step S232, the device display control unit 684B causes the display unit 62 to display the screen W5 illustrated in FIG. 29.

On this screen W5, as illustrated in FIG. 29, a resynthesized image W500, in which the extracted image (image of the area Ar2 (FIG. 28)) has been placed at the composite position P (FIG. 28) in the shot image W100, and the operating icon A5 for receiving a shooting operation are displayed.

Step S214B is executed after Step S232, or if at Step S225B, it is determined that the area specifying operation and composite position specifying operation have not been made (Step S225B: No).

Specifically, at Step S214B, the imaging control unit 682B determines whether or not a shooting operation has been made on the input unit 61 by a camera user.

This shooting operation corresponds to, if Step S214B is executed after Step S232, an operation of the operating icon A5 illustrated in FIG. 29 being touched by an operation on the touch panel (input unit 61), for example. Further, if Step S214B is executed after it is determined, at Step S225B, that the area specifying operation and composite position specifying operation have not been made (Step S225B: No), the shooting operation corresponds to an operation of the operating icon A5 illustrated in FIG. 21 being touched by an operation on the touch panel (input unit 61), for example.

If it is determined that shooting operation has not been made (Step S214B: No), the communication device 6B proceeds to Step S216.

On the contrary, if it is determined that the shooting operation has been made (Step S214B: Yes), the imaging control unit 682B records the latest composite image data stored in the device memory unit 65 in Step S212, or the resynthesized image data corresponding to the resynthesize image generated in Step S231, into the image data recording unit 662 (Step S215B). Thereafter, the communication device 6B proceeds to Step S216.

Operations of Server

Figure 30:
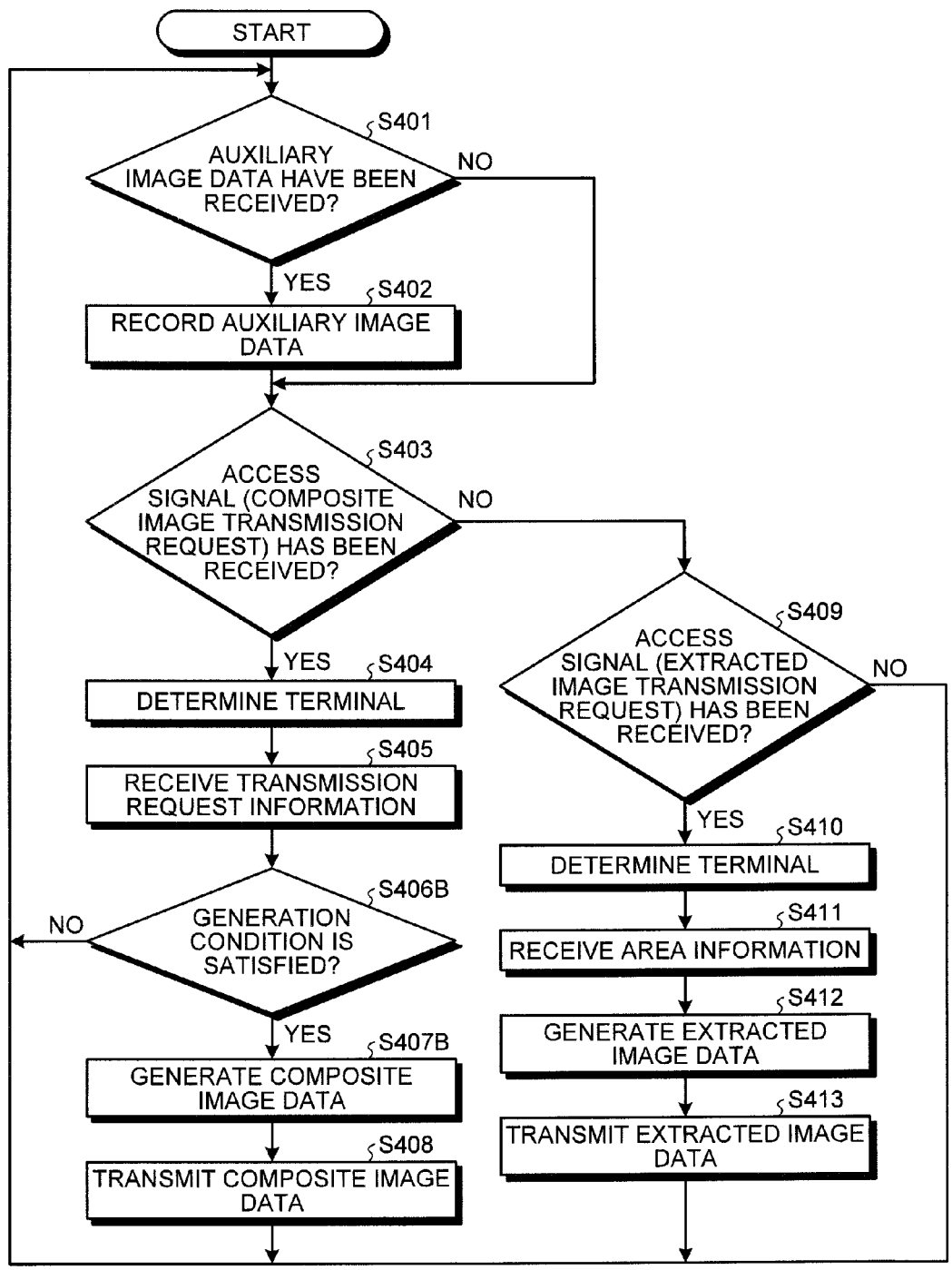
FIG. 30 is a flow chart illustrating operations of the server illustrated in FIG. 24.

FIG. 30 is a flow chart illustrating the operations of the server 9B.

The operations of the server 9B according to this third embodiment are, as illustrated in FIG. 30, different from the operations (FIG. 22) of the server 9A described in the above second embodiment, only in that instead of Steps S406 and S407, Steps S406B and S407B have been added. Therefore, hereinafter, only Steps S406B and S407B will be described.

Step S406B is executed after Step S405.

Specifically, in the generation condition determining process (Step S406B), the image synthesizing unit 954B determines whether or not the plurality of auxiliary image data recorded in the database 93 include auxiliary image data including a subject image having approximately the same feature information as the feature information included in the transmission request information acquired in Step S405 (whether or not the generation condition is satisfied).

If it is determined that the generation condition is not satisfied (the subject image having approximately the same feature information as the feature information is not included in any of the plurality of auxiliary image data recorded in the database 93), the server 9B returns to Step S401.

On the contrary, if it is determined that the generation condition is satisfied (the subject image having approximately the same feature information as the feature information is included in any of the plurality of auxiliary image data recorded in the database 93), the image synthesizing unit 954B executes the composite image generating process (Step S407B).

Specifically, the image synthesizing unit 954B identifies, at Step S407B, the auxiliary image data (including the third time stamp, and the identification information of the auxiliary imaging device 8) including the subject image having approximately the same feature information as the feature information included in the transmission request information, from the plurality of auxiliary image data (including the third time stamps, and the identification information of the auxiliary imaging devices 8) recorded in the database 93. Hereinafter, the identified auxiliary image data will be referred to as "main auxiliary image data". Further, the image synthesizing unit 954B identifies, from the plurality of auxiliary image data (including the third time stamps, and the identification information of the auxiliary imaging devices 8) recorded in the database 93, auxiliary image data, which have been generated by the auxiliary imaging device 8 different from the auxiliary imaging device 8 that has generated the main auxiliary image data, and which have been added with a third time stamp indicating approximately the same date and time as the date and time based on the third time stamp included in the main auxiliary image data. Hereinafter, the identified auxiliary image data will be referred to as "sub auxiliary image data". Further, the image synthesizing unit 954B grasps, based on the current position information and posture information included in the transmission request information, the position and orientation of the imaging device 2 (imaging device main body 4). Furthermore, the image synthesizing unit 954B refers to the three pieces of shooting range information recorded in the shooting range information recording unit 94, and based on the grasped position and orientation of the imaging device 2, predicts whether the subject of the imaging device 2 is included in any of the shooting ranges of the first to third auxiliary imaging devices 8A to 8C. The image synthesizing unit 954B generates composite image data by: combining the main auxiliary image data, with the sub auxiliary image data generated by the auxiliary imaging device 8 predicted to have the shooting range including the subject of the imaging device 2 from the sub auxiliary image data; and adding thereto the third time stamp included in the main auxiliary image data or sub auxiliary image data.

If the image synthesizing unit 954B determines that the subject of the imaging device 2 is not included in any of the shooting ranges of the first to third auxiliary imaging devices 8A to 8C, the image synthesizing unit 954B combines the main auxiliary image data, with the sub auxiliary image data generated by the auxiliary imaging device 8 having the shooting range that is adjacent to the shooting range of the auxiliary imaging device 8 that has generated the main auxiliary image data, from the sub auxiliary image data.

Even if the imaging system 1B is configured as described in the above third embodiment, effects similar to those of the above first and second embodiments are achieved.

Modified Example of Third Embodiment

In the above third embodiment, the request information generating unit 683B performs a face detecting process on in-camera image data and generates, as transmission request information, information (including date and time information) generated as a result of associating feature information in a detected face area with current position information and posture information, but limitation is not made thereto.

For example, the request information generating unit 683B may generate, as the transmission request information, information (including date and time information) generated as a result of associating the in-camera image data with the current position information and posture information, without performing the face detecting process. If configured like that, the image synthesizing unit 954B may have a function of executing the above described face detecting process. Specifically, the image synthesizing unit 954B may perform a face detecting process on the in-camera image data included in the transmission request information to extract feature information in a detected face area. Thereafter, the image synthesizing unit 954B executes "generation condition determining process" and "composite image generating process" described in the above third embodiment.

In the above described third embodiment, a configuration in which the function of the image extracting unit 955 composing the server 9B is provided in the communication device 6B instead of in the server 9B, may be adopted.

In the above described third embodiment, the request information generating unit 683B generates, as the transmission request information, the information generated as a result of associating the feature information, current position information, and posture information with one another and adding thereto the date and time information, but not being limited thereto, the request information generating unit 683B may generate, as the transmission request information, information generated as a result of adding the date and time information only to the feature information.

Fourth Embodiment

Next, a fourth embodiment of the present invention will be described.

In the description below, to configurations and steps, which are the same as those of the above described first embodiment, the same signs will be appended, and detailed description thereof will be omitted or simplified.

In the above described imaging system 1 according to the first embodiment, the communication device 6 acquires the composite image data related to the shot image data from the server 9, according to a shooting operation on the operating unit 44 or input unit 61 by a camera user.

In contrast, in an imaging system according to this fourth embodiment, a communication device is configured to acquire, from a server, composite image data related to shot image data which are to be displayed, according to a display operation (an operation (fourth user operation) for causing a display unit to display a shot image corresponding to the shot image data) on an input unit by a camera user.
Configuration of Imaging System Hereinafter, an imaging system 10 (an imaging device 2C and the image providing apparatus 3) according to this fourth embodiment will be described.

Configurations of the imaging device main body 4 and attachment 7 composing the imaging device 2C are the same as those of the imaging device main body 4 (FIG. 2) and attachment 7 (FIG. 1) described in the above first embodiment. Further, the image providing apparatus 3 according to this fourth embodiment has the same configuration as that of the image providing apparatus 3 (FIG. 1, FIG. 4, and FIG. 5) described in the above first embodiment. Therefore, hereinafter, a configuration of a communication device 6C composing the imaging device 2C will be described.
Configuration of Communication Device FIG. 31 is a block diagram illustrating the configuration of the communication device 6C.

In the communication device 6C according to this fourth embodiment, a part of the function of the device control unit 68 of the communication device 6 (FIG. 3) described in the above first embodiment has been changed.

Figure 31:
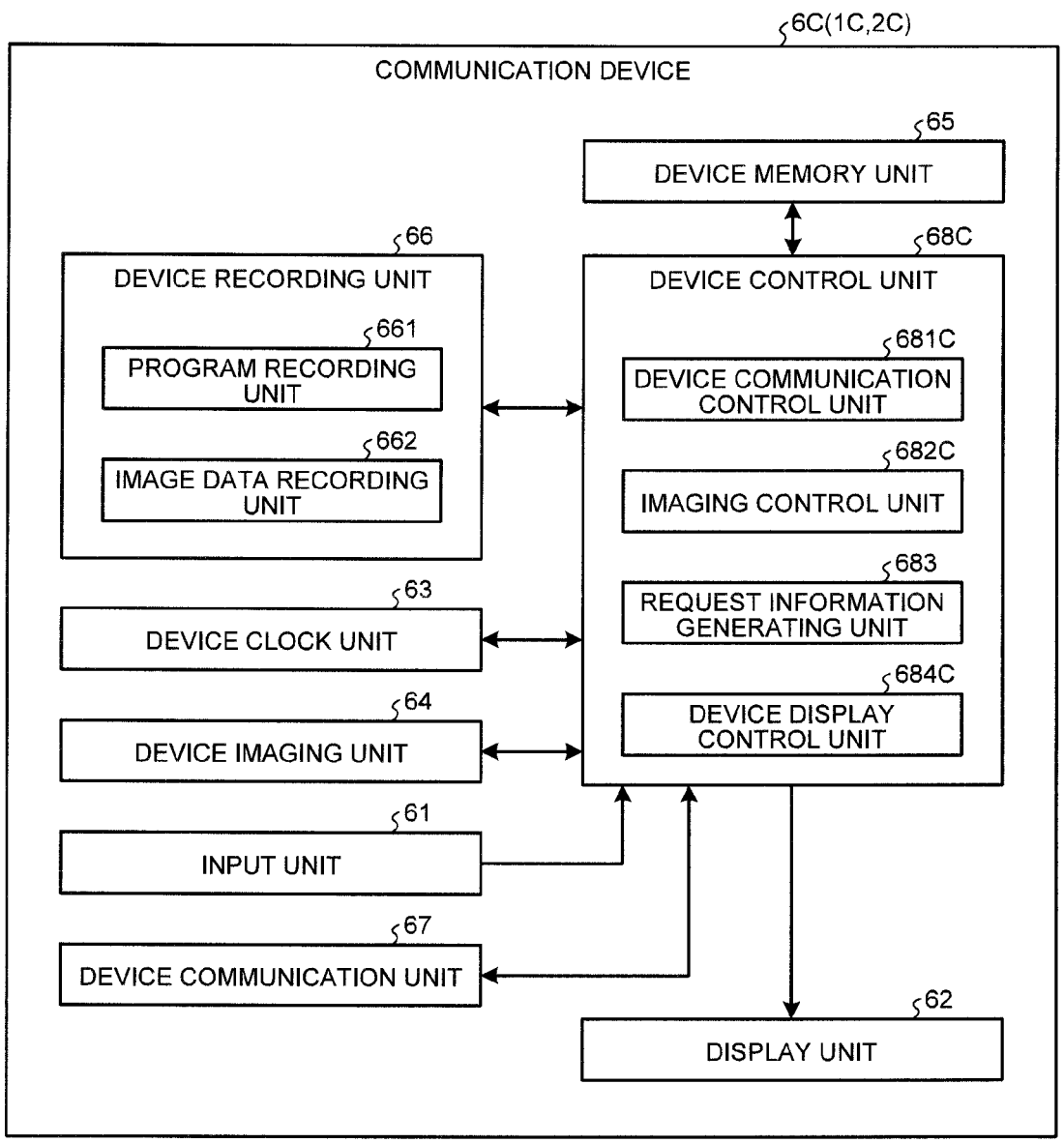
FIG. 31 is a block diagram illustrating a configuration of a communication device according to a fourth embodiment of the present invention.

Specifically, a device control unit 68C composing the communication device 6C according to this fourth embodiment includes, as illustrated in FIG. 31, in addition to the request information generating unit 683, and in contrast to the device control unit 68 described in the above first embodiment, a device communication control unit 681C, an imaging control unit 682C, and a device display control unit 684C, which have been partially changed in their functions from the device communication control unit 681, imaging control unit 682, and device display control unit 684.

A function executed by the device communication control unit 681C when the communication device 6C is set in the camera communication mode has a function omitted therein, the omitted function being for establishing communication connection with the image providing apparatus 3 (server 9) and transmitting and receiving transmission request information and composite image data to and from the server 9.

Further, the device communication control unit 681C executes the following process when the communication device 6C is set in a playback mode (a mode for displaying shot images respectively corresponding to a plurality of shot image data recorded in the image data recording unit 662).

Specifically, if a display operation (an operation for displaying a shot image corresponding to one shot image data of the plurality of shot image data) has been made on the input unit 61 by a camera user, the device communication control unit 681C transmits, based on the location information (URL) recorded in the device recording unit 66, via the device communication unit 67, an access signal (composite image transmission request (including the identification information of the communication device 6C itself)) to the server 9 connected to the Internet network N to establish communication connection with the server 9. The device communication control unit 681C transmits the transmission request information generated by the request information generating unit 683 to the server 9 and receives the composite image data from the server 9.

The imaging control unit 682C has, in addition to the same function as the above described imaging control unit 682 of the first embodiment, the following function.

Specifically, if the transmission request information has been generated by the request information generating unit 683, the imaging control unit 682C records, into the image data recording unit 662, the generated transmission request information in association with the shot image data transferred from the imaging device main body 4 according to the shooting instruction. That is, the image data recording unit 662 has a function as a data recording unit according to the present invention.

The device display control unit 684C has, in addition to the same function as the device display control unit 684 described in the above first embodiment, the following function.

Specifically, if the communication device 6C has been set in the playback mode, the device display control unit 684C causes the display unit 62 to display thumbnails of the shot images respectively corresponding to the plurality of shot image data recorded in the image data recording unit 662. Further, if a display operation (an operation for displaying one shot image of the thumbnail-displayed plurality of shot images with the one shot image being enlarged) is made on the input unit 61 by a camera user while the thumbnails are being displayed, the device display control unit 684C causes the display unit 62 to perform enlarged display of the one shot image to be displayed. Furthermore, if a composite image (composite image data) related to the one shot image to be displayed has been transferred from the server 9, the device display control unit 684C causes the display unit 62 to display the one shot image and the composite image side by side.

The above described communication device 6C corresponds to an image display device according the present invention. Further, the imaging system 10 corresponds to an image display system according to the present invention.

Operations of Imaging System

Next, operations of the imaging system 1C according to this fourth embodiment will be described.

Operations of the imaging device main body 4, auxiliary imaging device 8, and server 9 according to this fourth embodiment are the same as the operations (FIG. 7, FIG. 13, and FIG. 14) of the imaging device main body 4, auxiliary imaging device 8, and server 9 described in the above first embodiment. Therefore, hereinafter, operations of the communication device 6C according to this fourth embodiment will be described.

Operations of Communication Device

Figure 32:
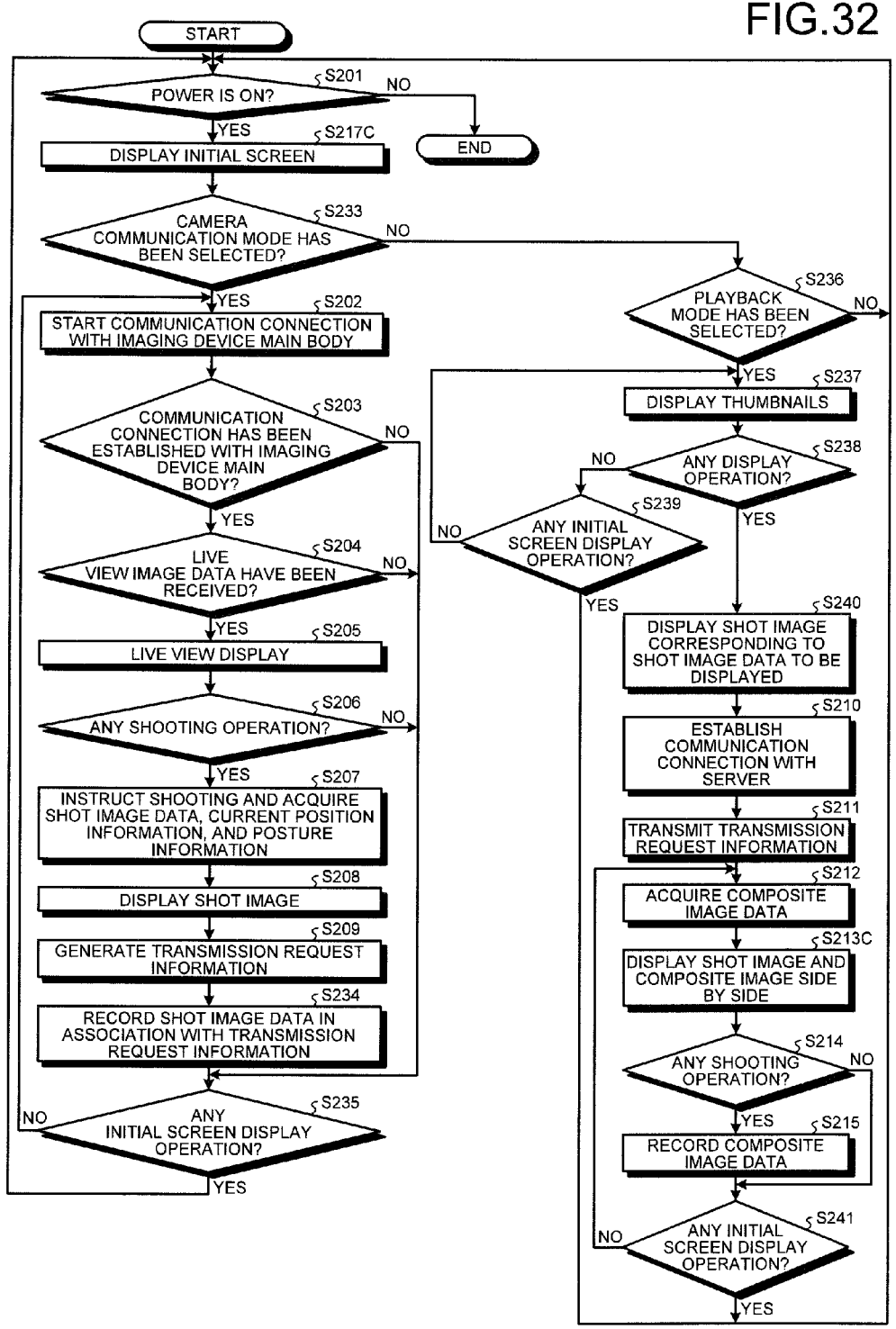
FIG. 32 is a flow chart illustrating operations of the communication device illustrated in FIG. 31.

FIG. 32 is a flow chart illustrating the operations of the communication device 6C.

The operations of the communication device 6C according to this fourth embodiment are, as illustrated in FIG. 32, different from the operations (FIG. 9) of the communication device 6 described in the above first embodiment, only in that: Step S216 has been omitted; Step S213C has been added instead of Step S213; Step S217C that is approximately the same as Step S217 described in the above second embodiment has been added; and Steps S234 to S241 have been added. Therefore, hereinafter, only Steps S213C, 52170, and S234 to S241 will be described.

Step S217C is executed after power of the communication device 6C is turned ON at Step S201 (Step S201: Yes).

Specifically, at Step S217C, the device display control unit 684C causes the display unit 62 to display an initial screen prompting a selection from various modes (camera communication mode and playback mode).

Subsequently, the device control unit 68C determines whether or not "camera communication mode" has been selected by an operation on the input unit 61 by a camera user (Step S233).

If it is determined that "camera communication mode" has been selected (Step S233: Yes), the communication device 6C proceeds to Step S202.

On the contrary, if it is determined that "camera communication mode" has not been selected (Step S233: No), the communication device 6C proceeds to Step S236.

Step S234 is executed after Step S209.

Specifically, at Step S234, the imaging control unit 682C records, into the image data recording unit 662, the transmission request information (current position information and posture information (including date and time information)) generated in Step S209 in association with the shot image data transferred from the imaging device main body 4 in Step S207.

Subsequently, the device control unit 68C determines whether or not an initial screen display operation prompting a selection from various modes (camera communication mode and playback mode) has been made on the input unit 61 by a camera user (Step S235). If at Step S203, it is determined that communication connection has not been established with the imaging device main body 4 (Step S203: No); if at Step S204, it is determined that the live view image data have not been received (Step S204: No); or if at Step S206, it is determined that a shooting operation has not been made (Step S206: No), Step S235 is executed similarly.

If it is determined that the initial screen display operation has been made (Step S235: Yes), the communication device 6C returns to Step S201 and displays the initial screen at Step S217C.

On the contrary, if it is determined that the initial screen display operation has not been made (Step S235: No), the communication device 6C returns to Step S202 and continues the already set mode (camera communication mode).

Step S236 is executed if, at Step S233, it is determined that "camera communication mode" has not been selected (Step S233: No).

Specifically, at Step S236, the device control unit 68C determines whether or not "playback mode" has been selected by an operation on the input unit 61 by a camera user.

If it is determined that "playback mode" has not been selected (Step S236: No), the communication device 6C returns to Step S201.

On the contrary, if it is determined that "playback mode" has been selected (Step S236: Yes), the device display control unit 684C causes the display unit 62 to display thumbnails of shot images respectively corresponding to the plurality of shot image data recorded in the image data recording unit 662 in Step S234 (Step S237).

Subsequently, the device control unit 68C determines whether or not a display operation (an operation for displaying one shot image of the thumbnail-displayed plurality of shot images with the one-shot image being enlarged) on the input unit 61 has been made by a camera user (Step S238).

If it is determined that the display operation has not been made (Step S238: No), the device control unit 68C determines whether or not an initial screen display operation prompting a selection from various modes (camera communication mode and playback mode) has been made on the input unit 61 by a camera user (Step S239).

If it is determined that the initial screen display operation has not been made (Step S239: No), the communication device 6C returns to Step S237 and continues to display the thumbnails.

On the contrary, if it is determined that the initial screen display operation has been made (Step S239: Yes), the communication device 6C returns to Step S201 and displays the initial screen at Step S217C.

If, at Step S238, it is determined that the display operation has been made (Step S238: Yes), the device display control unit 684C causes the display unit 62 to perform enlarged display of a shot image corresponding to the one shot image data to be displayed according to the display operation (Step S240: display step). Thereafter, the communication device 6C proceeds to Step S210. The device communication control unit 681C establishes communication connection with the server 9 (Step S210), transmits to the server 9 the transmission request information (the current position information and posture information (including date and time information)) associated with the one shot image data to be displayed according to the display operation in Step S238 (Step S211: communication step), and acquires composite image data from the server 9 (Step S212: communication step).

Subsequently, the device display control unit 684C causes the display unit 62 to display, together with the shot image that has been subjected to the enlarged display in Step S240, a composite image corresponding to the composite image data acquired in Step S212, side by side (Step S213C). Thereafter, the communication device 6C proceeds to Step S214.

Step S241 is executed, after Step S215, or if, at Step S214, it is determined that a shooting operation has not been made (Step S214: No).

Specifically, at Step S241, the device control unit 68C determines whether or not an initial screen display operation prompting a selection from various modes (camera communication mode and playback mode) has been made on the input unit 61 by a camera user.

If it is determined that the initial screen display operation has not been made (Step S241: No), the communication device 6C returns to Step S212.

On the contrary, if it is determined that the initial screen display operation has been made (Step S241: Yes), the communication device 6C returns to Step S201 and displays the initial screen at Step S217C.

Even if the communication device 6C is configured to acquire composite image data related to shot image data to be displayed, according to a display operation on the input unit 61 by a camera user, like in the above described imaging system 10 according to the fourth embodiment, effects similar to those of the above first embodiment are achieved.

Other Embodiments

Thus far, modes for carrying out the present invention have been described, but the present invention is not to be limited only to the above described first to fourth embodiments.

In the above described first to fourth embodiments, the configuration including, as the imaging device 2, 2A, 2B, or 2C, the imaging device main body 4 or 4A and the communication device 6, 6A, 6B, or 6C, has been exemplified, but not being limited thereto, a configuration with an imaging device, such as a digital camera, in which the function of the imaging device main body 4 or 4A and the function of the communication device 6, 6A, 6B, or 6C have been integrated together, may be adopted.

In the above described first to fourth embodiments, although, in order to make it easier to be understood, a family photograph at a zoo or the like has been exemplified, any imaging system that performs shooting with a plurality of cameras in corporation with one another is applicable also to a monitoring camera, an in-vehicle camera, or the like. For example, it is difficult for an in-vehicle camera to shoot a vehicle traveling in the landscape but it is easy for a camera arranged on the road, like a monitoring camera, to shoot that. Further, it is difficult for a monitoring camera to shoot an image visible from the driver's seat, but in cooperation with an in-vehicle camera, the monitoring camera is able to acquire images from various view points. In particular, for a vehicle that is moving, cooperation among a plurality of external cameras is preferable and further, an in-vehicle camera is often configured of a plurality of cameras. Further, in an examination apparatus, not only an image to be examined, but also the scene of the examination or the like is able to be used to check whether proper examination has been performed if shooting with auxiliary cameras is possible, and thus the effects characteristic of the present invention are able to be expected.

In the above described first to fourth embodiments, a configuration in which the position acquiring unit 50 and posture acquiring unit 51 composing the imaging device main body 4 or 4A are provided in the communication device 6, 6A, 6B, or 6C instead of in the imaging device main body 4 or 4A may be adopted.

In the above described first to fourth embodiments, although the imaging devices 2, and 2A to 2C and the image providing apparatuses 3 and 3A to 3C perform communication via the Internet network N, not being limited thereto, for example, similarly to between the imaging device main bodies 4 and 4A and the communication devices 6 and 6A to 6C, communication may be directly performed in a communication mode, such as Wi-Fi (registered trademark) or the like.

Further, the process flows are not limited to the sequences of the processes in the flow charts described above in the first to fourth embodiments, and may be changed so long as no contradiction arises.

Further, algorithms of the processes described by using the flow charts in this specification may be described as programs. Such a program may be recorded in a recording unit inside a computer or recorded in a computer readable recording medium. Recording of the program in the recording unit or recording medium may be performed when the computer or recording medium is shipped as a product or may be performed by downloading via a communication network.

In the above described first to fourth embodiments, a location of an operation on a portable device by a user may be identified by a touch operation on the portable device for proximity wireless communication, or the like. As a result, the touched position is able to be used both for identification of the location of the user and the communication function, and thus the system is able to be simplified. In an institution or the like arranged with a communication apparatus corresponding thereto, such a configuration is effective. Further, needless to say, by that communication, application to a system, in which a user is able to acquire a composite image, is possible. In this case, a near distance wireless technique is able to be replaced by another method, such as Bluetooth method.

In the above described first to fourth embodiments, the auxiliary image data are easier to be utilized by being joined with one another if the images overlap with one another, but if the shooting spots are discrete, overlapping the images is difficult and thus, as appropriate, images for joining may be supplemented to be joined therewith. Further, the plurality of auxiliary image data are not necessarily data that have been shot, and may be images generated by computer graphics. In this case, an application may be made, where not only a scenery image, but also map information or the like is able to be combined as an image.

The above described first to fourth embodiments also include inventions according to the following notes.

1. A portable device carried by a user, including:
   an operation reception unit;
   a request information generating unit that generates, when the operation reception unit receives a first user operation, transmission request information requesting an external image providing apparatus to transmit composite image data, the image providing apparatus having a plurality of auxiliary imaging units each of which images a subject to generate auxiliary image data;
   a portable communication unit that performs communication with the image providing apparatus; and
   a portable communication control unit that transmits the transmission request information to the image providing apparatus and receives, from the image providing apparatus, the composite image data in which two or more of the respective auxiliary image data have been combined by the image providing apparatus based on the transmission request information, via the portable communication unit.

2. The portable device according to Note 1, further including a shooting situation acquiring unit that acquires a shooting situation including a position of the portable device and a time, wherein
   the request information generating unit performs the generation of the transmission request information triggered by a characteristic situational change in the shooting situation acquired by the shooting situation acquiring unit around the reception of the first user operation by the operation reception unit.

3. The portable device according to Note 1, further including a position acquiring unit that acquires current position information related to a current position of the portable device, wherein
   the request information generating unit generates the transmission request information including the current position information acquired by the position acquiring unit when the operation reception unit receives the first user operation.

4. The portable device according to Note 3, further including a posture acquiring unit that acquires posture information related to a posture of the portable device, wherein
   the request information generating unit generates the transmission request information including, in addition to the current position information, the posture information acquired by the posture acquiring unit when the operation reception unit receives the first user operation.

5. The portable device according to Note 1, wherein the portable communication control unit receives, via the portable communication unit, the composite image data including a subject image corresponding to the user, from the image providing apparatus.

6. The portable device according to Note 5, further including:
   a first imaging unit that images the user as a subject to generate in-camera image data; and
   an imaging control unit that causes the first imaging unit to image the user as the subject when the operation reception unit receives the first user operation, wherein
   the request information generating unit generates the transmission request information including feature information related to a feature of a subject image corresponding to the user included in the in-camera image data.

7. The portable device according to Note 5, further including:
   a first imaging unit that images the user as a subject to generate in-camera image data; and
   an imaging control unit that causes the first imaging unit to image the user as the subject when the operation reception unit receives the first user operation, wherein
   the request information generating unit generates the transmission request information including the in-camera image data.

8. The portable device according to Note 1, further including:
   a display unit; and
   a display control unit that causes the display unit to display a composite image corresponding to the composite image data received via the portable communication unit, wherein
   when the operation reception unit receives a second user operation specifying a partial area of the composite image in a state where the composite image is being displayed by the display unit, the portable communication control unit transmits, via the portable communication unit, area information related to the partial area, to the image providing apparatus, and receives, from the image providing apparatus, extracted image data extracted based on the area information from the composite image data by the image providing apparatus, and
   the display control unit causes the display unit to display an extracted image corresponding to the extracted image data received via the portable communication unit.

9. The portable device according to Note 1, wherein
   the first user operation is a user operation instructing imaging of a subject, and
   the portable device further includes:
      a second imaging unit that images a subject to generate shot image data; and an imaging control unit that causes the second imaging unit to image the subject when the operation reception unit receives the first user operation.

10. The portable device according to Note 9, further including:
a display unit; and
a display control unit that causes the display unit to display a composite image corresponding to the composite image data received via the portable communication unit, wherein
the display control unit switches over images to be displayed by the display unit, when the operation reception unit receives a third user operation instructing switch-over of images to be displayed by the display unit, from the composite image to a shot image corresponding to the shot image data, or from the shot image to the composite image.

11. The portable device according to Note 9, further including:
a display unit; and
a display control unit that causes the display unit to display a composite image corresponding to the composite image data received via the portable communication unit, wherein
the display control unit causes the display unit to display the composite image and a shot image corresponding to the shot image data, side by side.

12. The portable device according to Note 11, wherein when the operation reception unit receives a second user operation specifying a partial area of the composite image in a state where the composite image and the shot image are being displayed by the display unit, the display control unit causes the display unit to display a superimposed image, in which an image corresponding to the partial area in the composite image has been superimposed on the shot image.

13. An image acquiring method performed by a portable device carried by a user, the image acquiring method including:
generating, when a first user operation is received, transmission request information requesting an external image providing apparatus to transmit composite image data, the image providing apparatus having a plurality of auxiliary imaging units each of which images a subject to generate auxiliary image data; and
transmitting the transmission request information, and receiving the composite image data in which two or more of the respective auxiliary image data have been combined by the image providing apparatus based on the transmission request information.

14. A non-transitory computer readable recording medium having an executable program recorded therein, the program instructing a processor, which a portable device carried by a user has, to execute:
generating, when a first user operation is received, transmission request information requesting an external image providing apparatus to transmit composite image data, the image providing apparatus having a plurality of auxiliary imaging units each of which images a subject to generate auxiliary image data; and
transmitting the transmission request information, and receiving the composite image data in which two or more of the respective auxiliary image data have been combined by the image providing apparatus based on the transmission request information.

15. A non-transitory computer readable recording medium having an executable program recorded therein, the program instructing a processor, which an image providing apparatus that provides image data to a portable device carried by a user has, to execute:
causing a plurality of auxiliary imaging units having shooting ranges partially overlapping one another to each image a subject to generate auxiliary image data;
receiving, from the portable device, transmission request information requesting the image providing apparatus to transmit composite image data;
generating, based on the transmission request information, composite image data by combining the auxiliary image data respectively generated by two or more of the plurality of auxiliary imaging units; and
transmitting the composite image data to the portable device.

16. An image display method performed by an image display device, which includes a data recording unit that records therein shot image data generated by an imaging device in association with transmission request information related to a shooting situation of the imaging device upon the generation of the shot image data, and which displays a shot image corresponding to the shot image data generated by the imaging device, the image display method including:
when a user operation instructing the display of the shot image corresponding to the shot image data is received, reading the shot image data to be displayed from the data recording unit and displaying the shot image corresponding to the shot image data; and
reading, from the data recording unit, the transmission request information associated with the shot image data to be displayed, transmitting the transmission request information to an external image providing apparatus having a plurality of auxiliary imaging units each of which images a subject to generate auxiliary image data, and receiving, from the image providing apparatus, composite image data in which two or more of the respective auxiliary image data have been combined by the image providing apparatus based on the transmission request information.

17. A non-transitory computer readable recording medium having an executable program recorded therein, the program causing a processor, which an image display device has, the image display device including a data recording unit that records therein shot image data generated by an imaging device in association with transmission request information related to a shooting situation of the imaging device upon the generation of the shot image data and the image display device displaying a shot image corresponding to the shot image data generated by the imaging device, to execute:
when a user operation instructing the display of the shot image corresponding to the shot image data is received, reading the shot image data to be displayed from the data recording unit and displaying the shot image corresponding to the shot image data; and
reading, from the data recording unit, the transmission request information associated with the shot image data to be displayed, transmitting the transmission request information to an external image providing apparatus having a plurality of auxiliary imaging units each of which images a subject to generate auxiliary image data, and receiving, from the image providing apparatus, composite image data in which two or more of the respective auxiliary image data have been combined by the image providing apparatus based on the transmission request information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image providing apparatus that provides image data to a portable device carried by a user, the image providing apparatus comprising:
    a plurality of auxiliary imaging units, each having a shooting range, to generate auxiliary image data;
    a provider communication unit that performs communication with the portable device;
    a provider communication control unit that receives, from the portable device, via the provider communication unit, transmission request information requesting the image providing apparatus to transmit composite image data, wherein the transmission request information includes current position information related to a current position of the portable device;
    a shooting range information recording unit that records therein a plurality of pieces of shooting range information related to the respective shooting ranges of the plurality of auxiliary imaging units; and
    an image synthesizing unit that generates, based on (1) the current position information included in the transmission request information received from the portable device via the provider communication unit and (2) the plurality of pieces of shooting range information, composite image data by combining the auxiliary image data respectively generated by two or more of the plurality of auxiliary imaging units, or by combining the auxiliary image data generated by at least one of the auxiliary imaging units and image data captured by the portable device,
    wherein the provider communication control unit transmits, via the provider communication unit, the composite image data to the portable device,
wherein the image synthesizing unit that generates composite image data by combining the auxiliary image data respectively generated by two or more of the plurality of auxiliary imaging units, does so by (1) determining, for each of the plurality of pieces of shooting range information, whether the piece of shooting range information includes the current position information included in the transmission request information received from the portable device via the provider communication unit and (2) responsive to a determination that a piece of shooting range information includes the current position information, including an image from the auxiliary imaging unit corresponding to the piece of shooting range in the composite image and otherwise, responsive to a determination that a piece of shooting range information does not include the current position information, not including an image from the auxiliary imaging unit corresponding to the piece of shooting range in the composite image.

2. The image providing apparatus according to claim 1, wherein the image synthesizing unit generates the composite image data including a subject image corresponding to the user.

3. The image providing apparatus according to claim 2, wherein
    the transmission request information includes feature information related to a feature of a subject image corresponding to the user included in in-camera image data obtained by imaging the user as a subject by a first imaging unit composing the portable device, and
    the image synthesizing unit generates the composite image data including a subject image having a feature based on the feature information.

4. The image providing apparatus according to claim 2, wherein
    the transmission request information includes in-camera image data obtained by imaging the user as a subject by a first imaging unit composing the portable device, and
    the image synthesizing unit generates feature information related to a feature of a subject image included in the in-camera image data and generates the composite image data including a subject image having a feature based on the generated feature information.

5. The image providing apparatus according to claim 1, further comprising an image extracting unit that generates, when area information related to a partial area of a composite image corresponding to the composite image data is received from the portable device via the provider communication unit, extracted image data in which the partial area based on the area information has been extracted from the composite image, wherein
    the provider communication control unit transmits, via the provider communication unit, the extracted image data to the portable device.

6. The image providing apparatus according to claim 1 wherein the image synthesizing unit that generates composite image data by combining the auxiliary image data respectively generated by two or more of the plurality of auxiliary imaging units, does so by (1) predicting, for each of the plurality of pieces of shooting range information and using the current position information, whether the piece of shooting range information includes a subject of an imaging device of the image providing apparatus and (2) responsive to a determination that a piece of shooting range information includes a subject of the imaging device, including an image from the auxiliary imaging unit corresponding to the piece of shooting range in the composite image and otherwise, responsive to a determination that a piece of shooting range information does not include a subject of the imaging device, not including an image from the auxiliary imaging unit corresponding to the piece of shooting range in the composite image.

7. The image providing apparatus according to claim 1 wherein the shooting ranges of at least some of the auxiliary imaging units partially overlap one another.

8. The image providing apparatus according to claim 1 wherein the portable device has an image capture function, and wherein the composite image data includes the image data captured by the portable device.

9. An imaging system, comprising:
    a portable device carried by a user; and
    the image providing apparatus according to claim 1, wherein
    the portable device comprises:
        an operation reception unit that receives a first user operation;
        a request information generating unit that generates, when the operation reception unit receives the first user operation, the transmission request information;
        a portable communication unit that performs communication with the image providing apparatus; and
        a portable communication control unit that transmits the transmission request information to the image providing apparatus and receives the composite image data from the image providing apparatus, via the portable communication unit.

10. An image providing method executed by an image providing apparatus that provides image data to a portable device carried by a user, the image providing method comprising:

causing a plurality of auxiliary imaging units, each having a shooting range, to generate auxiliary image data;

receiving, from the portable device, transmission request information requesting the image providing apparatus to transmit composite image data, wherein the transmission request information includes current position information related to a current position of the portable device;

recording a plurality of pieces of shooting range information related to the respective shooting ranges of the plurality of auxiliary image units;

generating, based on (1) the current position information included in the transmission request information and (2) the plurality of pieces of shooting range information, composite image data by combining the auxiliary image data respectively generated by two or more of the plurality of auxiliary imaging units, or by combining the auxiliary image data generated by at least one of the auxiliary imaging units and image data captured by the portable device; and transmitting the composite image data to the portable device, wherein the act of generating composite image data by combining the auxiliary image data respectively generated by two or more of the plurality of auxiliary imaging units includes (1) determining, for each of the plurality of pieces of shooting range information, whether the piece of shooting range information includes the current position information included in the transmission request information received from the portable device and (2) responsive to a determination that a piece of shooting range information includes the current position information, including an image from the auxiliary imaging unit corresponding to the piece of shooting range in the composite image and otherwise, responsive to a determination that a piece of shooting range information does not include the current position information, not including an image from the auxiliary imaging unit corresponding to the piece of shooting range in the composite image.

11. The image providing method of claim 10 wherein the act of generating composite image data by combining the auxiliary image data respectively generated by two or more of the plurality of auxiliary imaging units includes (1) predicting, for each of the plurality of pieces of shooting range information and using the current position information, whether the piece of shooting range information includes a subject of an imaging device of the image providing apparatus and (2) responsive to a determination that a piece of shooting range information includes a subject of the imaging device, including an image from the auxiliary imaging unit corresponding to the piece of shooting range in the composite image and otherwise, responsive to a determination that a piece of shooting range information does not include a subject of the imaging device, not including an image from the auxiliary imaging unit corresponding to the piece of shooting range in the composite image.

12. The image providing method of claim 10 wherein the shooting ranges of at least some of the auxiliary imaging units partially overlap one another.

13. The image providing method of claim 10 wherein the portable device has an image capture function, and wherein the composite image data includes the image data captured by the portable device.

* * * * *